US012054637B2

(12) United States Patent
Katayama et al.

(10) Patent No.: US 12,054,637 B2
(45) Date of Patent: *Aug. 6, 2024

(54) FLUORINE-CONTAINING COATING AGENT COMPOSITION, SURFACE TREATMENT AGENT CONTAINING SAID COMPOSITION, AND ARTICLE

(71) Applicant: SHIN-ETSU CHEMICAL CO., LTD., Tokyo (JP)

(72) Inventors: Lisa Katayama, Annaka (JP); Takashi Matsuda, Annaka (JP); Yuji Yamane, Annaka (JP); Ryusuke Sakoh, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 707 days.

This patent is subject to a terminal disclaimer.

(21) Appl. No.: 16/613,924

(22) PCT Filed: Apr. 19, 2018

(86) PCT No.: PCT/JP2018/016116

§ 371 (c)(1),
(2) Date: Nov. 15, 2019

(87) PCT Pub. No.: WO2018/216404

PCT Pub. Date: Nov. 29, 2018

(65) Prior Publication Data

US 2021/0189174 A1 Jun. 24, 2021

(30) Foreign Application Priority Data

May 23, 2017 (JP) ................................ 2017-101307

(51) Int. Cl.
*C09D 183/06* (2006.01)
*C09D 171/00* (2006.01)

(52) U.S. Cl.
CPC ......... *C09D 183/06* (2013.01); *C09D 171/00* (2013.01)

(58) Field of Classification Search
None
See application file for complete search history.

(56) References Cited

U.S. PATENT DOCUMENTS 7,294,731 B1 11/2007 Flynn et al.
9,790,322 B2 * 10/2017 Sakoh ................. C09D 171/02
11,001,670 B2 * 5/2021 Sakoh ................. C08G 65/007
2009/0208728 A1 8/2009 Itami et al.
2009/0216035 A1 8/2009 Itami et al.
2012/0077041 A1 3/2012 Yamane et al.
2013/0136928 A1 5/2013 Yamane et al.
2013/0228100 A1 9/2013 Kleyer et al.
2013/0303689 A1 11/2013 Sato et al.
2015/0274889 A1 * 10/2015 Sakoh ................. C08G 65/007 428/447
2016/0304665 A1 * 10/2016 Sakoh ................. C08G 65/007
2016/0340466 A1 11/2016 Hamajima et al.
2018/0186820 A1 7/2018 Katsukawa et al.

FOREIGN PATENT DOCUMENTS

JP 07000793 A * 1/1995
JP 2008-534696 A 8/2008
JP 2008-537557 A 9/2008
JP 2010-502784 A 1/2010
JP 2012-72272 A 4/2012
JP 2012-157856 A 8/2012
JP 2012-197395 A 10/2012
JP 2013-136833 A 7/2013
JP 2014-505114 A 2/2014
JP 2014-70164 A 4/2014
JP 2015-199906 A 11/2015
JP 2016-204656 A 12/2016
JP 2016-216557 A 12/2016
WO WO 2016/208587 A1 12/2016

OTHER PUBLICATIONS

English machine translation of JP-07000793 JPO (1995).*
International Search Report, issued in PCT/JP2018/016116, dated Jun. 12, 2018.

* cited by examiner

*Primary Examiner* — Kenneth J Stachel
(74) *Attorney, Agent, or Firm* — Birch, Stewart, Kolasch & Birch, LLP

(57) ABSTRACT

This fluorine-containing coating agent composition contains: (A) an organic silicon compound containing a hydrolyzable group or a hydroxy group modified by a fluorooxyalkylene group-containing polymer residue, and/or a partial (hydrolyzed) condensate thereof; and (B) an organic silicon compound containing a polyether group and a hydrolyzable group or a hydroxy group modified by a fluorooxyalkylene group-containing polymer residue, and/or a partial (hydrolyzed) condensate thereof, wherein the mixture mass ratio of component (A) and component (B) is 15:85-85:15. When the composition is applied as a surface treatment agent, the surface treatment agent containing the fluorine-containing coating agent composition can form a cured coating film which has excellent water repellency and oil repellency, and which has both excellent steel wool abrasion resistance and eraser rubber abrasion resistance.

12 Claims, No Drawings

FLUORINE-CONTAINING COATING AGENT COMPOSITION, SURFACE TREATMENT AGENT CONTAINING SAID COMPOSITION, AND ARTICLE

TECHNICAL FIELD

This invention relates to a fluorochemical coating composition, and more particularly, to a fluorochemical coating composition comprising an organosilicon compound containing a hydroxyl or hydrolyzable group, modified with a fluorooxyalkylene-containing polymer residue, and/or a partial (hydrolytic) condensate thereof, and an organosilicon compound containing a hydroxyl or hydrolyzable group and a polyether group, modified with a fluorooxyalkylene-containing polymer residue, and/or a partial (hydrolytic) condensate thereof, in a specific mixing weight ratio, the composition being capable of forming a coating having improved water/oil repellency and abrasion resistance, a surface treating agent comprising the composition, and an article having a surface treated with the surface treating agent.

BACKGROUND ART

Recently, there is an accelerating demand to mount touch panels as the screen on mobile phones and other displays. While the touch panel has a screen kept bare, there are many chances of the finger or cheek coming in direct contact with the screen. Undesirably the touch panel is readily fouled with stains like sebum. There is an annually increasing need for technology to attain fingerprint proofness or easy stain removal on a display surface for better appearance or visibility. It is thus desired to have a material capable of meeting these requirements. In particular, for touch panel displays which are readily stained with fingerprints, it is desirable to form a water/oil repellent layer on their surface. Prior art water/oil repellent layers have high water/oil repellency and easy stain wipe-off, but suffer from the problem that the antifouling performance deteriorates during service.

Generally, fluoropolyether-containing compounds exhibit, by virtue of their extremely low surface free energy, water/oil repellency, chemical resistance, lubricity, parting, antifouling and other properties. Taking advantage of these properties, they find use in a variety of industrial fields as water/oil repellent antifouling agents for paper and textiles, lubricants for magnetic recording media, oil-repellent agents for precision instruments, parting agents, cosmetic ingredients, protective films and the like. Inversely, the same properties indicate non-tackiness or non-adhesion to other substrates. Even if they can be coated to the substrate surface, it is difficult for the coating to tightly adhere thereto.

On the other hand, silane coupling agents are well known for their ability to bond surfaces of glass or fabric substrates to organic compounds. They are widely used as surface coating agents for numerous substrates. The silane coupling agent contains an organic functional group and a reactive silyl group (typically hydrolyzable silyl such as alkoxysilyl) in the molecule. In the presence of airborne moisture or the like, the hydrolyzable silyl groups undergo self-condensation reaction to form a coating. The hydrolyzable silyl groups form chemical and physical bonds with the surface of glass or metal, whereby the coating becomes a tough coating having durability.

Patent Documents 1 to 6 (JP-A 2008-534696, JP-A 2008-537557, JP-A 2012-072272, JP-A 2012-157856, JP-A 2013-136833, JP-A 2015-199906) disclose a composition comprising a fluoropolyether-containing polymer which is obtained by introducing a hydrolyzable silyl group into a fluoropolyether-containing compound, the composition being tightly adherent to the substrate surface and capable of forming a coating with water/oil repellency, chemical resistance, lubricity, parting, antifouling and other properties on the substrate surface.

Patent Document 7 (JP-A 2016-204656) discloses a composition comprising a fluoropolyether-containing polymer having an increased number of reactive functional groups, the composition having an increased bonding force to the substrate surface and being capable of forming a coating having good steel wool abrasion resistance.

When lenses and antireflective coatings are surface treated with a composition comprising the fluoropolyether-containing polymer which is obtained by introducing a hydrolyzable silyl group into a fluoropolyether-containing compound, or the fluoropolyether-containing polymer having an increased number of reactive functional groups, the cured coatings are improved in slippage and parting properties, but fail to meet both durability to abrasion with steel wool and durability to abrasion with erasers.

PRIOR ART DOCUMENTS

Patent Documents

Patent Document 1: JP-A 2008-534696
Patent Document 2: JP-A 2008-537557
Patent Document 3: JP-A 2012-072272
Patent Document 4: JP-A 2012-157856
Patent Document 5: JP-A 2013-136833
Patent Document 6: JP-A 2015-199906
Patent Document 7: JP-A 2016-204656

SUMMARY OF INVENTION

Technical Problem

An object of the invention, which has been made under the above-mentioned circumstances, is to provide a fluorochemical coating composition comprising fluoropolyether-containing polymers and/or partial (hydrolytic) condensates thereof, the composition being capable of forming a cured film having improved water/oil repellency and abrasion resistance, a surface treating agent comprising the composition, and an article having a surface treated with the surface treating agent.

Solution to Problem

Making extensive investigations to attain the above object, the inventors have found that among the foregoing fluoropolyether-containing polymers, an organosilicon compound containing a hydroxyl or hydrolyzable group, modified with a fluorooxyalkylene-containing polymer residue, and/or a partial (hydrolytic) condensate thereof, preferably an organosilicon compound containing a hydroxyl or hydrolyzable group, modified with a fluorooxyalkylene-containing polymer residue, represented by the general formula (1), shown below, and/or a partial (hydrolytic) condensate thereof, more preferably an organosilicon compound containing a hydroxyl or hydrolyzable group, modified with a fluorooxyalkylene-containing polymer residue, represented by the general formula (4) or (5), shown below, and/or a partial (hydrolytic) condensate thereof, and an organosilicon compound containing a hydroxyl or hydrolyzable group and a polyether group, modified with a fluorooxyalkylene-containing polymer residue, and/or a partial (hydrolytic) condensate thereof, preferably an organosilicon compound containing a hydroxyl or hydrolyzable group and a polyether group, modified with a fluorooxyalkylene-containing polymer residue, represented by the general formula (2) or (3), shown below, and/or a partial (hydrolytic) condensate thereof, more preferably an organosilicon compound containing a hydroxyl or hydrolyzable group and a polyether group, modified with a fluorooxyalkylene-containing polymer residue, represented by the general formula (6), shown below, and/or a partial (hydrolytic) condensate thereof, are mixed in a specific mixing ratio to formulate a fluorochemical coating composition, and that when this fluorochemical coating composition is applied as a surface treating agent, the surface treating agent comprising the fluorochemical coating composition is capable of forming a cured coating which is improved in water/oil repellency and in both steel wool abrasion resistance and eraser abrasion resistance. The present invention is predicated on this finding.

Accordingly, the invention provides a fluorochemical coating composition, a surface treating agent comprising the composition, and an article treated with the surface treating agent, as defined below.

[1]

A fluorochemical coating composition comprising (A) an organosilicon compound containing a hydroxyl or hydrolyzable group, modified with a fluorooxyalkylene-containing polymer residue, and/or a partial (hydrolytic) condensate thereof, and (B) an organosilicon compound containing a hydroxyl or hydrolyzable group and a polyether group, modified with a fluorooxyalkylene-containing polymer residue, and/or a partial (hydrolytic) condensate thereof, wherein components (A) and (B) are mixed in a weight ratio of from 15:85 to 85:15, provided that the total of components (A) and (B) is 100.

[2]

The fluorochemical coating composition of [1] wherein component (A) is an organosilicon compound containing a hydroxyl or hydrolyzable group, modified with a fluorooxyalkylene-containing polymer residue, represented by the general formula (1):

[Chem. 1]

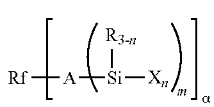

(1)

wherein Rf is a mono- or divalent fluorooxyalkylene-containing polymer residue, A is independently a di- to heptavalent organic group, R is independently $C_1$-$C_4$ alkyl or phenyl, X is independently a hydroxyl or hydrolyzable group, n is an integer of 1 to 3, m is an integer of 1 to 6, and $\alpha$ is 1 or 2, and/or a partial (hydrolytic) condensate thereof, component (B) is an organosilicon compound containing a hydroxyl or hydrolyzable group and a polyether group, modified with a fluorooxyalkylene-containing polymer residue, represented by the general formula (2) or (3):

$$Rf\text{-}[N(V)_\beta(E)_\gamma]_\alpha \quad (2)$$

wherein Rf and $\alpha$ are as defined above, N is independently an optionally fluorinated, tri- to octavalent organic group which may contain oxygen, silicon or nitrogen, V is independently a monovalent group terminated with a hydroxyl or hydrolyzable group, E is independently a monovalent group containing oxyalkylene, $\beta$ is an integer of 1 to 6, $\gamma$ is an integer of 1 to 6, $\beta+\gamma$ is an integer of 2 to 7, $$Rf\text{-}[Q\text{-}(G)_\delta\text{-}(E')_\varepsilon\text{-}B]_\alpha \quad (3)$$

wherein Rf and $\alpha$ are as defined above, Q is independently a single bond or divalent organic group, G is independently a divalent group having a hydroxyl or hydrolyzable group, E' is independently an oxyalkylene-containing divalent group which may have a hydroxyl or hydrolyzable group, B is independently hydrogen, $C_1$-$C_4$ alkyl or halogen, $\delta$ is independently an integer of 0 to 10, $\varepsilon$ is independently an integer of 1 to 10, with the proviso that G and E' are linearly linked, and G and E' individually may be randomly arranged, and/or a partial (hydrolytic) condensate thereof.

[3]

The fluorochemical coating composition of [2] wherein component (A) is an organosilicon compound containing a hydroxyl or hydrolyzable group, modified with a fluorooxyalkylene-containing polymer residue, represented by the general formula (4) or (5):

[Chem. 2]

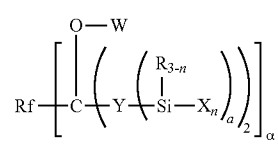

(4)

wherein Rf is a mono- or divalent fluorooxyalkylene-containing polymer residue, Y is independently a di- to hexavalent hydrocarbon group which may have silicon and/or a siloxane bond, W is hydrogen or a group having the formula (4a):

[Chem. 3]

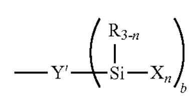

(4a)

wherein Y' is a di- to hexavalent hydrocarbon group which may have silicon and/or a siloxane bond, R is independently $C_1$-$C_4$ alkyl or phenyl, X is independently a hydroxyl or hydrolyzable group, n is an integer of 1 to 3, a is an integer of 1 to 5, b is an integer of 1 to 5, and $\alpha$ is 1 or 2,

[Chem. 4]

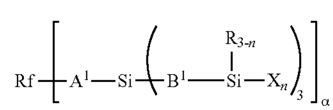

(5)

wherein $A^1$ is a $C_2$-$C_6$ divalent hydrocarbon group which main contain an ether bond, $B^1$ is independently a $C_1$-$C_5$ alkylene group which may contain at least one selected from oxygen atom, diorganosilylene group, and diorganosiloxane structure, Rf, X, R, n and a are as defined above, and/or a partial (hydrolytic) condensate thereof, component (B) is an organosilicon compound containing a hydroxyl or hydrolyzable group and a polyether group, modified with a fluorooxyalkylene-containing polymer residue, represented by the general formula (6):

[Chem. 5]

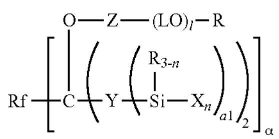

(6)

wherein Rf, Y, X, R, n and a are as defined above, Z is independently a single bond, siloxane bond or silylene group, L is independently $C_1$-$C_4$ alkylene, 1 is an integer of 1 to 20, and a1 is an integer of 1 to 5, and/or a partial (hydrolytic) condensate thereof.

[4]

The fluorochemical coating composition of [2] or [3] wherein in formulae (1) to (6), α=1 and Rf is a monovalent fluorooxyalkylene-containing polymer residue having the general formula (7):

[Chem. 6]

$$F\text{—}(CF_2O)_p\text{—}(C_2F_4O)_q\text{—}(C_3F_6O)_r\text{—}(C_4F_8O)_s\text{—}C_dF_{2d}\text{—} \quad (7)$$

wherein p, q, r and s each are an integer of 0 to 200, p+q+r+s is 3 to 200, the repeating units may be linear or branched, individual repeating units may be randomly bonded, d is an integer of 0 to 3, and the units associated with d may be linear or branched.

[5]

The fluorochemical coating composition of [2] or [3] wherein in formulae (1) to (6), α=2 and Rf is a divalent fluorooxyalkylene-containing polymer residue having the general formula (8):

[Chem. 7]

$$\text{—}C_dF_{2d}\text{—}O\text{—}(CF_2O)_p\text{—}(C_2F_4O)_q\text{—}(C_3F_6O)_r\text{—}(C_4F_8O)_s\text{—}C_dF_{2d}\text{—} \quad (8)$$

wherein p, q, r and s each are an integer of 0 to 200, p+q+r+s is 3 to 200, the repeating units may be linear or branched, individual repeating units may be randomly bonded, d is each independently an integer of 0 to 3, and the units associated with d may be linear or branched.

[6]

The fluorochemical coating composition of any one of [3] to [5] wherein in formulae (4) and (6), Y is selected from the group consisting of a $C_3$-$C_{10}$ alkylene group, a $C_2$-$C_8$ alkylene group containing $C_6$-$C_8$ arylene, a divalent group having $C_2$-$C_8$ alkylene groups bonded via a $C_1$-$C_4$ silalkylene structure or $C_6$-$C_{10}$ silarylene structure, and a di- to tetravalent group in which a $C_2$-$C_{10}$ alkylene group is bonded to the valence bond of a di- to tetravalent linear organopolysiloxane residue of 2 to 10 silicon atoms or a di- to tetravalent branched or cyclic organopolysiloxane residue of 3 to 10 silicon atoms.

[7]

The fluorochemical coating composition of any one of [3] to [6] wherein in formula (4a), Y' is selected from the group consisting of a $C_2$-$C_{10}$ alkylene group, a $C_2$-$C_8$ alkylene group containing $C_6$-$C_8$ arylene, a $C_2$-$C_6$ alkylene group containing diorganosilylene, a divalent group having $C_2$-$C_8$ alkylene groups bonded via a $C_1$-$C_4$ silalkylene structure or $C_6$-$C_{10}$ silarylene structure, a $C_2$-$C_6$ alkylene group containing divalent linear organopolysiloxane residue of 2 to 10 silicon atoms, and a di- to tetravalent group in which a $C_2$-$C_{10}$ alkylene group is bonded to the valence bond of a di- to tetravalent linear organopolysiloxane residue of 2 to 10 silicon atoms or a di- to tetravalent branched or cyclic organopolysiloxane residue of 3 to 10 silicon atoms.

[8]

The fluorochemical coating composition of any one of [3] to [7] wherein in formula (6), Z is selected from the group consisting of a single bond, a di- to tetravalent linear organopolysiloxane residue of 2 to 10 silicon atoms or a di- to tetravalent branched or cyclic organopolysiloxane residue of 3 to 10 silicon atoms, and a linear silalkylene residue or silarylene residue of 2 to 10 silicon atoms.

[9]

The fluorochemical coating composition of any one of [2] to [8] wherein in formulae (1) and (4) to (6), X is selected from the group consisting of hydroxyl, $C_1$-$C_{10}$ alkoxy groups, $C_2$-$C_{10}$ alkoxyalkoxy groups, $C_1$-$C_{10}$ acyloxy groups, $C_2$-$C_{10}$ alkenyloxy groups, and halogens.

[10]

The fluorochemical coating composition of any one of [2] to [9] wherein the hydrolyzable group-containing organosilicon compound modified with a fluorooxyalkylene-containing polymer residue, represented by formula (1), is selected from compounds having the following formulae:

[Chem. 8]

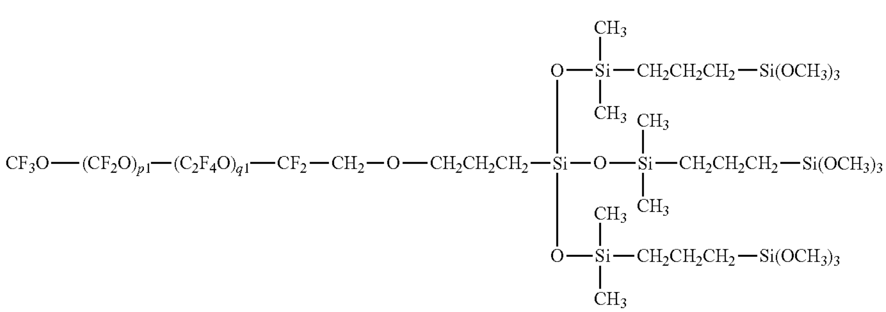

-continued
[Chem. 9]
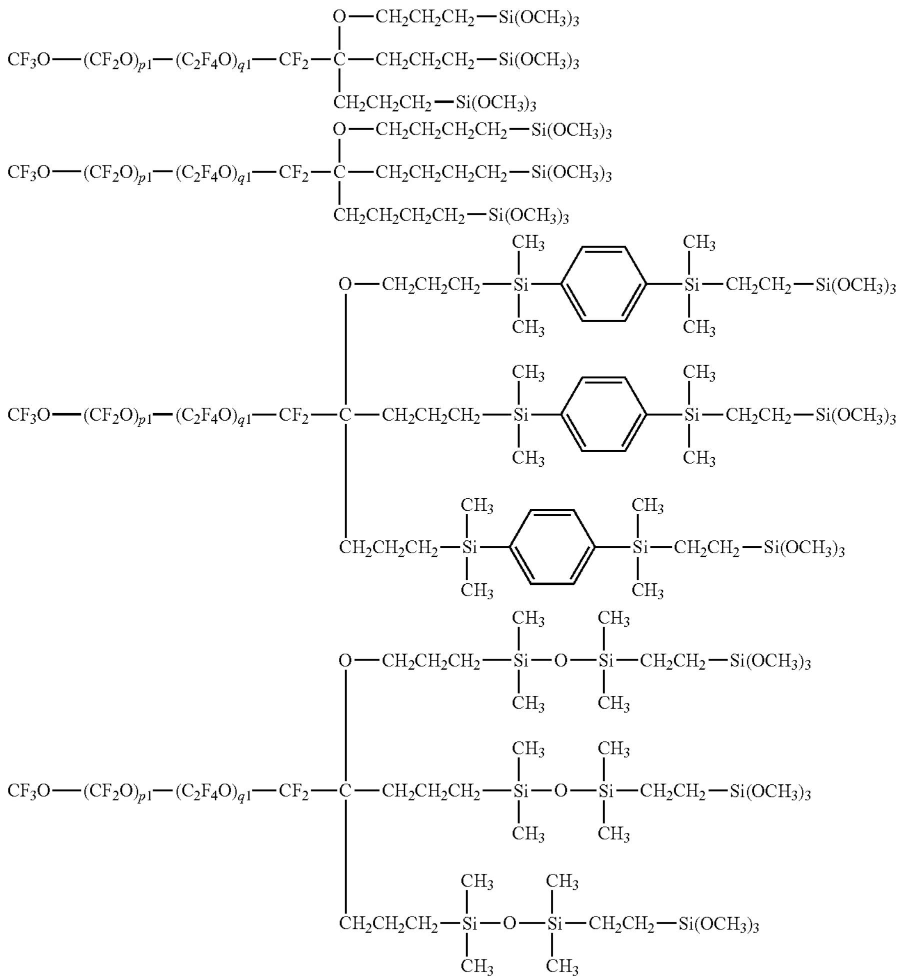
[Chem. 10]
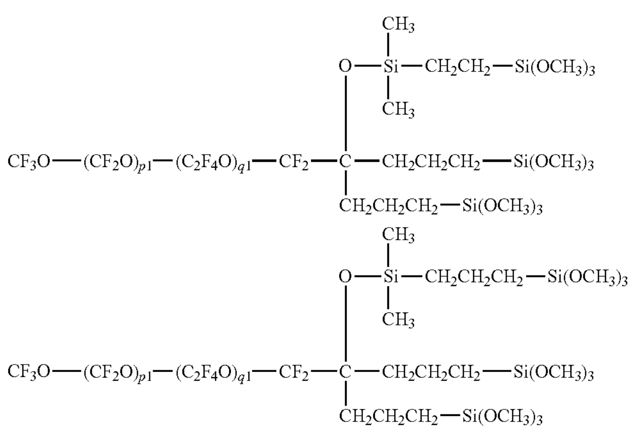
[Chem. 11]
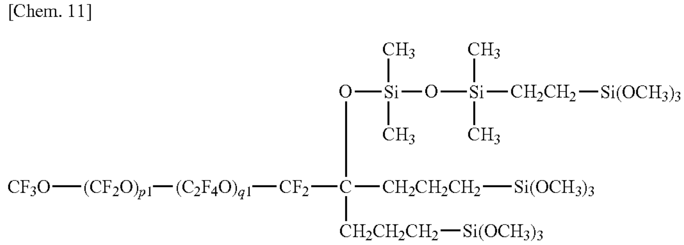

-continued
[Chem. 12]
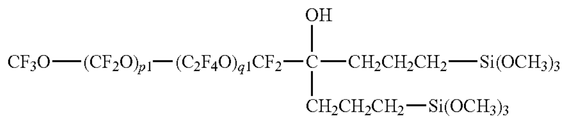
[Chem. 13]
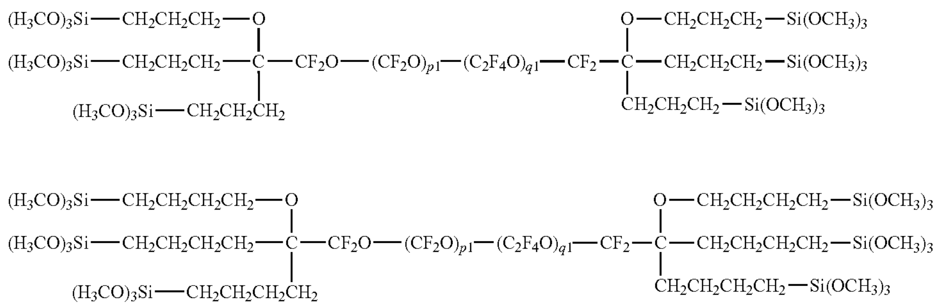
[Chem. 14]
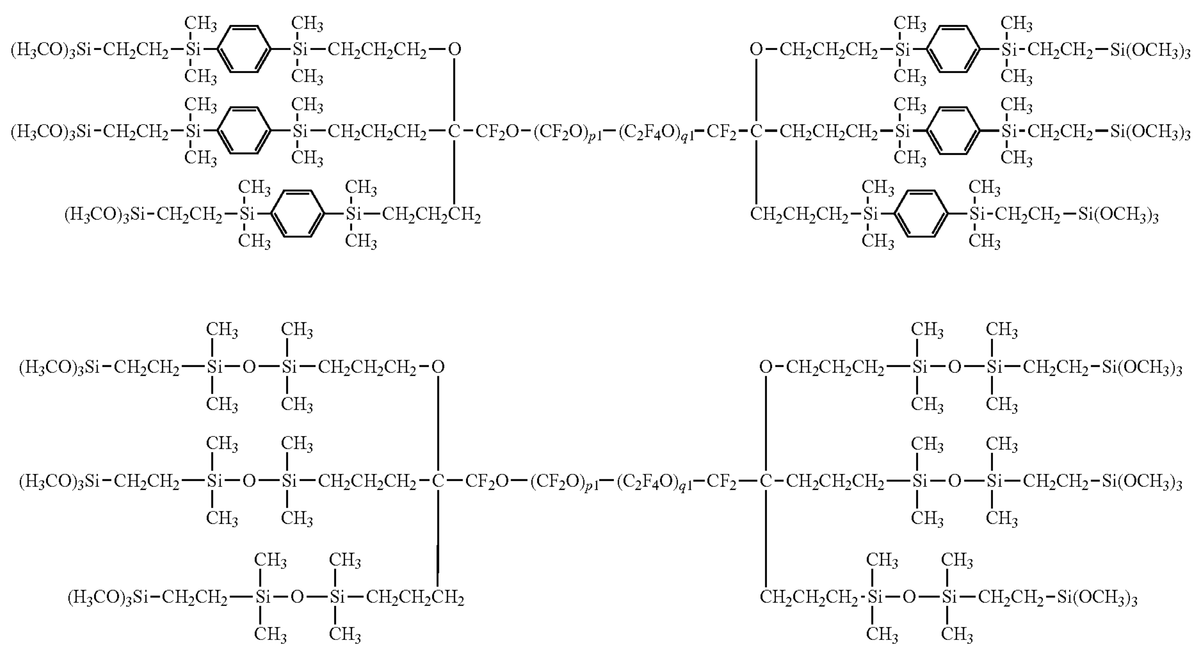
[Chem. 15]
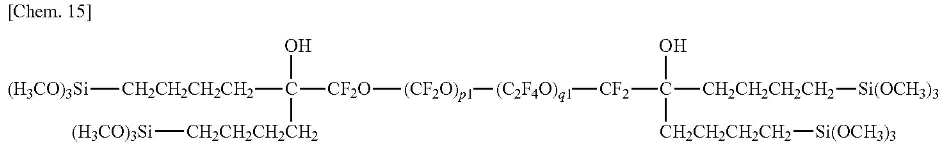
[Chem. 16]
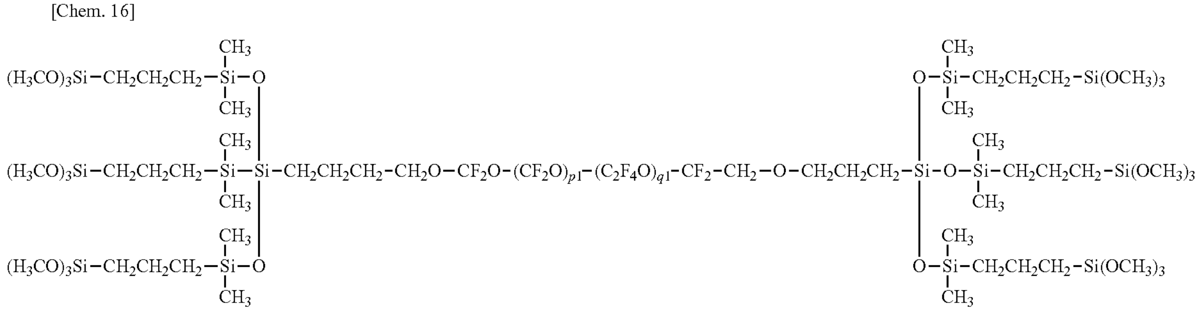

wherein p1 is an integer of 5 to 100, q1 is an integer of 5 to 100, p1+q1 is an integer of 10 to 105, individual units in parentheses may be randomly bonded.

[11]

The fluorochemical coating composition of any one of [2] to [10] wherein the hydrolyzable and polyether group-containing organosilicon compound modified with a fluorooxyalkylene-containing polymer residue, represented by formula (2) or (3), is selected from compounds having the following formulae:

[Chem. 17]

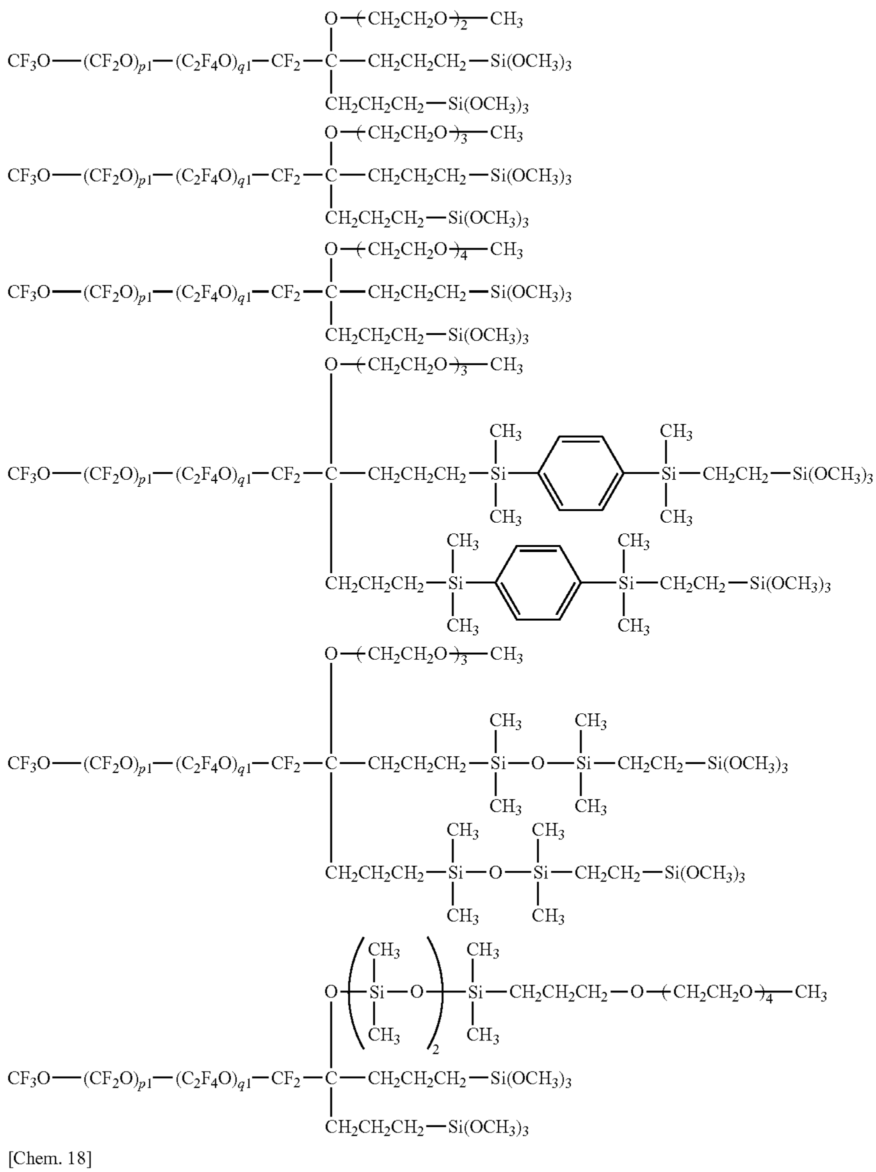

[Chem. 18]

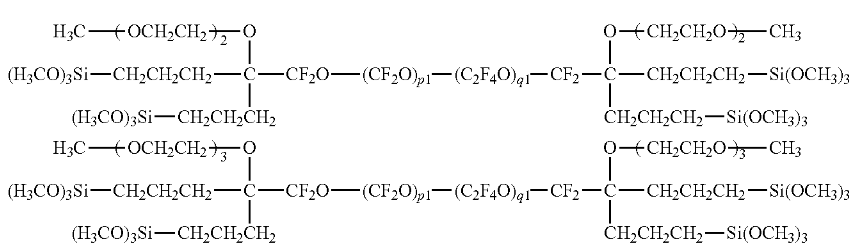

-continued
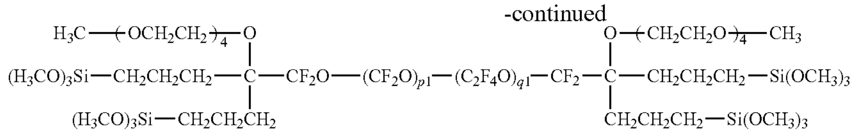
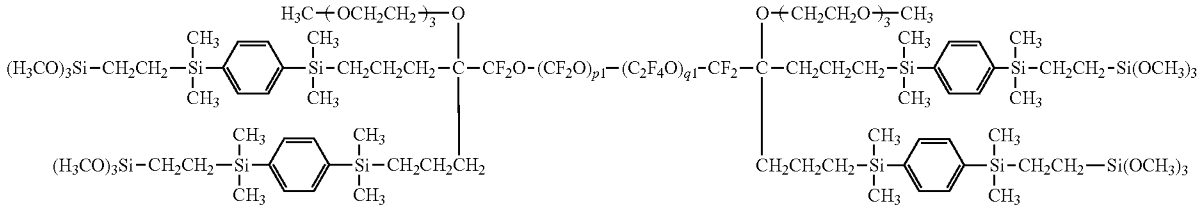
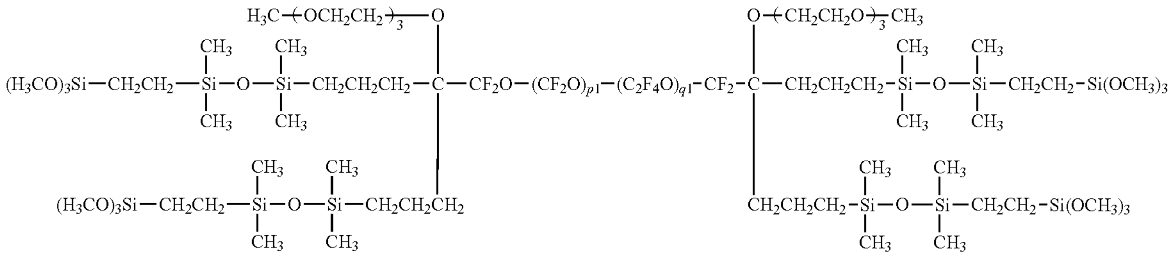
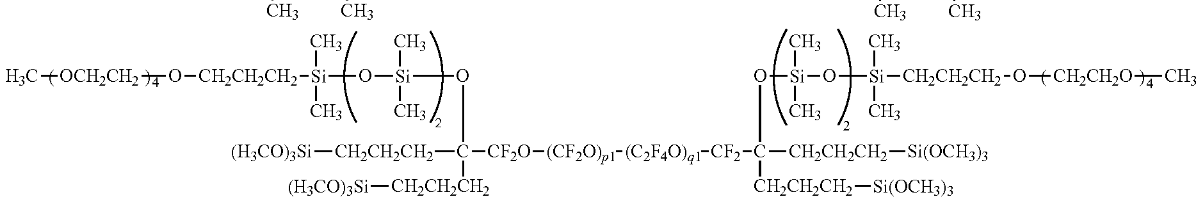
[Chem. 19]
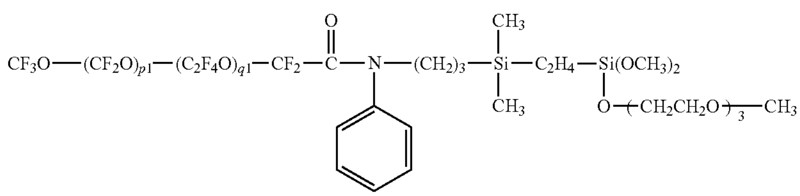
[Chem. 20]
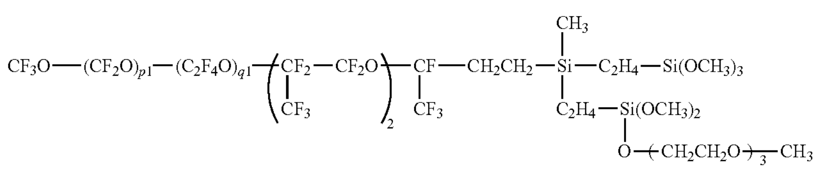
[Chem. 21]
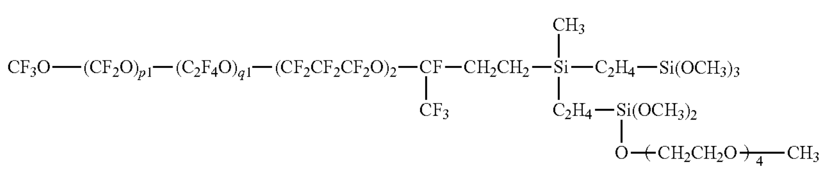
[Chem. 22]
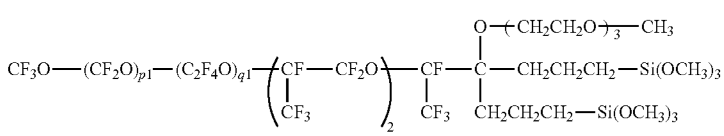
[Chem. 23]
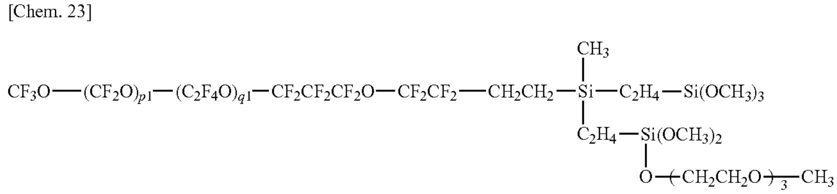

-continued
[Chem. 24]
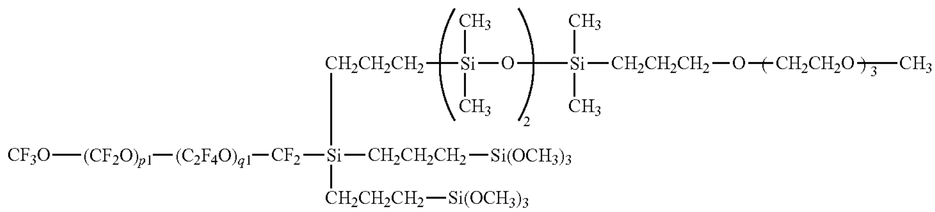
[Chem. 25]
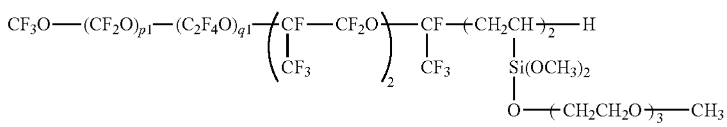
[Chem. 26]
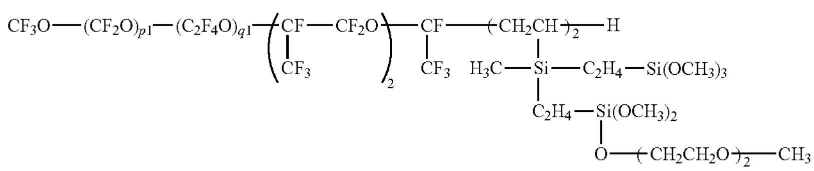
[Chem. 27]
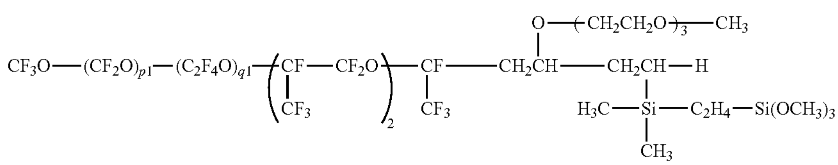
[Chem. 28]
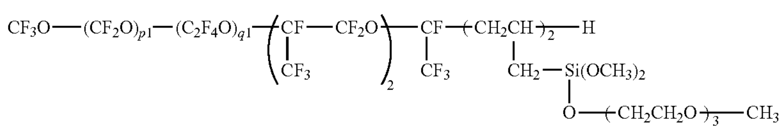
[Chem. 29]
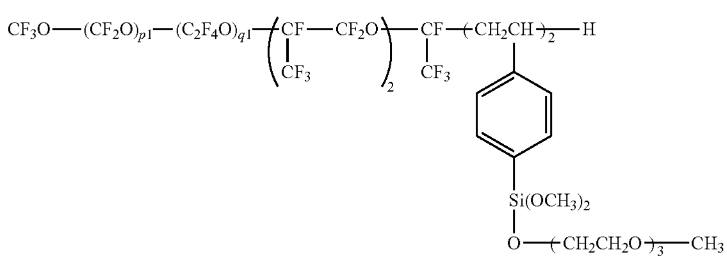
[Chem. 30]
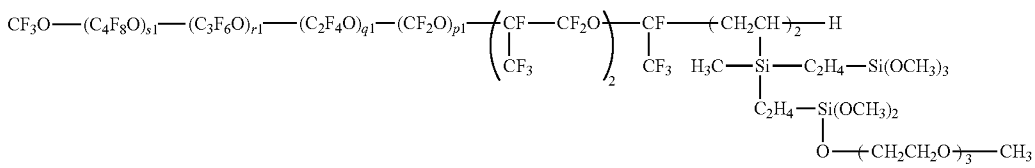
[Chem. 31]
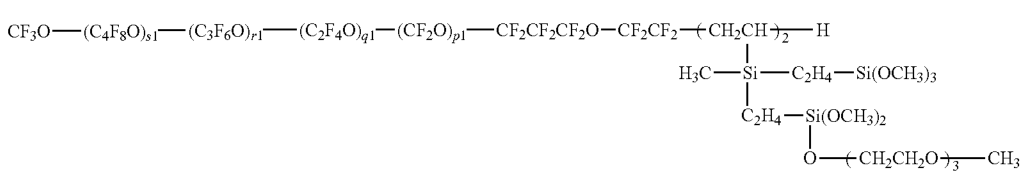

-continued

[Chem. 32]

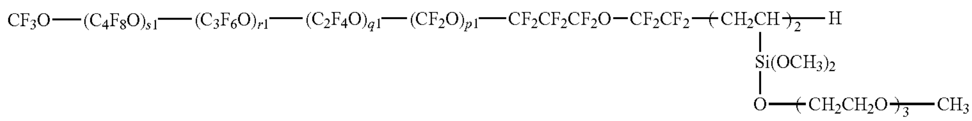

[Chem. 33]

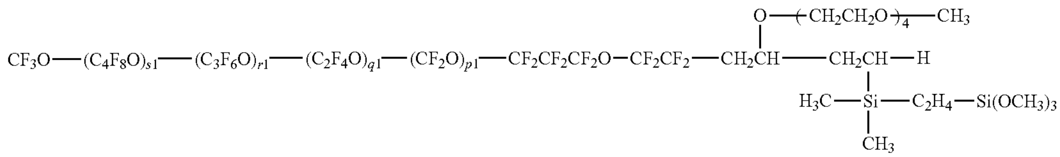

[Chem. 34]

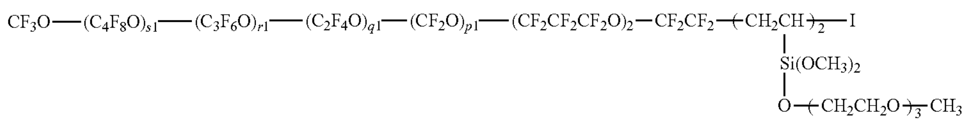

[Chem. 35]

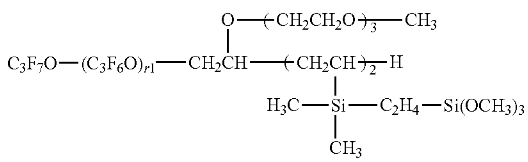

[Chem. 36]

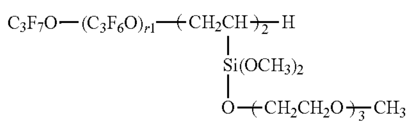

[Chem. 37]

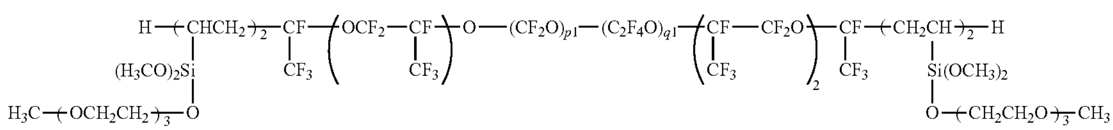

wherein p1 is an integer of 5 to 100, q1 is an integer of 5 to 100, p1+q1 is an integer of 10 to 105, r1 is an integer of 1 to 100, s1 is an integer of 1 to 100, p1+q1+r1+s1 is an integer of 12 to 199, individual units in parentheses may be randomly bonded.

[12]

A surface treating agent comprising the fluorochemical coating composition of any one of [1] to [11].

[13]

An article having a surface treated with the surface treating agent of [12].

Advantageous Effects of Invention

The fluorochemical coating composition of the invention is obtained by mixing a polymer containing a hydroxyl or hydrolyzable group and having a fluoropolyether group with a polymer containing a hydroxyl or hydrolyzable group and a polyether group and having a fluoropolyether group in a specific ratio. The hydroxyl or hydrolyzable group serves to strengthen the adhesion to a substrate, and the polyether group serves to improve substrate adhesion and wettability. Then an article which is surface treated with a surface treating agent comprising the fluorochemical coating composition comprising the polymers and/or partial (hydrolytic) condensates thereof is improved in water/oil repellency and exhibits excellent steel wool abrasion resistance and eraser abrasion resistance.

DESCRIPTION OF EMBODIMENTS

The fluorochemical coating composition of the invention is characterized by comprising (A) an organosilicon compound containing a hydroxyl or hydrolyzable group, modified with a fluorooxyalkylene-containing polymer residue, and/or a partial (hydrolytic) condensate thereof, and (B) an organosilicon compound containing a hydroxyl or hydrolyzable group and a polyether group, modified with a fluorooxyalkylene-containing polymer residue, and/or a partial (hydrolytic) condensate thereof, wherein components (A) and (B) are mixed in a weight ratio of from 15:85 to 85:15, preferably from 30:70 to 90:10, more preferably from 40:60 to 80:20, provided that the total of components (A) and (B) is 100. If component (A) is too much or if component (B) is too less, satisfactory steel wool durability is not obtainable. If component (A) is too less or if component (B) is too much, satisfactory eraser durability is not obtainable. Thus, a fluorochemical coating composition wherein the mixing weight ratio is outside the range fails to meet both satisfactory steel wool durability and eraser durability.

The fluorochemical coating composition of the invention, in which components (A) and (B) are mixed in a specific ratio, is improved in substrate adhesion and wettability, has good water/oil repellency, and exhibits satisfactory steel wool abrasion resistance and eraser abrasion resistance.

Now the fluorochemical coating composition of the invention is described in detail.

Component (A)

Component (A) is an organosilicon compound containing a hydroxyl or hydrolyzable group, modified with a fluorooxyalkylene-containing polymer residue, and/or a partial (hydrolytic) condensate thereof (i.e., an organosiloxane oligomer having at least 2, preferably at least 3 residual hydroxyl or hydrolyzable groups in the molecule, obtained from partial (hydrolytic) condensation of the organosilicon compound), preferably an organosilicon compound containing a hydroxyl or hydrolyzable group, modified with a fluorooxyalkylene-containing polymer residue, represented by the general formula (1), and/or a partial (hydrolytic) condensate thereof.

[Chem. 38]

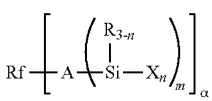

(1)

Herein Rf is a mono- or divalent fluorooxyalkylene-containing polymer residue, A is independently a di- to heptavalent organic group, R is independently $C_1$-$C_4$ alkyl or phenyl, X is independently a hydroxyl or hydrolyzable group, n is an integer of 1 to 3, m is an integer of 1 to 6, and a is 1 or 2.

More preferably, component (A) is an organosilicon compound containing a hydroxyl or hydrolyzable group, modified with a fluorooxyalkylene-containing polymer residue, represented by the general formula (4) or (5), and/or a partial (hydrolytic) condensate thereof.

[Chem. 39]

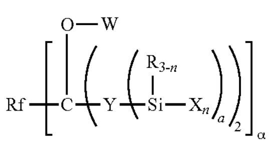

(4)

Herein Rf, R, X, n and a are as defined above. Y is independently a di- to hexavalent hydrocarbon group which may have a silicon atom and/or a siloxane bond. W is hydrogen or a group having the formula (4a):

[Chem. 40]

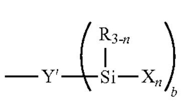

(4a)

wherein Y' is a di- to hexavalent hydrocarbon group which may have a silicon atom and/or a siloxane bond, a and b each are an integer of 1 to 5.

[Chem. 41]

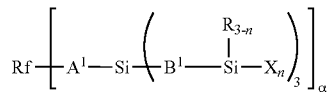

(5)

Herein $A^1$ is a $C_2$-$C_6$ divalent hydrocarbon group, typically alkylene group, which may contain an ether bond, $B^1$ is independently a $C_1$-$C_5$ alkylene group which may contain at least one member selected from oxygen atom, diorganosilylene group, and diorganosiloxane structure, Rf, X, R, n and a are as defined above.

In formulae (1), (4) and (5), Rf is a mono- or divalent fluorooxyalkylene-containing polymer residue, preferably a monovalent fluorooxyalkylene-containing polymer residue having the general formula (7) below when α is 1 (i.e., Rf is a monovalent fluorooxyalkylene-containing polymer residue), or a divalent fluorooxyalkylene-containing polymer residue having the general formula (8) below when α is 2 (i.e., Rf is a divalent fluorooxyalkylene-containing polymer residue).

[Chem. 42]

$$F\text{—}(CF_2O)_p\text{—}(C_2F_4O)_q\text{—}(C_3F_6O)_r\text{—}(C_4F_8O)_s\text{—}C_dF_{2d}\text{—} \quad (7)$$

[Chem. 43]

$$\text{—}C_dF_{2d}\text{—}O\text{—}(CF_2O)_p\text{—}(C_2F_4O)_q\text{—}(C_3F_6O)_r\text{—}(C_4F_8O)_s\text{—}C_dF_{2d}\text{—} \quad (8)$$

Herein p, q, r and s are each independently an integer of 0 to 200, p+q+r+s is 3 to 200, each of repeating units associated with p, q, r and s may be linear or branched, individual repeating units may be randomly bonded, d is independently an integer of 0 to 3, the unit associated with d may be linear or branched.

In formulae (7) and (8), p, q, r and s each are an integer of 0 to 200, preferably p is an integer of 5 to 100, q is an integer of 5 to 100, r is an integer of 0 to 100, and s is an integer of 0 to 100; p+q+r+s is 3 to 200, preferably 10 to 105, more preferably 10 to 100; each repeating unit may be linear or branched, and individual repeating units may be randomly bonded. More preferably, p+q is an integer of 10 to 105, especially 15 to 60, and r=s=0. When p+q+r+s is below the upper limit, adhesion and curability are satisfactory. When p+q+r+s is above the lower limit, the characteristics of fluoropolyether group are fully exerted.

Also, d is an integer of 0 to 3 independently for each unit, preferably 1 or 2, the unit associated with d may be linear or branched.

Exemplary of Rf are groups as shown below.

[Chem. 44]

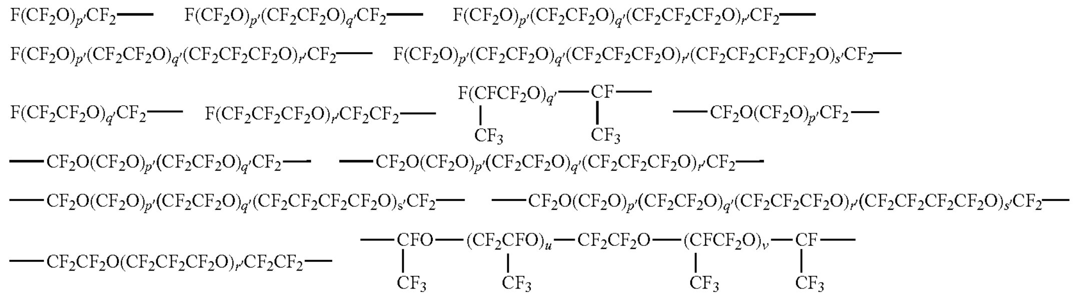

Herein p', q', r' and s' each are an integer of at least 1, their upper limits are the same as the upper limits of p, q, r and s; u is an integer of 1 to 24, v is an integer of 1 to 24, and individual repeating units may be randomly bonded.

In formula (1), A is a di- to heptavalent, preferably di- to pentavalent organic group. Exemplary of A are groups as shown below.

[Chem. 45]

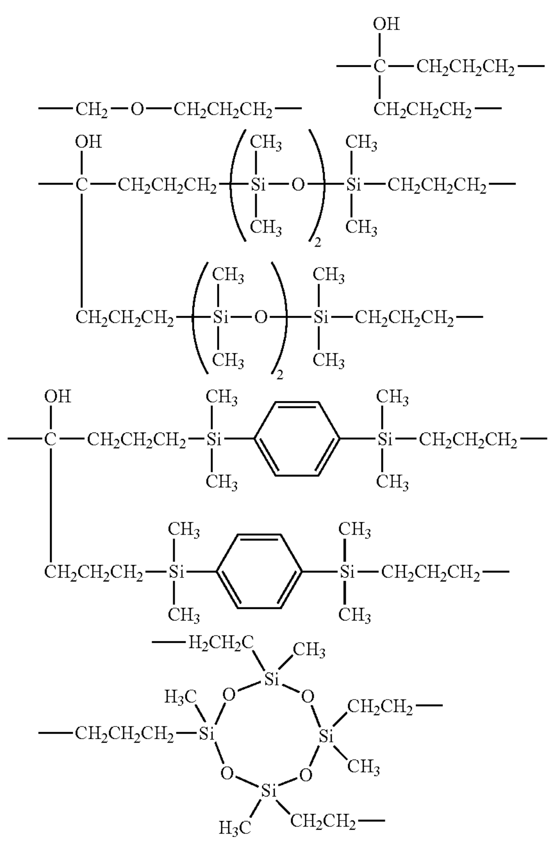

[Chem. 46]

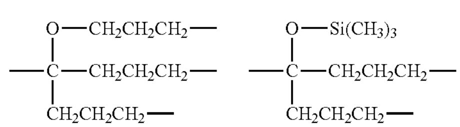

-continued

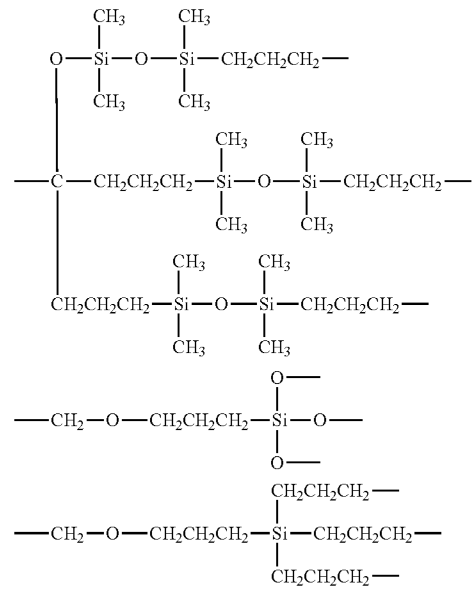

[Chem. 47]

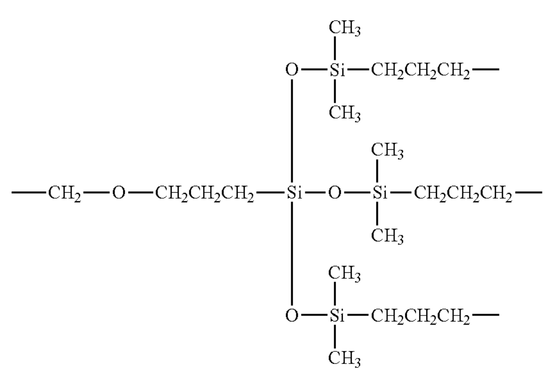

[Chem. 48]

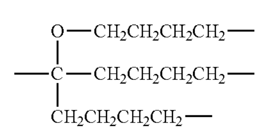

-continued

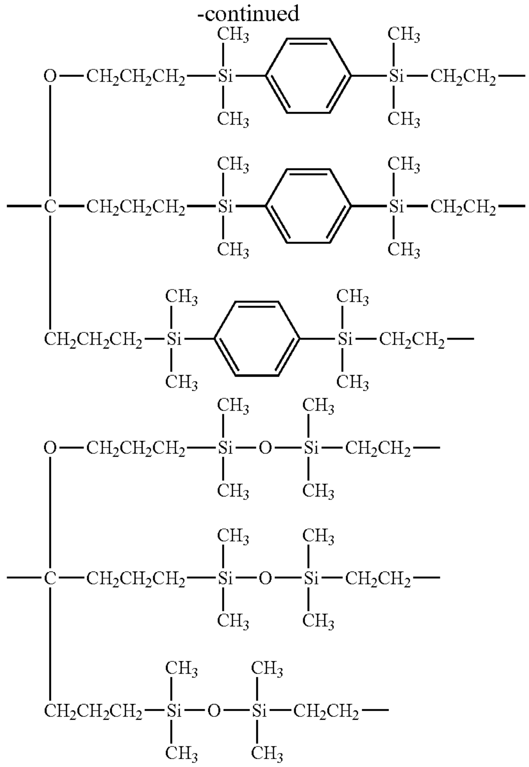

[Chem. 49]

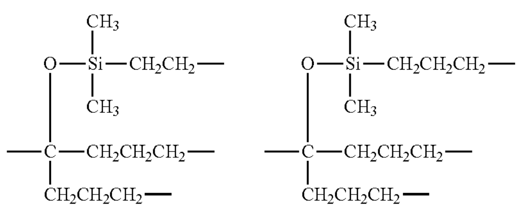

[Chem. 50]

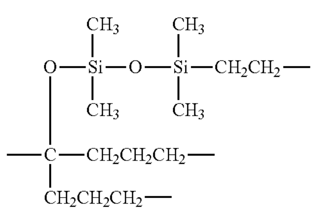

[Chem. 51]

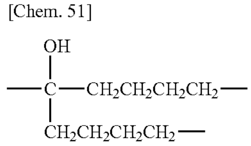

In formula (4), Y is a di- to hexavalent, preferably di- to tetravalent, more preferably divalent, hydrocarbon group which may contain a silicon atom and/or siloxane bond.

Specifically, Y is a $C_3$-$C_{10}$ alkylene group such as propylene (trimethylene or methylethylene), butylene (tetramethylene or methylpropylene) or hexamethylene, a $C_2$-$C_8$ alkylene group containing $C_6$-$C_8$ arylene like phenylene (e.g., alkylene-arylene groups of 8 to 16 carbon atoms), a divalent group having $C_2$-$C_8$ alkylene moieties bonded via a $C_1$-$C_4$ silalkylene structure or $C_6$-$C_{10}$ silarylene structure, or a di- to hexavalent group having a $C_2$-$C_{10}$ alkylene moiety bonded to the valence bond of a di- to hexavalent linear, branched or cyclic organopolysiloxane residue of 2 to 10 silicon atoms, preferably 2 to 5 silicon atoms; preferably a $C_3$-$C_{10}$ alkylene group, a $C_2$-$C_6$ alkylene group containing phenylene, a divalent group having $C_2$-$C_4$ alkylene moieties bonded via a $C_1$-$C_4$ silalkylene or $C_6$-$C_{10}$ silarylene structure, a di- to tetravalent group having a $C_2$-$C_{10}$ alkylene moiety bonded to the valence bond of a di- to tetravalent linear organopolysiloxane residue of 2 to 10 silicon atoms, or a di- to tetravalent group having a $C_2$-$C_{10}$ alkylene moiety bonded to the valence bond of a di- to tetravalent branched or cyclic organopolysiloxane residue of 3 to 10 silicon atoms; most preferably a $C_3$-$C_6$ alkylene group.

The silalkylene or silarylene structure is exemplified by the following structure.

[Chem. 52]

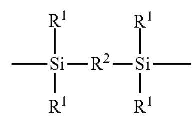

Herein $R^1$ which may be the same or different is a $C_1$-$C_4$ alkyl group such as methyl, ethyl, propyl or butyl, or a $C_6$-$C_{10}$ aryl group such as phenyl. $R^2$ is a $C_1$-$C_4$ alkylene group such as methylene, ethylene, or propylene (trimethylene, methylethylene), or a $C_6$-$C_{10}$ arylene group such as phenylene.

Examples of the di- to hexavalent linear, branched or cyclic organopolysiloxane residue of 2 to 10 silicon atoms, preferably 2 to 5 silicon atoms are shown below.

[Chem. 53]

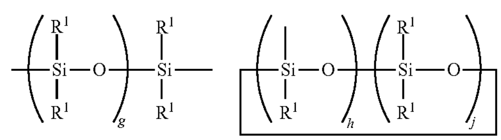

[Chem. 54]

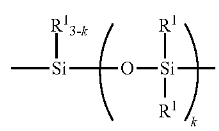

Herein $R^1$ is as defined above, g is an integer of 1 to 9, preferably 1 to 4, h is an integer of 2 to 6, preferably 2 to 4, j is an integer of 0 to 8, preferably 0 or 1, h+j is an integer of 3 to 10, preferably 3 to 5, and k is an integer of 1 to 3, preferably 2 or 3.

Exemplary of Y are groups as shown below.

[Chem. 55]

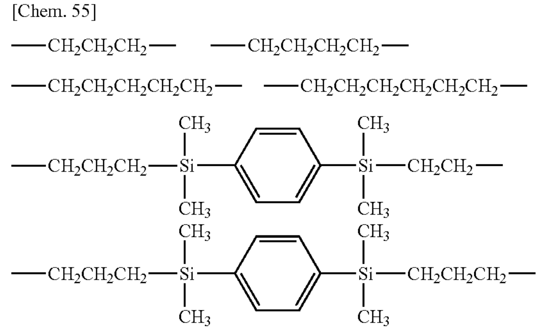

-continued

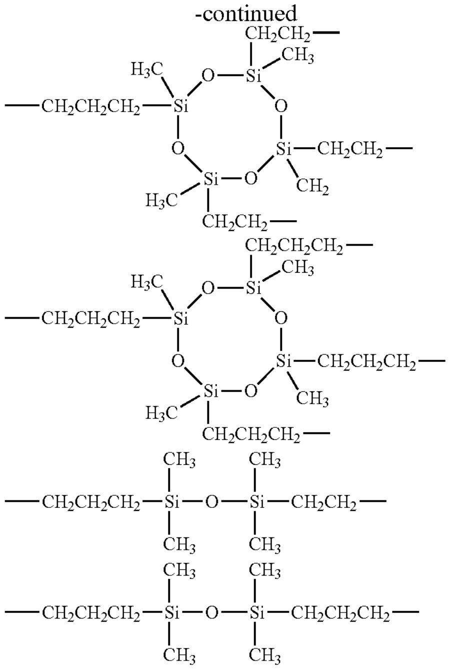

In formula (4), W is hydrogen or a group having the formula (4a).

[Chem. 56]

(4a)

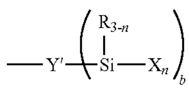

Herein R, X and n are as defined above. Y' is a di- to hexavalent hydrocarbon group which may contain a silicon atom and/or siloxane bond, and b is an integer of 1 to 5, preferably 1 to 3, more preferably 1.

In formula (4a), Y' is a di- to hexavalent, preferably di- to tetravalent, more preferably divalent, hydrocarbon group which may contain a silicon atom and/or siloxane bond.

Specifically, Y' is a $C_2$-$C_{10}$ alkylene group such as ethylene, propylene (trimethylene or methylethylene), butylene (tetramethylene or methylpropylene) or hexamethylene, a $C_2$-$C_8$ alkylene group containing $C_6$-$C_8$ arylene like phenylene (e.g., alkylene-arylene groups of 8 to 16 carbon atoms), a $C_2$-$C_6$ alkylene group containing diorganosilylene such as dimethylsilylene or diethylsilylene, a divalent group having $C_2$-$C_8$ alkylene moieties bonded via a $C_1$-$C_4$ silalkylene or $C_6$-$C_{10}$ silarylene structure, a $C_2$-$C_6$ alkylene group containing di- to hexavalent linear, branched or cyclic organopolysiloxane residue of 2 to 10 silicon atoms, preferably 2 to 5 silicon atoms, or a di- to hexavalent group having a $C_2$-$C_{10}$ alkylene moiety bonded to the valence bond of a di- to hexavalent linear, branched or cyclic organopolysiloxane residue of 2 to 10 silicon atoms, preferably 2 to 5 silicon atoms; preferably a $C_3$-$C_{10}$ alkylene group, a $C_2$-$C_6$ alkylene group containing phenylene, a $C_2$-$C_6$ alkylene group containing dimethylsilylene, a divalent group having $C_2$-$C_4$ alkylene moieties bonded via a $C_1$-$C_4$ silalkylene or $C_6$-$C_{10}$ silarylene structure, a $C_2$-$C_6$ alkylene group containing divalent linear organopolysiloxane residue of 2 to 10 silicon atoms, a di- to tetravalent group having a $C_2$-$C_{10}$ alkylene moiety bonded to the valence bond of a di- to tetravalent linear organopolysiloxane residue of 2 to 10 silicon atoms or a di- to tetravalent group having a $C_2$-$C_{10}$ alkylene moiety bonded to the valence bond of a di- to tetravalent branched or cyclic organopolysiloxane residue of 3 to 10 silicon atoms; most preferably a $C_3$-$C_6$ alkylene group.

Examples of the silalkylene structure, silarylene structure, di- to hexavalent linear, branched or cyclic organopolysiloxane residue of 2 to 10 silicon atoms, preferably 2 to 5 silicon atoms are as exemplified above.

Exemplary of Y' are groups as shown below.

[Chem. 57]

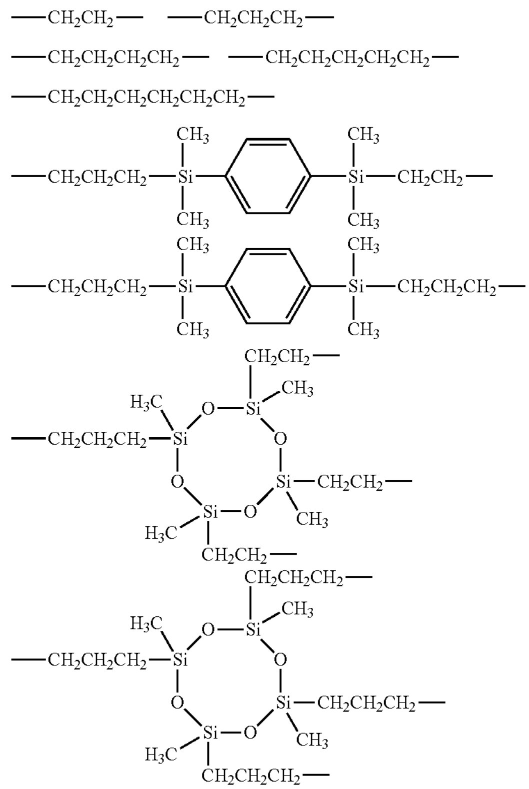

[Chem. 58]

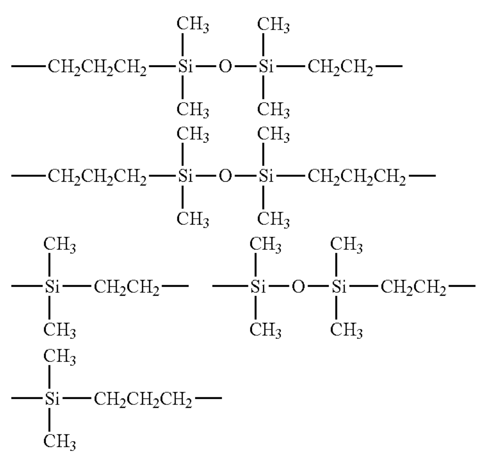

In formula (5), A' is a $C_2$-$C_6$ divalent hydrocarbon group, typically alkylene group, which may contain an ether bond. Examples thereof are shown below.

—$CH_2CH_2$—

—$CH_2CH_2CH_2$—

—$CH_2CH_2CH_2CH_2$—

$CH_2$—O—$CH_2CH_2CH_2$—

—$CH_2CH_2CH_2CH_2CH_2$—

[Chem. 59]

In formula (5), $B^1$ is independently a $C_1$-$C_5$ alkylene group which may contain at least one member selected from oxygen atom, diorganosilylene groups such as dimethylsilylene, and diorganosiloxane structures such as dimethylsiloxane. Examples thereof are shown below.

[Chem. 60]

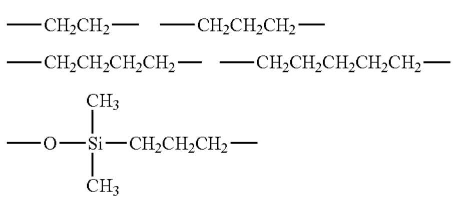

-continued

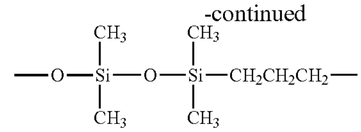

In formulae (1), (4) and (5), R is a $C_1$-$C_4$ alkyl group such as methyl, ethyl, propyl or butyl, or phenyl.

X is a hydroxyl or hydrolyzable group. Exemplary groups of X include hydroxyl, $C_1$-$C_{10}$ alkoxy groups such as methoxy, ethoxy, propoxy, and butoxy, $C_2$-$C_{10}$ alkoxylalkoxy groups such as methoxymethoxy and methoxyethoxy, $C_1$-$C_{10}$ acyloxy groups such as acetoxy, $C_2$-$C_{10}$ alkenyloxy groups such as isopropenoxy. Inter alia, methoxy and ethoxy are preferred.

The subscript n is an integer of 1 to 3, preferably 2 or 3, most preferably 3; m is an integer of 1 to 6, preferably 1 to 4; a is an integer of 1 to 5, preferably 1 to 3, most preferably 1; and α is 1 or 2.

The hydrolyzable group-containing organosilicon compound modified with a fluorooxyalkylene-containing polymer residue, represented by formula (1), is exemplified by the following structures.

[Chem. 61]

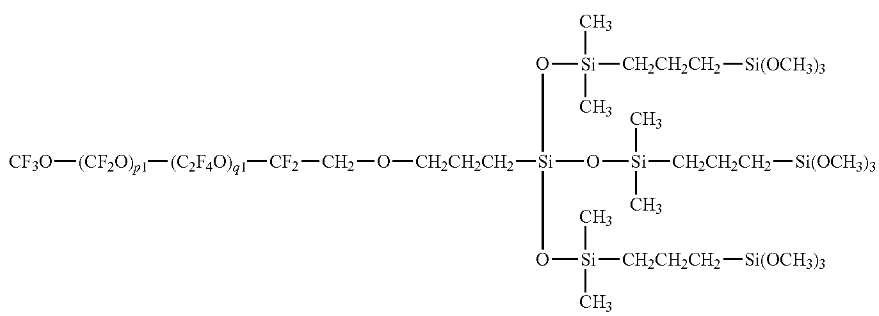

[Chem. 62]

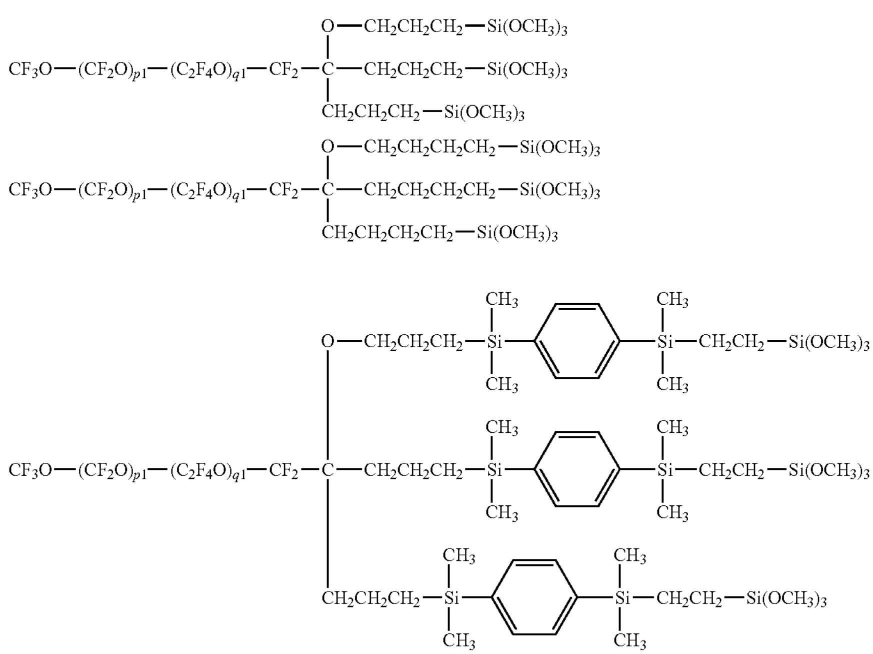

-continued
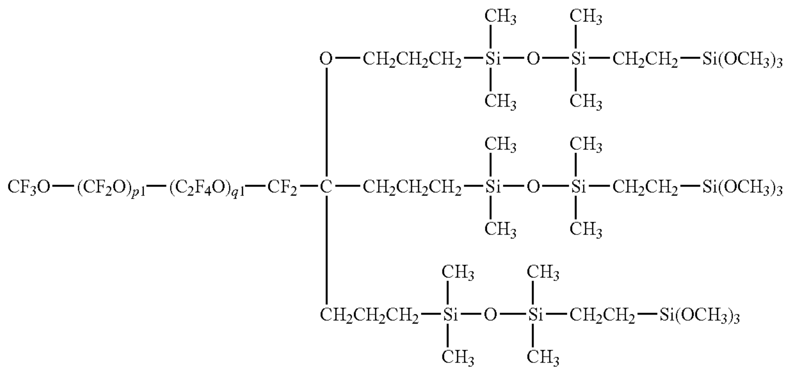
[Chem. 63]
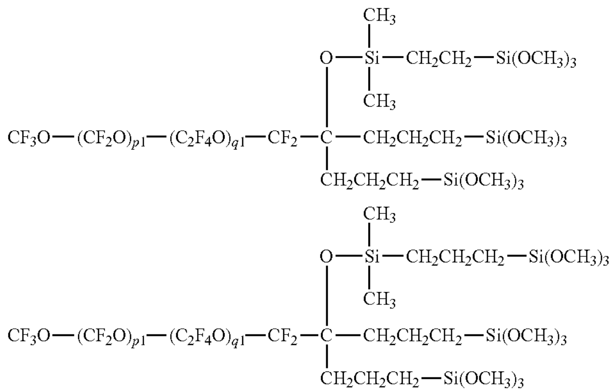
[Chem. 64]
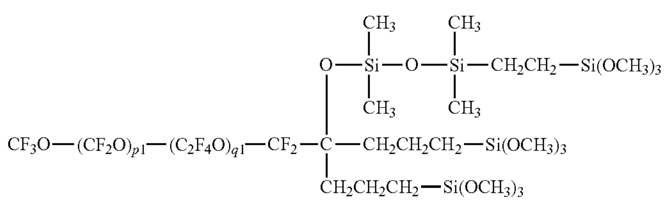
[Chem. 65]
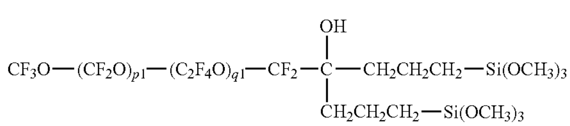
[Chem. 66]
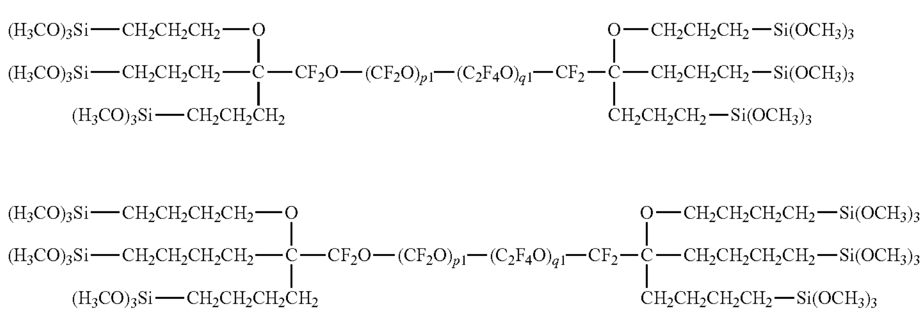

-continued

[Chem. 67]

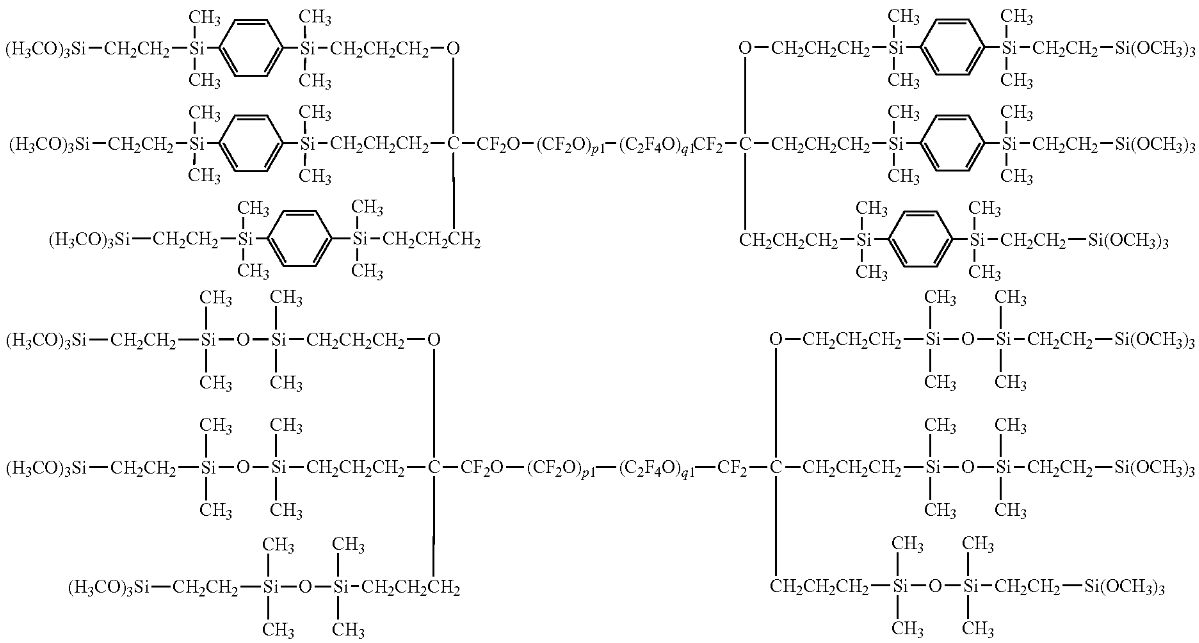

[Chem. 68]

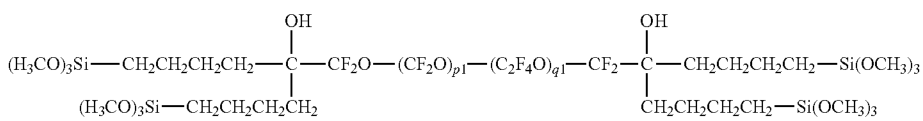

[Chem. 69]

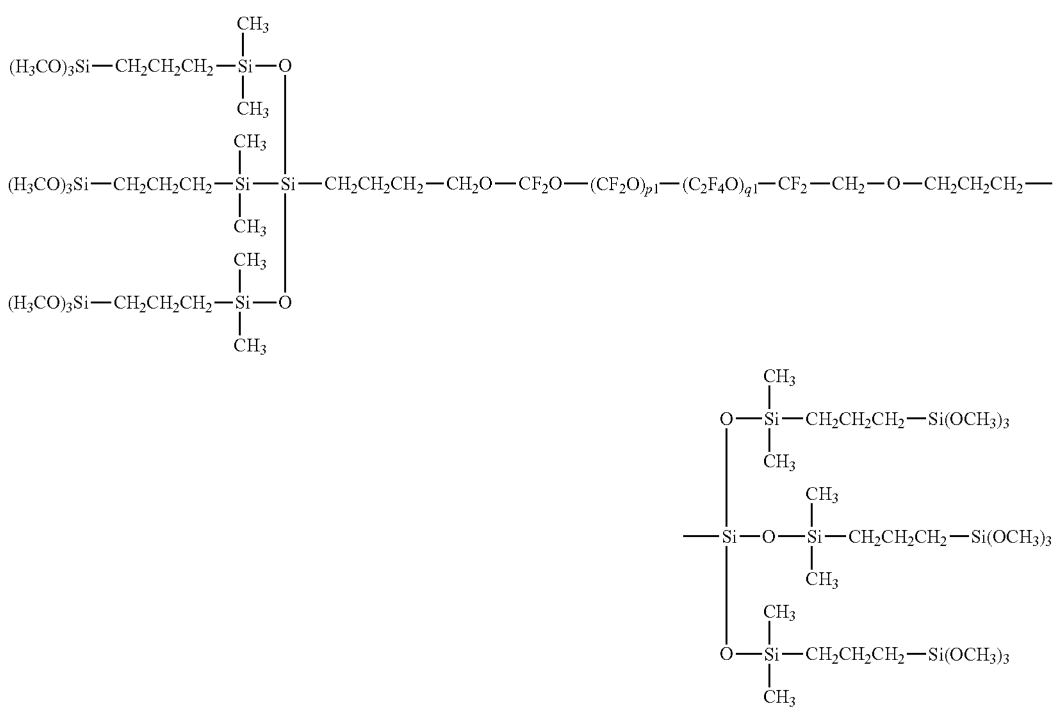

Herein p1 is an integer of 5 to 100, q is an integer of 5 to 100, p1+q1 is an integer of 10 to 105. Individual units in parentheses may be randomly bonded.

It is noted that the organosilicon compound containing a hydroxyl or hydrolyzable group, modified with a fluorooxyalkylene-containing polymer residue, represented by formula (4), may be prepared by the methods described in JP-A 2015-199906 and JP-A 2016-204656; and the organosilicon compound containing a hydroxyl or hydrolyzable group, modified with a fluorooxyalkylene-containing polymer residue, represented by formula (5), may be prepared by the method described in International Patent Application PCT/JP 2016-080666.

Component (B)

Component (B) is an organosilicon compound containing a hydroxyl or hydrolyzable group and a polyether group, modified with a fluorooxyalkylene-containing polymer residue, and/or a partial (hydrolytic) condensate thereof, preferably an organosilicon compound containing a hydroxyl or hydrolyzable group and a polyether group, modified with a fluorooxyalkylene-containing polymer residue, represented by the general formula (2) or (3):

$$Rf\text{-}[N(V)_{\beta}(E)_{\gamma}]_{\alpha} \quad (2)$$

wherein Rf and α are as defined above, N is independently an optionally fluorinated, tri- to octavalent organic group which may contain oxygen, silicon or nitrogen, V is independently a monovalent group terminated with a hydroxyl or hydrolyzable group, E is independently a monovalent group containing oxyalkylene, β is an integer of 1 to 6, γ is an integer of 1 to 6, β+γ is an integer of 2 to 7, $$Rf\text{-}[Q\text{-}(G)_{\delta}\text{-}(E')_{\varepsilon}\text{-}B]_{\alpha} \quad (3)$$

wherein Rf and α are as defined above, Q is independently a single bond or divalent organic group, G is independently a divalent group having a hydroxyl or hydrolyzable group, E' is independently an oxyalkylene-containing divalent group which may contain a hydroxyl or hydrolyzable group, B is independently hydrogen, $C_1$-$C_4$ alkyl or halogen, δ is independently an integer of 0 to 10, ε is independently an integer of 1 to 10, with the proviso that G and E' are linearly linked, and G and E' individually may be randomly arranged, and/or a partial (hydrolytic) condensate thereof.

It is noted that components (A) and (B) differ in that component (A) is a compound containing only a fluoropolyether group (fluorooxyalkylene group), but not an unsubstituted polyether group whereas component (B) is a compound containing a polyether group (i.e., unsubstituted polyether group) as well as a fluoropolyether group.

In formulae (2) and (3), Rf and α are as defined and exemplified above for Rf and α in formula (1).

In formula (2), N is an optionally fluorinated, tri- to octavalent organic group which may contain oxygen, silicon or nitrogen. The tri- to octavalent organic group is represented by the formula: $\text{-}(J)_t\text{-}M(\text{-})_w$ wherein J is a divalent organic group, M is a group selected from a tri- or tetravalent group containing a carbon and/or silicon atom, and a tri- to octavalent siloxane residue, t is 0 or 1, w is an integer of 2 to 7, preferably 2 to 5, the combination of J and M is not particularly limited.

J is a divalent organic group which is a linking group between Rf and M. Preferably J is a substituted or unsubstituted $C_2$-$C_{12}$ divalent organic group which may contain at least one structure selected from an amide bond, ether bond, ester bond, a diorganosilylene group (such as dimethylsilylene, diethylsilylene or diphenylsilylene), a group of the formula: —Si[—OH][—$(CH_2)_f$—$Si(CH_3)_3$]— wherein f is an integer of 2 to 4, and a diorganosiloxane group, more preferably a substituted or unsubstituted $C_2$-$C_{12}$ divalent hydrocarbon group which may contain said structure.

Examples of the substituted or unsubstituted $C_2$-$C_{12}$ divalent hydrocarbon group include alkylene groups such as methylene, ethylene, propylene (trimethylene, methylethylene), butylene (tetramethylene, methylpropylene), hexamethylene and octamethylene; arylene groups such as phenylene; and combinations of at least two of the foregoing (e.g., alkylene-arylene groups), and substituted forms of the foregoing in which some or all of the hydrogen atoms are substituted by halogen atoms such as fluorine. Inter alia, unsubstituted or substituted $C_2$-$C_4$ alkylene groups and phenylene groups are preferred.

Examples of J are groups as shown below.

[Chem. 70]

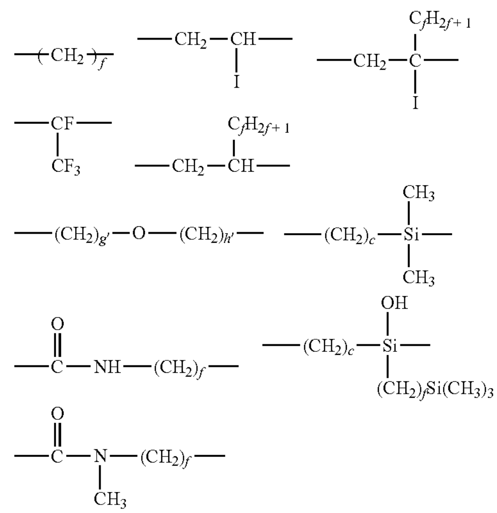

[Chem. 71]

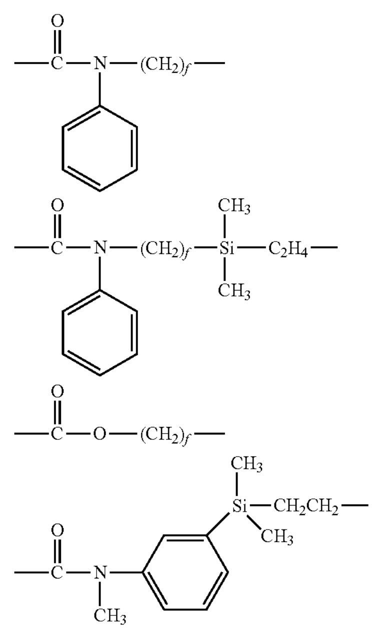

[Chem. 72]

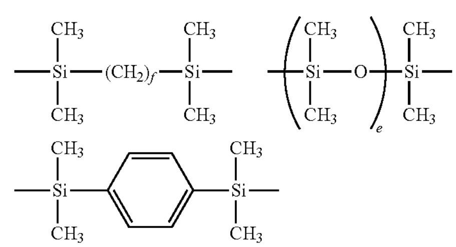

Herein f and c each are an integer of 2 to 4, g' and h' each are an integer of 1 to 4, and e is an integer of 1 to 50.

M is selected from a tri- or tetravalent group containing a carbon and/or silicon atom, and a tri- to octavalent siloxane residue. Specifically M is selected from among a trivalent group having the formula: -TC≡ wherein T is independently an alkyl group of preferably 1 to 3 carbon atoms, an alkenyl group of preferably 2 or 3 carbon atoms, a hydroxyl group, or a silylether group having the formula: $K_3SiO$— (wherein K is independently hydrogen, alkyl group of preferably 1 to 3 carbon atoms, aryl group such as phenyl, alkoxy group of preferably 1 to 3 carbon atoms, or chloro), a trivalent group having the formula: -TSi≡ wherein T is as defined above, a tetravalent group having the formula: a tetravalent group having the formula: and a tri- to octavalent siloxane residue. Where a siloxane bond is included, M is preferably a linear, branched or cyclic organopolysiloxane residue of 2 to 13 silicon atoms, preferably 2 to 5 silicon atoms. Such a group may contain a silalkylene structure wherein two silicon atoms are linked by an alkylene group, that is, Si—$(CH_2)_x$—Si wherein x is an integer of 2 to 6.

Of the organopolysiloxane residues, those containing an alkyl group of 1 to 8 carbon atoms, preferably 1 to 4 carbon atoms such as methyl, ethyl, propyl or butyl, or a phenyl group are desirable. The alkylene group in the silalkylene structure is preferably of 2 to 6 carbon atoms, more preferably 2 to 4 carbon atoms.

Examples of M are groups as shown below.

[Chem. 73]

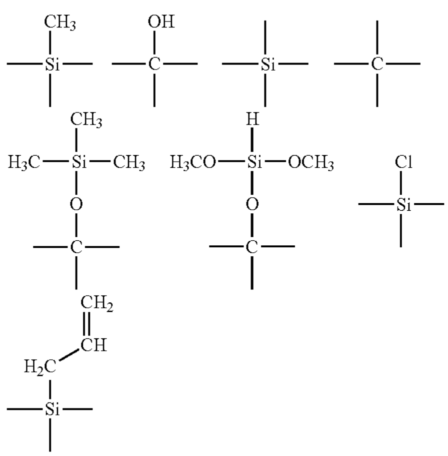

[Chem. 74]

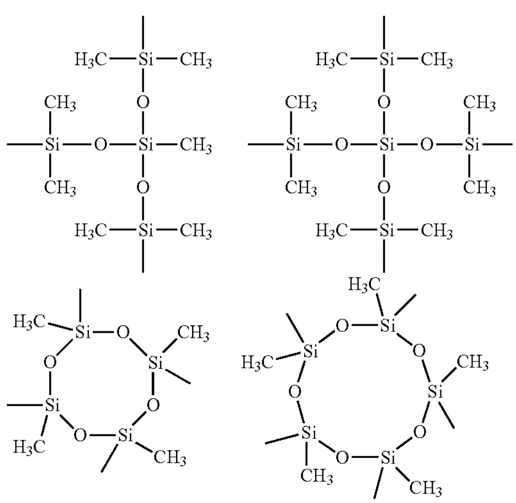

-continued

[Chem. 75]

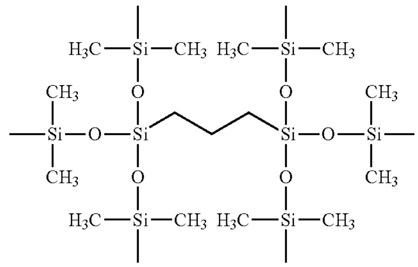

In formula (2), V is independently a monovalent group terminated with a hydroxyl or hydrolyzable group, preferably a monovalent organic group having a plurality of hydroxyl or hydrolyzable groups incorporated therein. Examples of V include groups having the following formulae (9a) to (9f).

[Chem. 76]

(9a)

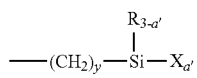

(9b)

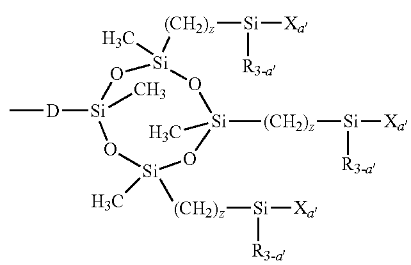

(9c)

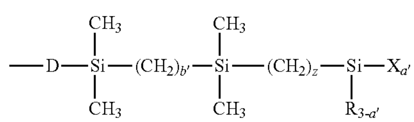

[Chem. 77]

(9d)

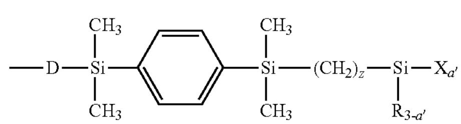

(9e)

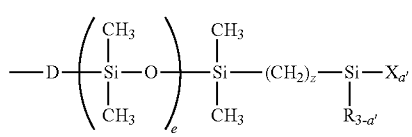

(9f)

$$-X^1$$

Herein R and X are as defined above, $X^1$ is a hydrolyzable group, a' is 2 or 3, y is an integer of 0 to 10, z is independently an integer of 1 to 10, D is a single bond or a $C_1$-$C_{20}$ divalent organic group which may be substituted with fluorine, b' is an integer of 2 to 6, and e is an integer of 1 to 50.

In formula (9f), $X^1$ is a hydrolyzable group, examples of which are as exemplified for the hydrolyzable group X. Inter alia, methoxy and ethoxy are preferred. Preferably, $X^1$ bonds with the (terminal) silicon atom in M to form the structure: ≡Si—$X^1$.

In formulae (9b) to (9e), D is a single bond or a divalent organic group of 1 to 20 carbon atoms, preferably 2 to 8 carbon atoms, which may be substituted with fluorine, preferably divalent hydrocarbon group. Examples of the divalent hydrocarbon group include alkylene groups such as methylene, ethylene, propylene (trimethylene, methylethylene), butylene (tetramethylene, methylpropylene), hexamethylene, and octamethylene, arylene groups such as phenylene, or combinations of at least two of the foregoing (e.g., alkylene-arylene groups), and substituted forms of the foregoing in which some or all of the hydrogen atoms are substituted by fluorine atoms. D is preferably ethylene, propylene or phenylene.

In formulae (9a) to (9e), y is an integer of 0 to 10, preferably 2 to 8, z is an integer of 1 to 10, preferably 2 to 8, b' is an integer of 2 to 6, preferably 2 to 4, and e is an integer of 1 to 50, preferably 1 to 10.

In formula (2), E is independently a monovalent group containing oxyalkylene, represented by the formula: —Z'(-$(LO)_l$-R$)_{f'}$, wherein Z' is an oxygen atom or a di- or trivalent group which is a combination of X' with an oxygen atom, X' is a di- or trivalent $C_2$-$C_{20}$ group which may contain a silicon atom, siloxane bond, silalkylene bond or silarylene bond and which may contain a hydroxyl or hydrolyzable group on the silicon atom. Examples of Z' include —O—, —O—X'—O—, —X'—O—, and —X'(—O—$)_2$, with an oxygen atom (—O—) being preferred. L is independently a $C_1$-$C_4$ alkylene group such as methylene, ethylene, propylene or butylene, which may be used alone or in admixture, 1 is an integer of 1 to 20, preferably 1 to 10. R is independently a $C_1$-$C_4$ alkyl group such as methyl, ethyl, propyl or butyl, or a phenyl group, as mentioned above, preferably methyl, and f' is 1 or 2.

Examples of E are groups as shown below.

[Chem. 78]

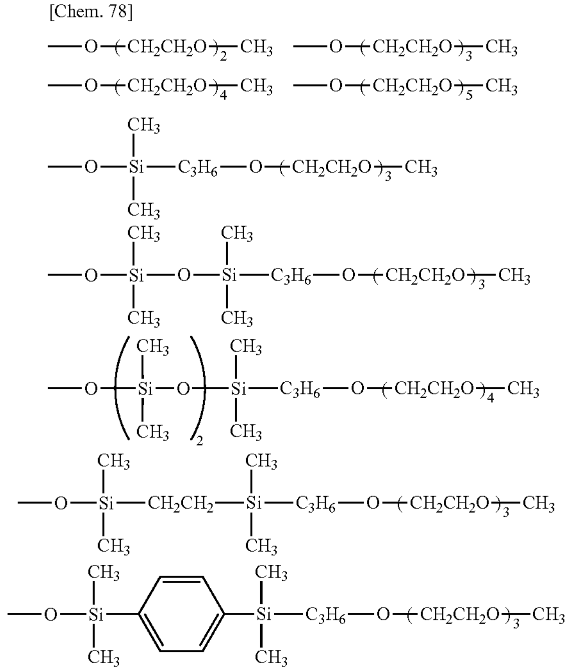

-continued

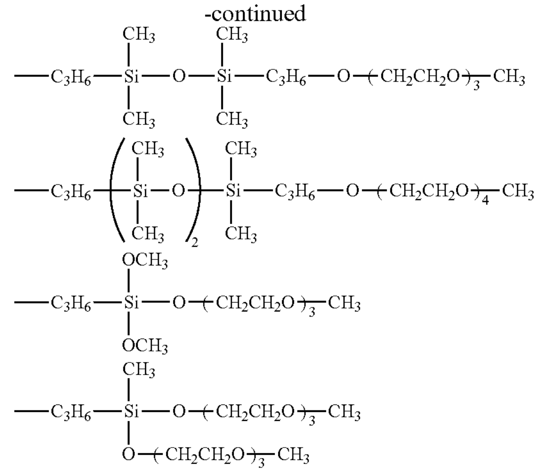

[Chem. 79]

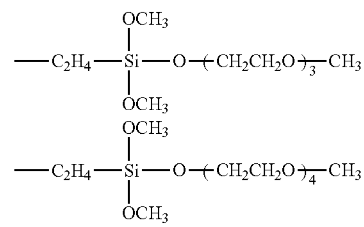

In formula (2), β is an integer of 1 to 6, preferably 1 or 2, γ is an integer of 1 to 6, preferably 1 or 2, and β+γ is an integer of 2 to 7, preferably 2 or 3.

In formula (3), Q is independently a single bond or divalent organic group, which is to link the group Rf to the group G or E'. The divalent organic group is preferably a substituted or unsubstituted $C_2$-$C_{12}$ divalent organic group which may contain at least one structure selected from the group consisting of an amide bond, ether bond, ester bond, a diorganosilylene group such as dimethylsilylene, a group of the formula: —Si[—OH][—$(CH_2)_f$—$Si(CH_3)_3$]— wherein f is an integer of 2 to 4, and a diorganosiloxane group, more preferably a substituted or unsubstituted $C_2$-$C_{12}$ divalent hydrocarbon group which may contain the above structure.

Examples of the substituted or unsubstituted $C_2$-$C_{12}$ divalent hydrocarbon group include alkylene groups such as methylene, ethylene, propylene (trimethylene, methylethylene), butylene (tetramethylene, methylpropylene), hexamethylene, octamethylene; arylene groups such as phenylene; and combinations of at least two of the foregoing (e.g., alkylene-arylene groups), and substituted forms of the foregoing in which some or all of the hydrogen atoms are substituted by halogen atoms such as fluorine. Inter alia, unsubstituted or substituted $C_2$-$C_4$ alkylene groups and phenylene groups are preferred.

Exemplary of the divalent organic group Q are groups as shown below.

[Chem. 80]

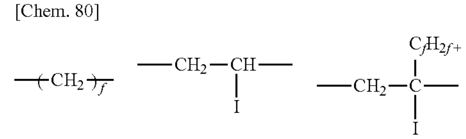

-continued

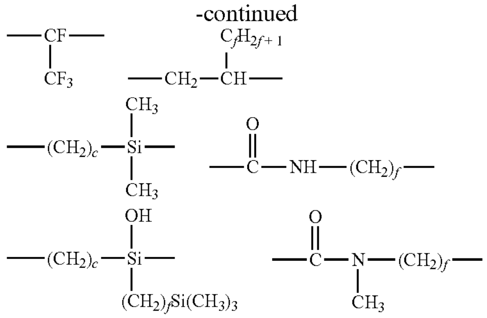

[Chem. 81]

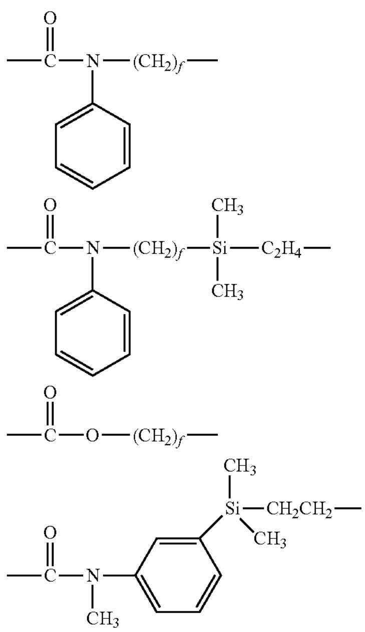

[Chem. 82]

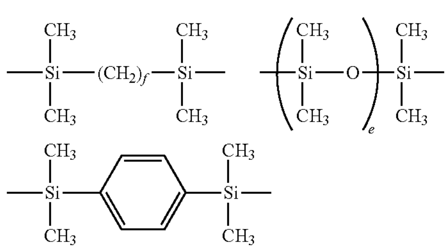

Herein f is an integer of 2 to 4, c is an integer of 2 to 4, and e is an integer of 1 to 50.

In formula (3), G is independently a divalent group having a hydroxyl or hydrolyzable group, examples of which are given below.

[Chem. 83]

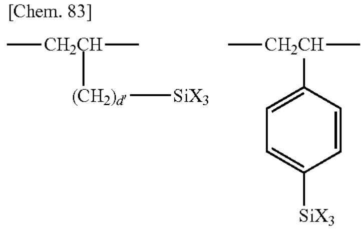

-continued

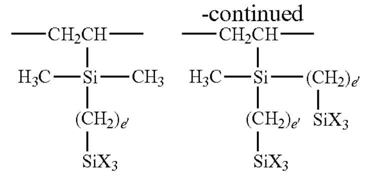

[Chem. 84]

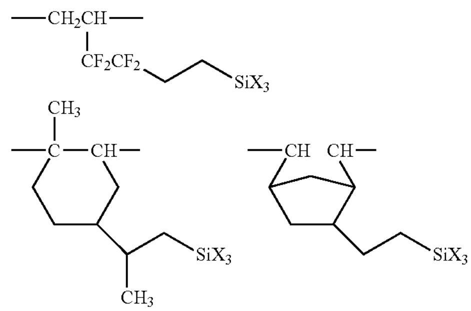

Herein X is as defined above, d' is an integer of 0 to 10, preferably 1 to 8, e' is an integer of 2 to 10, preferably 3 to 8.

In formula (3), E' is independently an oxyalkylene-containing divalent group which may contain a hydroxyl or hydrolyzable group. Exemplary of the divalent group are groups as shown below.

[Chem. 85]

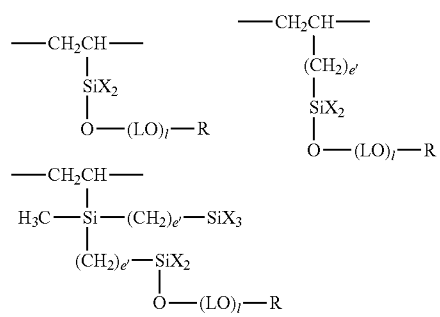

[Chem. 86]

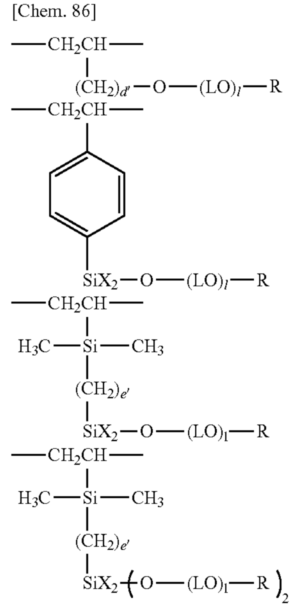

-continued

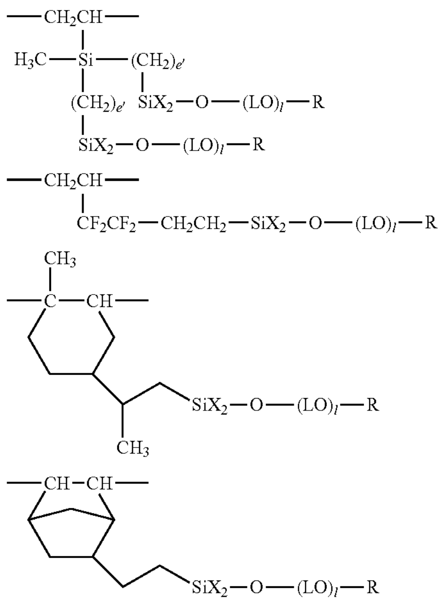

Herein X, L, l, R, d', and e' are as defined above.

In formula (3), B is independently hydrogen, a $C_1$-$C_4$ alkyl group such as methyl, ethyl, propyl or butyl, or halogen atom such as fluorine, chlorine, bromine or iodine.

In formula (3), δ is an integer of 0 to 10, preferably 1 to 4, in case of δ=0, E' has a hydroxyl or hydrolyzable group, and ε is an integer of 1 to 10, preferably 1 to 4. It is noted that G is linearly linked to E' while G and E' may be randomly arranged with each other.

The fluoropolyether-containing polymer having a hydrolyzable group and a polyether group, represented by formulae (2) and (3), is exemplified by the structures shown below. A series of fluoropolyether-containing polymers having a hydrolyzable group and a polyether group are obtained by changing a combination of Rf, N, V, E, Q, G, E' and B in formulae (2) and (3). It is noted that in the formulae shown below, p1 is an integer of 5 to 100, q1 is an integer of 5 to 100, p1+q1 is an integer of 10 to 105, r1 is an integer of 1 to 100, s1 is an integer of 1 to 100, and p1+q1+r1+s1 is an integer of 12 to 199, while appropriate values of p1+q1 and p1+q1+r1+s1 for a certain formula are shown in parentheses.

[Chem. 87]

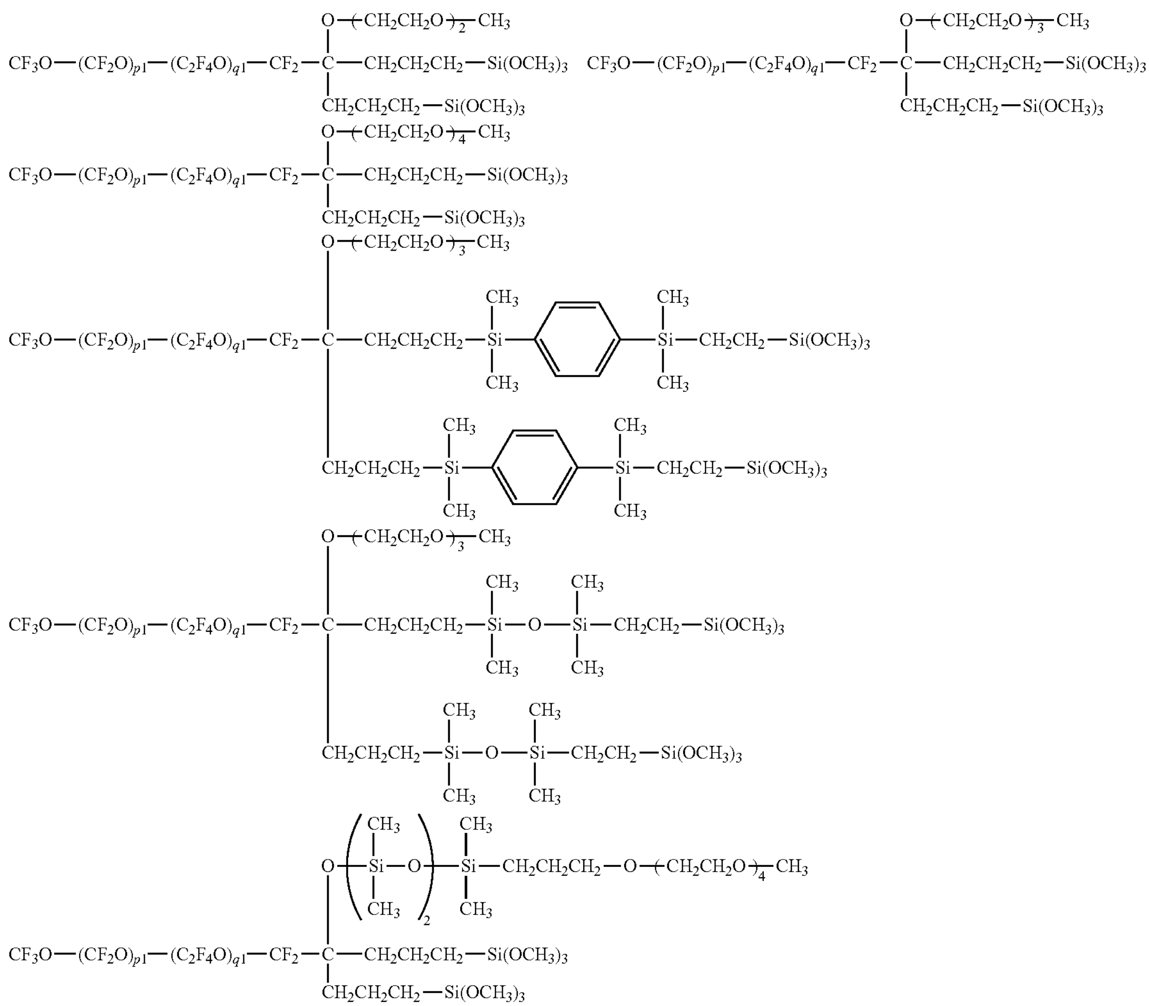

-continued
[Chem. 88]
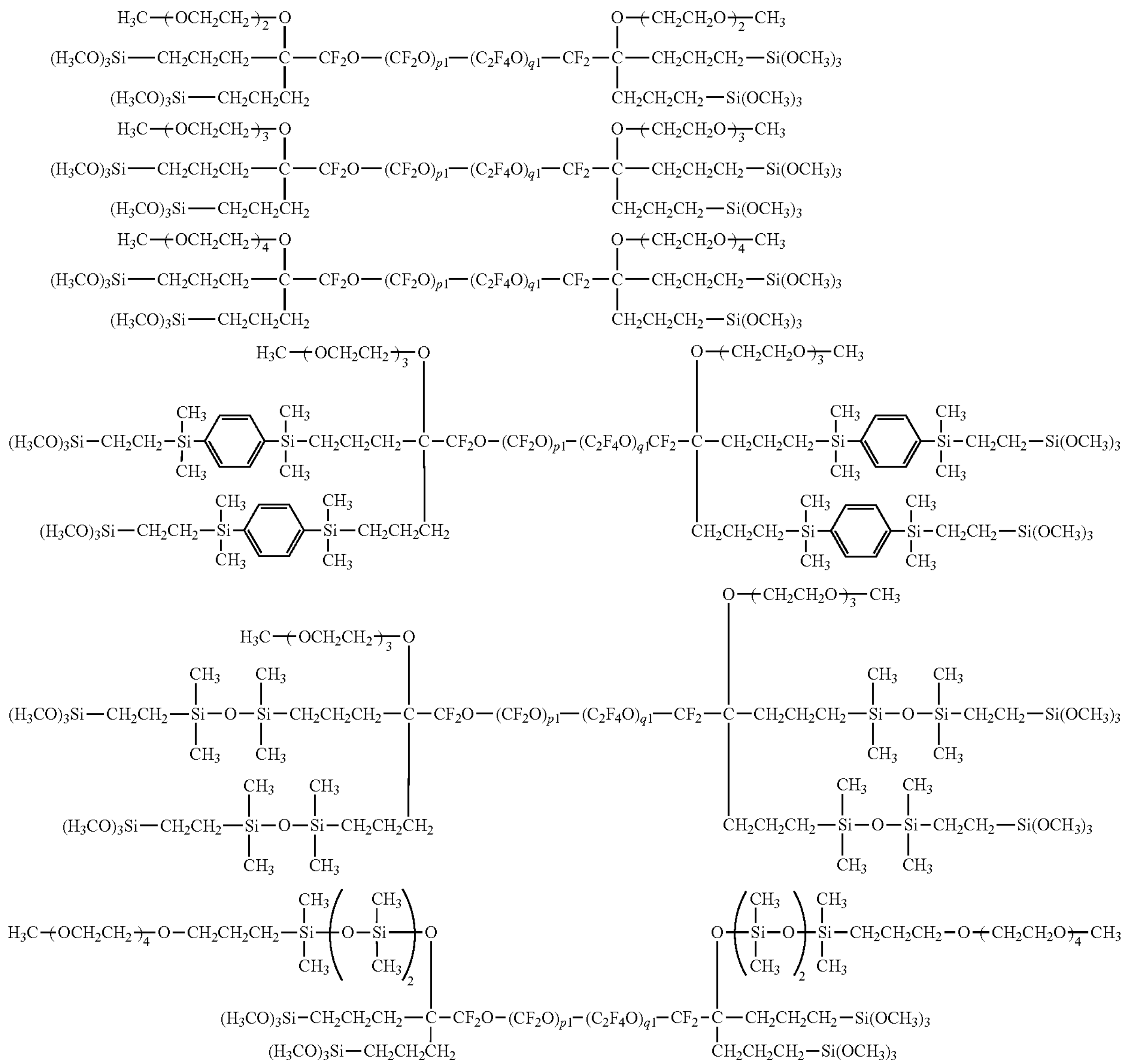
[Chem. 89]
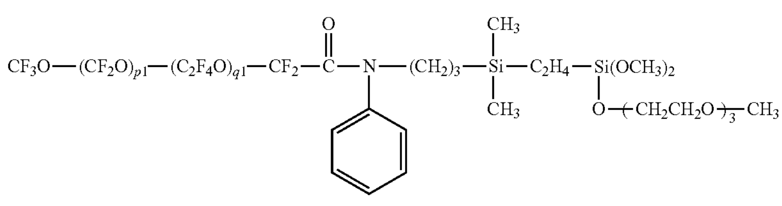
(p1 + q1≈40)
[Chem. 90]
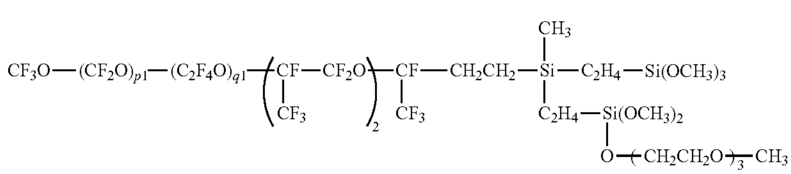
(p1 + q1≈35)

-continued
[Chem. 91]
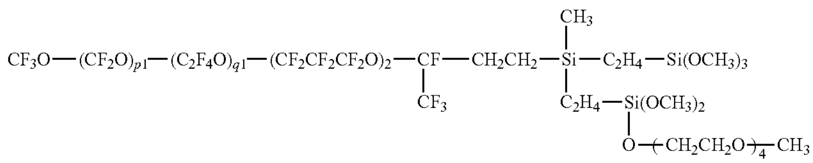
($p1 + q1 \approx 60$)
[Chem. 92]
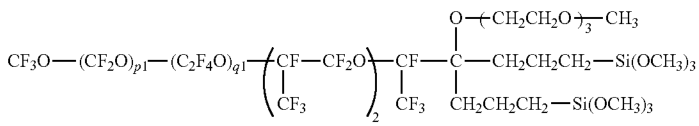
($p1 + q1 \approx 65$)
[Chem. 93]
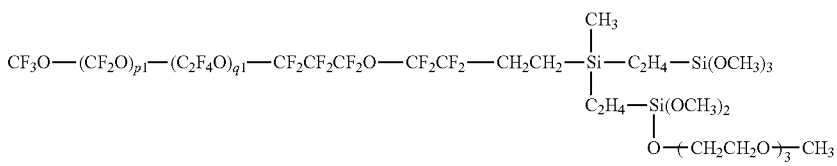
($p1 + q1 \approx 75$)
[Chem. 94]
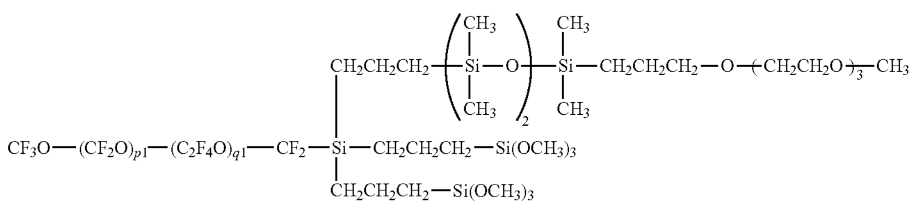
($p1 + q1 \approx 38$)
[Chem. 95]
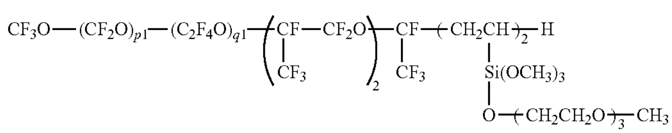
($p1 + q1 \approx 40$)
[Chem. 96]
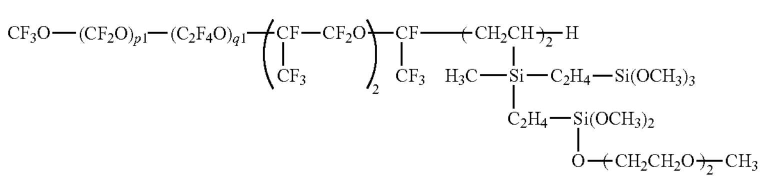
($p1 + q1 \approx 65$)
[Chem. 97]
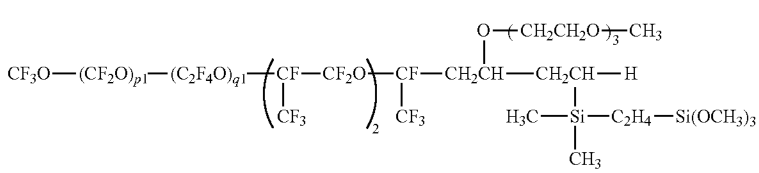
($p1 + q1 \approx 40$)

-continued
[Chem. 98]
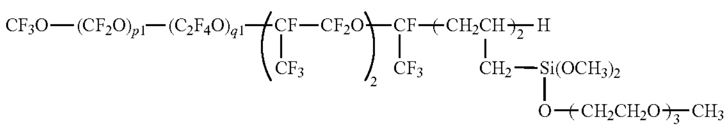
(p1 + q1≈80)
[Chem. 99]
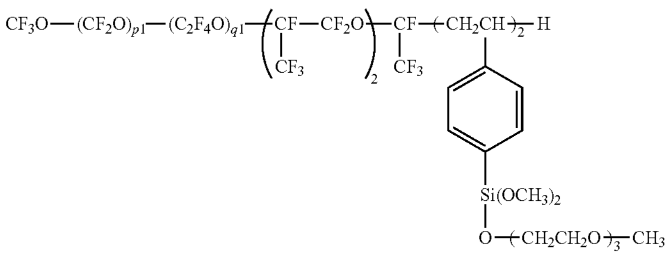
(p1 + q1≈70)
[Chem. 100]
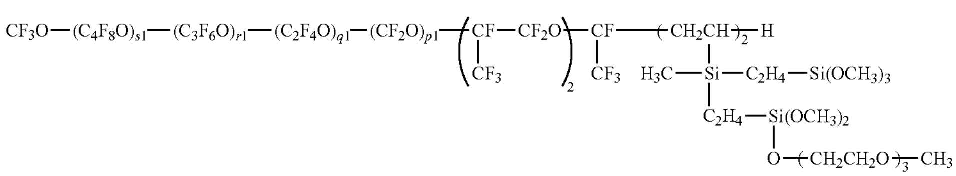
(p1 + q1 + r1 + s1≈80)
[Chem. 101]
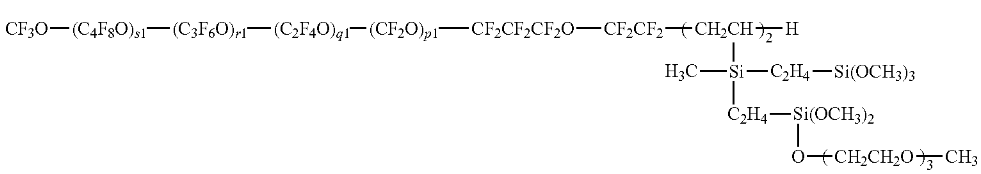
(p1 + q1 + r1 + s1≈45)
[Chem. 102]
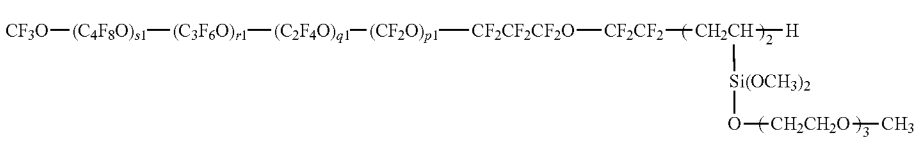
(p1 + q1 + r1 + s1≈80)
[Chem. 103]
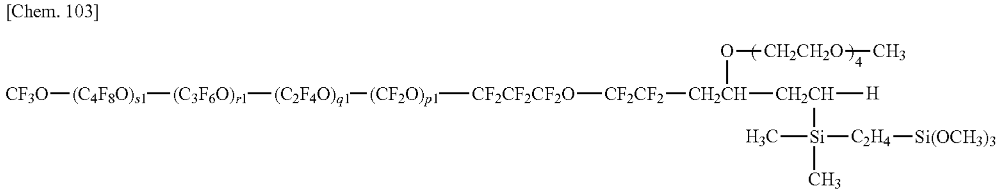
(p1 + q1 + r1 + s1≈80)
[Chem. 104]
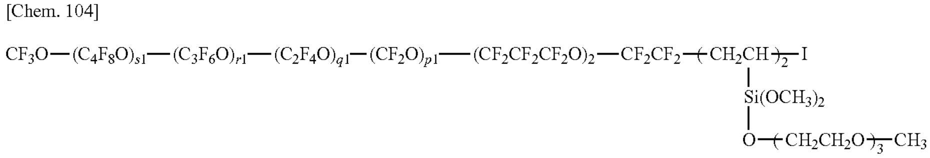
(p1 + q1 + r1 + s1≈70)

-continued

[Chem. 105]

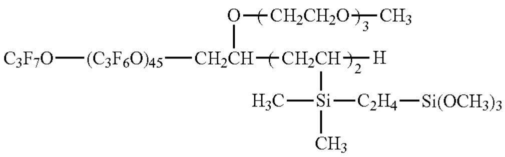

[Chem. 106]

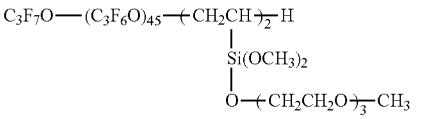

[Chem. 107]

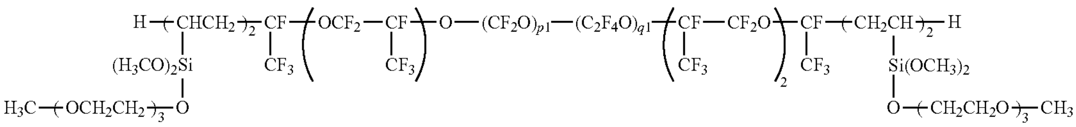

(p1 + q1≈60)

Herein individual units in parentheses may be randomly bonded.

The organosilicon compound having a hydrolyzable group and a polyether group, modified with a fluorooxyalkylene-containing polymer residue, represented by formula (2) wherein α=1, that is, Rf is a monovalent fluorooxyalkylene-containing polymer residue or α=2, that is, Rf is a divalent fluorooxyalkylene-containing polymer residue may be prepared, for example, by the following method.

A fluoropolyether-containing polymer having a polyether group and at least one olefin site at one end or both ends of the molecular chain is dissolved in a solvent such as fluorochemical solvent, typically 1,3-bis(trifluoromethyl)benzene, after which an to organosilicon compound having a SiH group and a hydrolyzable terminal group (e.g., halogen or alkoxy) in the molecule, such as trichlorosilane or trialkoxysilane is mixed therewith. The mixture is aged in the presence of a hydrosilylation catalyst such as chloroplatinic acid/vinylsiloxane complex in toluene at a temperature of 40 to 120° C., preferably 60 to 100° C., more preferably about 80° C. for a time of 1 to 72 hours, preferably 20 to 36 hours, more preferably about 24 hours. It is noted that when a SiH-containing halogenated (organo)silicon compound such as trichlorosilane is used as the organosilicon compound having a SiH group and a hydrolyzable terminal group in the molecule, the substituent (e.g., halogen) on the silyl group may then be converted to another hydrolyzable group, typically alkoxy group such as methoxy.

Examples of the fluoropolyether-containing polymer having a polyether group and at least one olefin site at one end or both ends of the molecular chain are given below.

[Chem. 108]

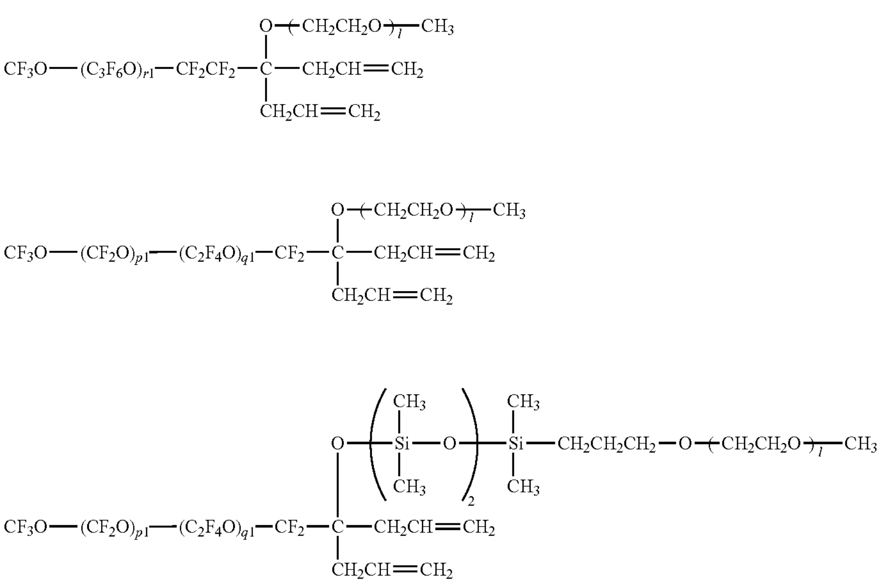

-continued

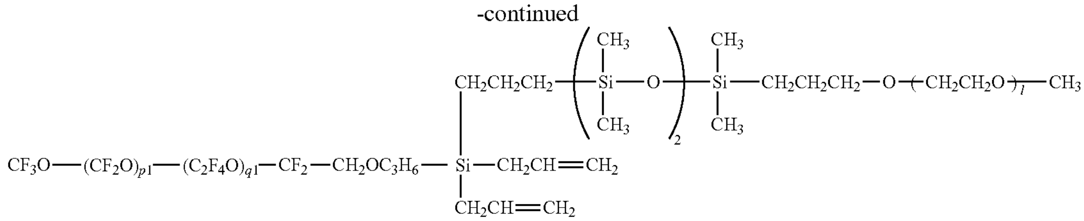

Herein 1 is as defined above, p1 is an integer of 5 to 100, q1 is an integer of 5 to 100, p1+q1 is an integer of 10 to 105, r1 is an integer of 1 to 100. Individual units in parentheses may be randomly bonded.

One method for preparing the fluoropolyether-containing polymer having a polyether group and at least one olefin site at one end or both ends of the molecular chain is, for example, by combining a fluoropolyether-containing polymer having a hydroxyl group and at least one olefin site at one end or both ends of the molecular chain and a polyether-providing agent in such amounts that the polyether-providing agent is 1 to 15 equivalents, more preferably 1.5 to 9 equivalents, even more preferably 2 to 7 equivalents per equivalent of the hydroxyl group on the fluoropolyether-containing polymer having a hydroxyl group and at least one olefin site at one end or both ends of the molecular chain, and aging the mixture in the presence of a base and optionally a solvent and a reactivity-enhancing additive, at a temperature of 0 to 90° C., preferably 50 to 80° C., more preferably 60 to 70° C. for a time of 1 to 48 hours, preferably 10 to 40 hours, more preferably 20 to 30 hours.

An alternative method for preparing the fluoropolyether-containing polymer having a polyether group and at least one olefin site at one end or both ends of the molecular chain is, for example, by combining a fluoropolyether-containing polymer having a hydroxyl group and at least one olefin site at one end or both ends of the molecular chain with an organosilicon compound having at least two SiH groups, but not a hydrolyzable terminal group in the molecule in such amounts that 7 to 30 equivalents, more preferably 5 to 20 equivalents, most preferably about 10 equivalents of the organosilicon compound having at least two SiH groups, but not a hydrolyzable terminal group in the molecule is available per equivalent of the hydroxyl group on the fluoropolyether-containing polymer having a hydroxyl group and at least one olefin site at one end or both ends of the molecular chain, and subjecting the mixture to dehydrogenation reaction in the presence of a dehydrogenation catalyst and optionally a solvent, at a temperature of 0 to 60° C., preferably 15 to 35° C., and more preferably about 25° C. for 10 minutes to 24 hours, preferably 30 minutes to 2 hours, and more preferably about 1 hour, thereby obtaining a fluoropolyether-containing polymer having a SiH group and at least one olefin site at one end or both ends of the molecular chain.

Subsequently, the fluoropolyether-containing polymer having a SiH group and at least one olefin site at one end or both ends of the molecular chain is combined with a polyether compound having an olefin site in the molecule (e.g., polyalkylene oxide compound blocked with an alkenyloxy group at one end of the molecule chain) in such amounts that 1 to 10 equivalents, more preferably 2 to 5 equivalents, most preferably about 3 equivalents of the polyether compound having an olefin site in the molecule is available per equivalent of the SiH group on the fluoropolyether-containing polymer having a SiH group and at least one olefin site at one end or both ends of the molecular chain. The compounds are dissolved in a solvent such as fluorine-containing solvent, typically 1,3-bis(trifluoromethyl)benzene and aged in the presence of a hydrosilylation catalyst such as chloroplatinic acid/vinyl siloxane complex in toluene, at a temperature of 40 to 120° C., preferably 60 to 100° C., and more preferably about 80° C. for 1 to 72 hours, preferably 20 to 36 hours, and more preferably about 24 hours.

A further alternative method for preparing the fluoropolyether-containing polymer having a polyether group and at least one olefin site at one end or both ends of the molecular chain is, for example, by dissolving a fluoropolyether-containing polymer having three olefin sites at one end or both ends of the molecular chain in a solvent such as fluorine-containing solvent, typically 1,3-bis(trifluoromethyl)benzene, mixing the solution with an organosilicon compound having a SiH group and a polyoxyalkylene group in the molecule in such amounts that ⅓ equivalent of the organosilicon compound having a SiH group and a polyoxyalkylene group in the molecule is available per equivalent of the reactive terminal group on the fluoropolyether-containing polymer having three olefin sites at one end or both ends of the molecular chain, and aging the mixture in the presence of a hydrosilylation catalyst such as chloroplatinic acid/vinyl siloxane complex in toluene, at a temperature of 40 to 120° C., preferably 60 to 100° C., more preferably about 80° C. for 1 to 72 hours, preferably 20 to 36 hours, more preferably about 24 hours for effecting reaction of some olefin sites of the fluoropolyether-containing polymer with the SiH group of the SiH-containing organosilicon compound.

Examples of the organosilicon compound having a SiH group and a hydrolyzable terminal group in the molecule include trimethoxysilane, triethoxysilane, tripropoxysilane, triisopropoxysilane, tributoxysilane, triisopropenoxysilane, triacetoxysilane, trichlorosilane, tribromosilane, and triiodosilane. Also included are silanes and siloxane compounds as shown below.

[Chem. 109]

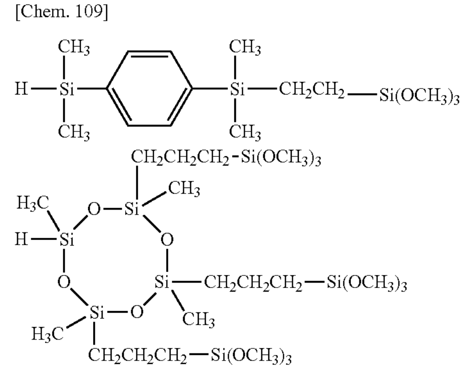

-continued

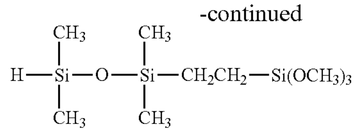

The organosilicon compound having a SiH group and a hydrolyzable terminal group in the molecule may be used in an amount of 1 to 4 equivalents, preferably 1.5 to 3 equivalents, more preferably 2 to 2.5 equivalents per equivalent of the olefin site on the fluoropolyether-containing polymer having a polyether group and at least one olefin site at one end or both ends of the molecular chain.

It is noted that when a halogenated (organo)silicon compound containing a SiH group such as trichlorosilane is used as the organosilicon compound having a SiH group and a hydrolyzable terminal group in the molecule, the substituent (halogen) on the silyl group may be subsequently converted to another hydrolyzable group such as alkoxy group, typically methoxy. Examples of the reagent which can be used in converting the substituent (halogen) on the silyl group to another hydrolyzable group include alcohols of 1 to 10 carbon atoms such as methanol, ethanol, propanol, isopropanol and butanol.

The amount of the reagent used may be 10 to 200 parts by weight, more preferably 40 to 100 parts by weight, more preferably 65 parts by weight per 100 parts by weight of the addition reaction product of the fluoropolyether-containing polymer having a polyether group and at least one olefin site at one end or both ends of the molecular chain with the halogenated (organo)silicon compound having a SiH group.

Typical of the solvent are fluorine-containing solvents. Suitable fluorine-containing solvents include 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M).

The solvent may be used in an amount of 10 to 300 parts, preferably 50 to 150 parts, and more preferably about 100 parts by weight per 100 parts by weight of the fluoropolyether-containing polymer having a polyether group and at least one olefin site at one end or both ends of the molecular chain.

Examples of the hydrosilylation catalyst include platinum group metal based catalysts such as platinum black, chloroplatinic acid, alcohol-modified chloroplatinic acid, complexes of chloroplatinic acid with olefin, aldehyde, vinyl siloxane, and acetylene alcohol, tetrakis(triphenylphosphine)palladium, and chlorotris(triphenylphosphine)rhodium. Inter alia, platinum compounds such as vinyl siloxane coordination compounds are preferred.

The hydrosilylation catalyst is preferably used in an amount to provide 0.1 to 100 ppm, more preferably 1 to 50 ppm of transition metal based on the weight of the fluoropolyether-containing polymer having a polyether group and at least one olefin site at one end or both ends of the molecular chain.

Alternatively, the organosilicon compound having a hydrolyzable group and a polyether group, modified with a fluorooxyalkylene-containing polymer residue, represented by formula (2) wherein $\alpha=1$, that is, Rf is a monovalent fluorooxyalkylene-containing polymer residue or $\alpha=2$, that is, Rf is a divalent fluorooxyalkylene-containing polymer residue may be prepared, for example, by the following method.

A fluoropolyether-containing polymer having at least one olefin site at one end or both ends of the molecular chain is dissolved in a solvent such as fluorine-containing solvent, typically 1,3-bis(trifluoromethyl)benzene. The solution is mixed with a halogenated (organo)silicon compound having a SiH group and a hydrolyzable terminal group in the molecule such as trichlorosilane. The mixture is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours. Thereafter, the substituent (e.g., halogen) on the silyl group is converted to a polyether group and another hydrolyzable group, typically methoxy.

Examples of the fluoropolyether-containing polymer having at least one olefin site at one end or both ends of the molecular chain are shown below.

[Chem. 110]

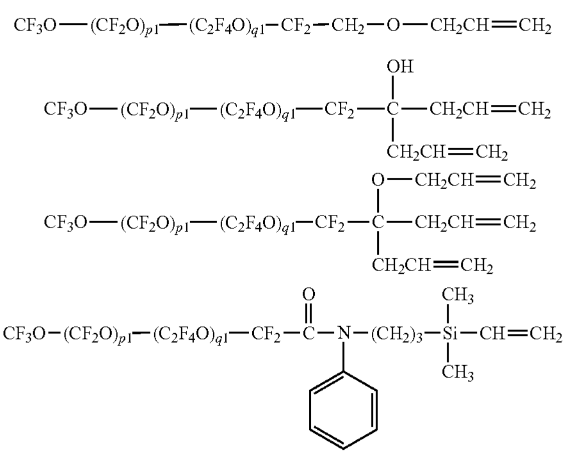

Herein p1 and q1 are as defined above. Individual units in parentheses may be randomly bonded.

Examples of the halogenated (organo)silicon compound having a SiH group and a hydrolyzable terminal group in the molecule include trichlorosilane, tribromosilane and triiodosilane.

The halogenated (organo)silicon compound having a SiH group and a hydrolyzable terminal group in the molecule may be used in an amount of 1 to 4 equivalents, preferably 1.5 to 2.5 equivalents, more preferably about 2 equivalents per equivalent of the olefin site on the fluoropolyether-containing polymer having at least one olefin site at one end or both ends of the molecular chain.

Exemplary of the polyether alcohol which can be used in converting the substituent (halogen) on the silyl group to a polyether group are polyether alcohols such as polyethylene oxides blocked with a hydroxyl group at one end and with a methoxy group at the other end of the molecular chain, as shown below.

[Chem. 111]

$$HO\!-\!(CH_2CH_2O)_l\!-\!CH_3$$

Herein 1 is as defined above.

Specific examples of the polyether alcohol include Uniox M-200, Uniox M-300 and Uniox M-400 from NOF Corp.

The polyether alcohol may be used in an amount of 5 to 100 parts by weight, preferably 20 to 50 parts by weight, more preferably 35 parts by weight per 100 parts by weight of the addition reaction product of the fluoropolyether-containing polymer having at least one olefin site at one end or both ends of the molecular chain with the halogenated (organo)silicon compound having a SiH group and a hydrolyzable group in the molecule.

Examples of the reagent which can be used in converting the substituent (halogen) on the silyl group to another hydrolyzable group include alcohols of 1 to 10 carbon atoms such as methanol, ethanol, propanol, isopropanol and butanol.

The amount of the reagent used may be 10 to 200 parts by weight, preferably 40 to 100 parts by weight, more preferably 65 parts by weight per 100 parts by weight of the addition reaction product of the fluoropolyether-containing polymer having at least one olefin site at one end or both ends of the molecular chain with the halogenated (organo) silicon compound having a SiH group and a hydrolyzable group in the molecule.

Typical of the solvent are fluorine-containing solvents. Suitable fluorine-containing solvents include 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M).

The solvent may be used in an amount of 10 to 300 parts, preferably 50 to 150 parts, and more preferably about 100 parts by weight per 100 parts by weight of the fluoropolyether-containing polymer having at least one olefin site at one end or both ends of the molecular chain.

Examples of the hydrosilylation catalyst include platinum group metal based catalysts such as platinum black, chloroplatinic acid, alcohol-modified chloroplatinic acid, complexes of chloroplatinic acid with olefin, aldehyde, vinyl siloxane, and acetylene alcohol, tetrakis(triphenylphosphine)palladium, and chlorotris(triphenylphosphine)rhodium. Inter alia, platinum compounds such as vinyl siloxane coordination compounds are preferred.

The hydrosilylation catalyst is preferably used in an amount to provide 0.1 to 100 ppm, more preferably 1 to 50 ppm of transition metal based on the weight of the fluoropolyether-containing polymer having at least one olefin site at one end or both ends of the molecular chain.

Further alternatively, the organosilicon compound having a hydrolyzable group and a polyether group, modified with a fluorooxyalkylene-containing polymer residue, represented by formula (2) wherein α=1, that is, Rf is a monovalent fluorooxyalkylene-containing polymer residue or α=2, that is, Rf is a divalent fluorooxyalkylene-containing polymer residue may be prepared, for example, by the following method.

A fluoropolyether-containing polymer having at least two olefin sites at one end or both ends of the molecular chain is dissolved in a solvent such as fluorochemical solvent, typically 1,3-bis(trifluoromethyl)benzene. The solution is mixed with an organosilicon compound having a SiH group and a polyoxyalkylene group in the molecule. The mixture is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours for effecting reaction of some olefin sites on the fluoropolyether-containing polymer with the SiH group on the organosilicon compound having a polyoxyalkylene group and a SiH group. Subsequently, the reaction product is mixed with an organosilicon compound having a SiH group and a hydrolyzable terminal group (alkoxy group or the like) in the molecule such as trimethoxysilane. The mixture is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours for effecting reaction of residual olefin sites on the fluoropolyether-containing polymer with the SiH group on the organosilicon compound.

It is noted that when a halogenated (organo)silicon compound having a SiH group such as trichlorosilane is used as the organosilicon compound having a SiH group and a hydrolyzable terminal group in the molecule, the substituent (halogen) on the silyl group may be subsequently converted to another hydrolyzable group such as alkoxy group, typically methoxy.

Examples of the fluoropolyether-containing polymer having at least two olefin sites at one end or both ends of the molecular chain are given below.

[Chem. 112]

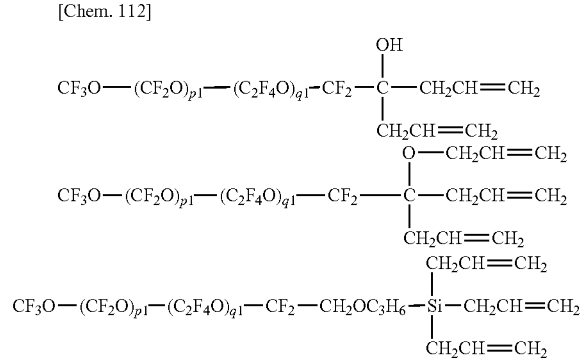

Herein p1 and q1 are as defined above. Individual units in parentheses may be randomly bonded.

Examples of the organosilicon compound having a SiH group and a polyoxyalkylene group in the molecule are given below.

[Chem. 113]

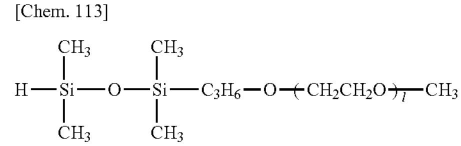

-continued

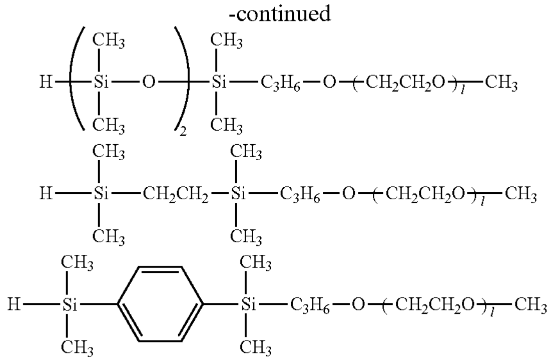

Herein 1 is as defined above.

The organosilicon compound having a SiH group and a polyoxyalkylene group in the molecule may be used in an amount of 0.1 to 0.9 equivalent, preferably 0.3 to 0.7 equivalent, more preferably about 0.5 equivalent per equivalent of the olefin site on the fluoropolyether-containing polymer having at least two olefin sites at one end or both ends of the molecular chain.

Examples of the organosilicon compound having a SiH group and a hydrolyzable terminal group in the molecule include trimethoxysilane, triethoxysilane, tripropoxysilane, triisopropoxysilane, tributoxysilane, triisopropenoxysilane, triacetoxysilane, trichlorosilane, tribromosilane, and triiodosilane. Also included are silanes and siloxane compounds as shown below.

[Chem. 114]

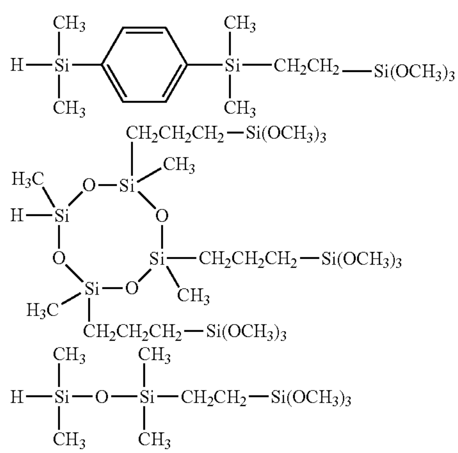

The organosilicon compound having a SiH group and a hydrolyzable terminal group in the molecule may be used in an amount of 0.1 to 0.9 equivalent, preferably 0.3 to 0.7 equivalent, more preferably about 0.5 equivalent per equivalent of the olefin site on the fluoropolyether-containing polymer having at least two olefin sites at one end or both ends of the molecular chain.

Typical of the solvent are fluorine-containing solvents. Suitable fluorine-containing solvents include 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M).

The solvent may be used in an amount of 10 to 300 parts, preferably 50 to 150 parts, and more preferably about 100 parts by weight per 100 parts by weight of the fluoropolyether-containing polymer having at least two olefin sites at one end or both ends of the molecular chain.

Examples of the hydrosilylation catalyst include platinum group metal based catalysts such as platinum black, chloroplatinic acid, alcohol-modified chloroplatinic acid, complexes of chloroplatinic acid with olefin, aldehyde, vinyl siloxane, and acetylene alcohol, tetrakis(triphenylphosphine)palladium, and chlorotris(triphenylphosphine)rhodium. Inter alia, platinum compounds such as vinyl siloxane coordination compounds are preferred.

The hydrosilylation catalyst is preferably used in an amount to provide 0.1 to 100 ppm, more preferably 1 to 50 ppm of transition metal based on the weight of the fluoropolyether-containing polymer having at least two olefin sites at one end or both ends of the molecular chain.

The organosilicon compound having a hydrolyzable group and a polyether group, modified with a fluorooxyalkylene-containing polymer residue, represented by formula (3) wherein α=1, that is, Rf is a monovalent fluorooxyalkylene-containing polymer residue or α=2, that is, Rf is a divalent fluorooxyalkylene-containing polymer residue may be prepared, for example, by the following method.

A fluoropolyether-containing polymer having iodine at one end or both ends of the molecular chain is dissolved in a solvent such as fluorine-containing solvent, typically 1,3-bis(trifluoromethyl)benzene. A radical initiator such as di-t-butyl peroxide is added to the solution, after which an organosilicon compound having an olefin site and a hydrolyzable terminal group in the molecule such as vinyltrichlorosilane or vinyltrialkoxysilane and a polyether compound having an olefin site in the molecule are added to and mixed with the solution. The mixture is aged at a temperature of 60 to 180° C., preferably 90 to 150° C., more preferably about 120° C. for a time of 1 to 20 hours, preferably 2 to 10 hours, more preferably about 6 hours, to conduct telomerization reaction between the organosilicon compound having an olefin site and a hydrolyzable terminal group in the molecule and the polyether compound having an olefin site in the molecule, with the reaction starting from the terminal iodine atom of the fluoropolyether-containing polymer having iodine at one end or both ends of the molecular chain. Herein, the organosilicon compound having an olefin site and a hydrolyzable terminal group in the molecule and the polyether compound having an olefin site in the molecule may be added at the same time. It is also acceptable that either one is first reacted and the other one is later reacted. The polyether compound having an olefin site in the molecule may further have a hydroxyl or hydrolyzable group. In such a case, the target polymer may be prepared by using only the polyether compound having an olefin site in the molecule while omitting the organosilicon compound having an olefin site and a hydrolyzable terminal group in the molecule. Thereafter, the terminal iodine of the fluoropolyether-containing polymer incorporated in the telomer is reduced with a reducing agent such as metallic zinc. It is noted that when a halogenated organosilicon compound having an olefin site such as vinyltrichlorosilane is used as the organosilicon compound having an olefin site and a hydrolyzable terminal group in the molecule, the substituent (halogen) on the silyl group may be subsequently converted to another hydrolyzable group such as alkoxy group, typically methoxy.

Examples of the fluoropolyether-containing polymer having iodine at one end or both ends of the molecular chain are given below.

[Chem. 115]

$$CF_3O-(C_2F_4O)_{q1}-(CF_2O)_{p1}-CF_2CF_2CF_2O-CF_2CF_2-I$$

$$CF_3O-(C_3F_6O)_{r1}-CF_2CF_2-I$$

$$CF_3O-(C_2F_4O)_{q1}-(CF_2O)_{p1}-\left(\underset{CF_3}{\underset{|}{CF}}-CF_2O\right)_2-\underset{CF_3}{\underset{|}{CF}}-I$$

Herein p1 is an integer of 5 to 100, q1 is an integer of 5 to 100, p1+q1 is an integer of 10 to 105, and r1 is an integer of 0 to 100. Individual units in parentheses may be randomly bonded.

Examples of the organosilicon compound having an olefin site and a hydrolyzable terminal group in the molecule include vinyltrimethoxysilane, vinyltriethoxysilane, vinyltripropoxysilane, vinyltriisopropoxysilane, vinyltributoxysilane, vinyltriisopropenoxysilane, vinyltriacetoxysilane, vinyltrichlorosilane, vinyltribromosilane, vinyltriiodosilane, allyltrimethoxysilane, allyltriethoxysilane, allyltripropoxysilane, allyltriisopropoxysilane, allyltributoxysilane, allyltriisopropenoxysilane, allyltriacetoxysilane, allyltrichlorosilane, allyltribromosilane, and allyltriiodosilane as well as a silane as shown below.

[Chem. 116]

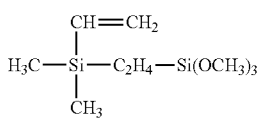

The organosilicon compound having an olefin site and a hydrolyzable terminal group in the molecule may be used in an amount of 1 to 10 equivalents, preferably 1.5 to 3 equivalents, more preferably about 2 equivalents per equivalent of the reactive terminal group on the fluoropolyether-containing polymer having iodine at one end or both ends of the molecular chain.

The polyether compound having an olefin site in the molecule may further have a hydroxyl or hydrolyzable group. Examples include polyalkylene oxide compounds blocked with an alkenyloxy group at one end of the molecular chain such as polyethylene oxide blocked with an allyloxy group at one end and with a methoxy group at the other end of the molecular chain, and silane compounds having a terminal alkenyl group and a terminal polyether group, as shown below.

[Chem. 117]

$$H_2C=CHCH_2-O-(CH_2CH_2O)_l-CH_3$$

$$H_2C=CH-O-(CH_2CH_2O)_l-CH_3$$

-continued

[Chem. 118]

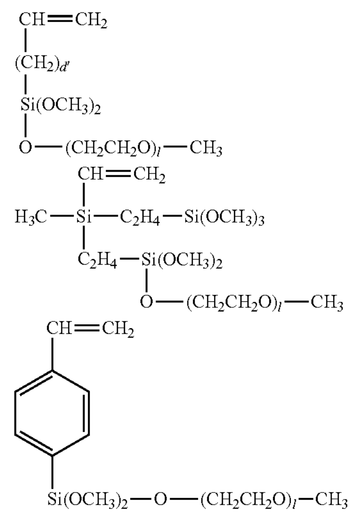

Herein d' and l are as defined above.

Examples of the polyether compound having an olefin site in the molecule such as the polyalkylene oxide compound blocked with an alkenyloxy group at one end of the molecular chain include Uniox MA-200, Uniox MA-300, Uniox MA-350S and Uniox MA-500 by NOF Corp.

The polyether compound having an olefin site in the molecule may be used in an amount of 1 to 10 equivalents, preferably 1.5 to 3 equivalents, more preferably about 2 equivalents per equivalent of the reactive terminal group on the fluoropolyether-containing polymer having iodine at one end or both ends of the molecular chain.

Examples of the radical initiator include azobisisobutyronitrile (AIBN), 1,1'-azobis(cyclohexanecarbonitrile) (ABCN, available as VAZO®), di-t-butyl peroxide, t-butyl hydroperoxide, benzoyl peroxide, and methyl ethyl ketone peroxide.

The radical initiator may be used in an amount of 0.1 to 5 equivalents, preferably 0.5 to 2 equivalents, more preferably about 1 equivalent per equivalent of the reactive terminal group on the fluoropolyether-containing polymer having iodine at one end or both ends of the molecular chain.

Typical of the solvent are fluorine-containing solvents. Suitable fluorine-containing solvents include 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M).

The solvent may be used in an amount of 50 to 300 parts, preferably 150 to 250 parts, and more preferably about 200 parts by weight per 100 parts by weight of the fluoropolyether-containing polymer having iodine at one end or both ends of the molecular chain.

Suitable reducing agents include hydrides such as sodium borohydride and lithium aluminum hydride, and metals such as iron, zinc, nickel, aluminum and magnesium.

The reducing agent may be used in an amount of 0.5 to 5 equivalents, preferably 1 to 3 equivalents, and more preferably about 1.5 equivalents per equivalent of the reactive terminal group on the fluoropolyether-containing polymer having iodine at one end or both ends of the molecular chain.

Examples of the reagent which can be used in converting the substituent on the silyl group to a hydrolyzable group include alcohols of 1 to 10 carbon atoms such as methanol, ethanol, propanol, isopropanol and butanol.

The amount of the reagent used may be preferably 10 to 200 parts by weight, more preferably 40 to 100 parts by weight per 100 parts by weight of the reaction product of the fluoropolyether-containing polymer having iodine at one end or both ends of the molecular chain with the organosilicon compound and the polyether compound.

More preferred as the compound having formula (2) is an organosilicon compound containing a hydroxyl or hydrolyzable group and a polyether group, modified with a fluorooxyalkylene-containing polymer residue, represented by the general formula (6), and/or a partial (hydrolytic) condensate thereof.

[Chem. 119]

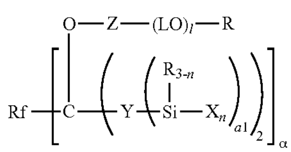

(6)

Herein Rf, Y, X, R, L, l, n and α are as defined above. Z is independently a single bond, siloxane bond or silylene group, and a1 is an integer of 1 to 5, preferably 1 to 3.

In formula (6), Z is independently a single bond, siloxane bond or silylene group, specifically a group selected from among a single bond, a di- to tetravalent linear organopolysiloxane residue of 2 to 10 silicon atoms, a di- to tetravalent branched or cyclic organopolysiloxane residue of 3 to 10 silicon atoms, a linear silalkylene residue of 2 to 10 silicon atoms, and a silarylene residue of 2 to 10 silicon atoms. Preferably Z is a single bond or a linear organopolysiloxane, silalkylene or silarylene residue of 2 to 4 silicon atoms, most preferably a single bond.

Examples of the siloxane bond and silylene group (inclusive of silalkylene and silarylene residues) represented by Z include groups as shown below.

[Chem. 120]

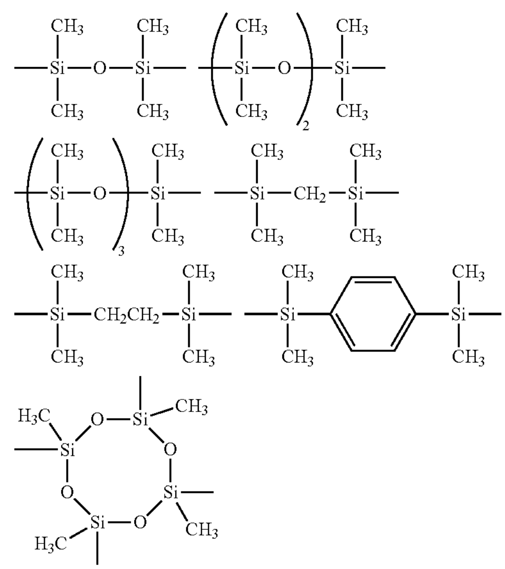

The structure of the organosilicon compound containing a hydrolyzable group and a polyether group, modified with a fluorooxyalkylene-containing polymer residue, represented by formula (6) is exemplified by the following structure.

[Chem. 121]

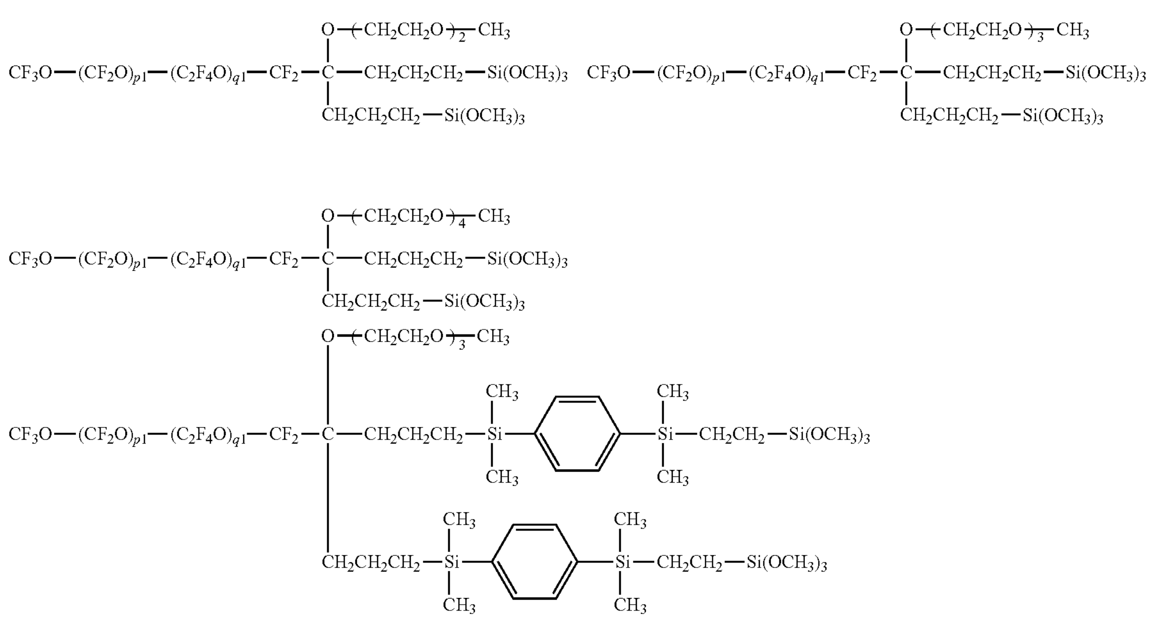

-continued
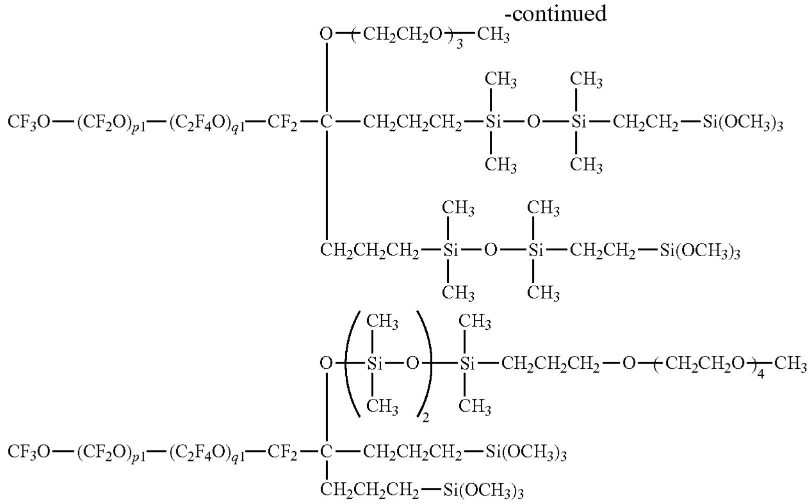
[Chem.122]
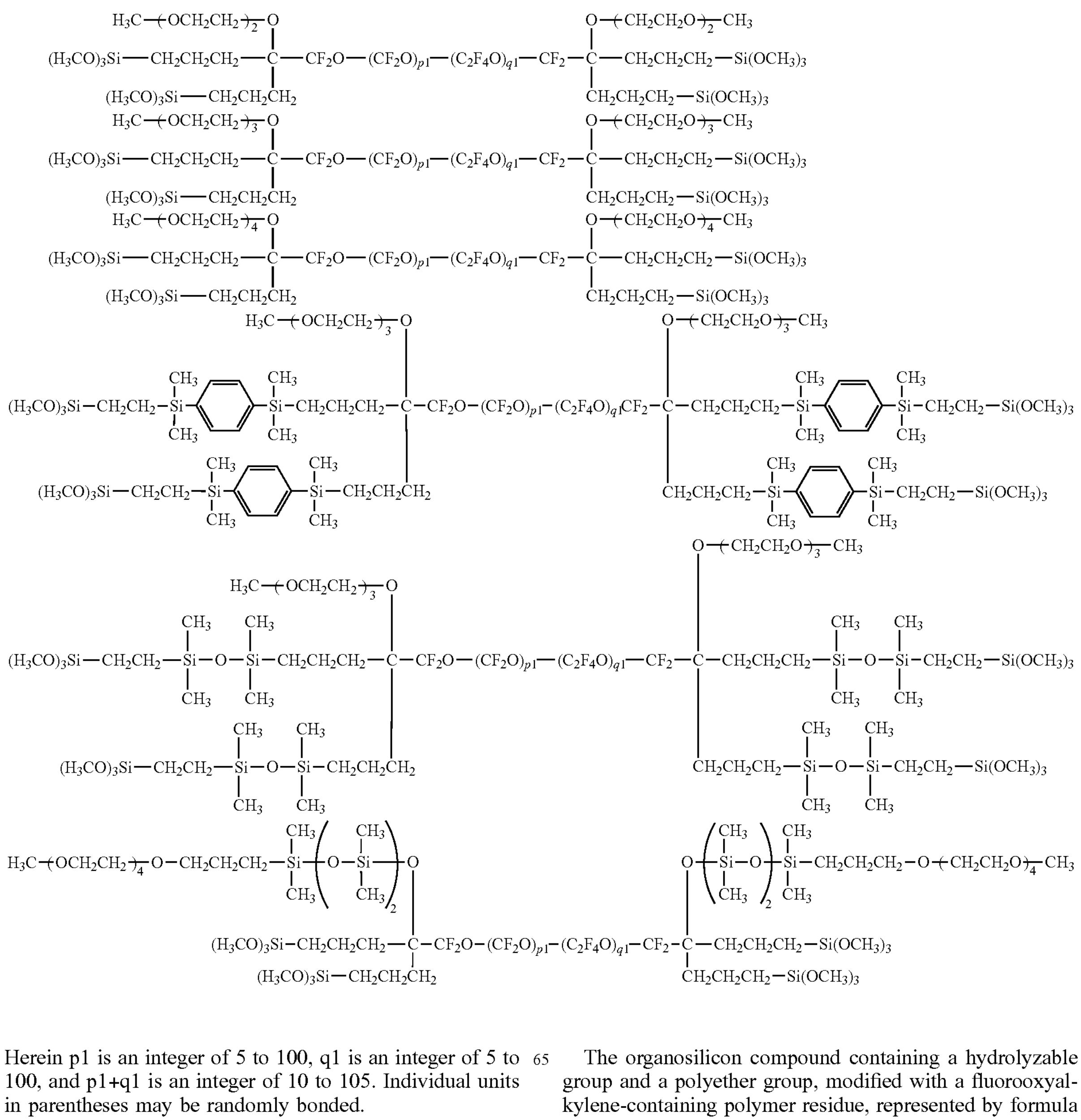
Herein p1 is an integer of 5 to 100, q1 is an integer of 5 to 100, and p1+q1 is an integer of 10 to 105. Individual units in parentheses may be randomly bonded.
The organosilicon compound containing a hydrolyzable group and a polyether group, modified with a fluorooxyalkylene-containing polymer residue, represented by formula (6) wherein $\alpha=1$ (i.e., Rf is a monovalent fluorooxyalkylene-containing polymer residue) or $\alpha=2$ (i.e., Rf is a divalent fluorooxyalkylene-containing polymer residue) may be prepared, for example, by the following method.

A fluoropolyether-containing polymer having two olefin sites and a polyether group at one end or both ends of the molecular chain is dissolved in a solvent such as fluorine-containing solvent, typically 1,3-bis(trifluoromethyl)benzene. The solution is mixed with an organosilicon compound having a SiH group and a hydrolyzable terminal group in the molecule such as trimethoxysilane. The mixture is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours.

Alternatively, the organosilicon compound containing a hydrolyzable group and a polyether group, modified with a fluorooxyalkylene-containing polymer residue, represented by formula (6) wherein $\alpha=1$ or $\alpha=2$ may be prepared, for example, by the following method.

A fluoropolyether-containing polymer having two olefin sites and a polyether group at one end or both ends of the molecular chain is dissolved in a solvent such as fluorine-containing solvent, typically 1,3-bis(trifluoromethyl)benzene. The solution is mixed with an organosilicon compound having a SiH group and a hydrolyzable terminal group (halogen atom) in the molecule such as trichlorosilane. The mixture is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours. After aging, the substituent (halogen atom) on the silyl group may be converted to a methoxy group, for example.

It is noted that a SiH-containing organosilicon compound free of a hydrolyzable terminal group may be used instead of the organosilicon compound having a SiH group and a hydrolyzable terminal group in the molecule. In this case, an organosilicon compound containing at least two SiH groups, but not a hydrolyzable terminal group in the molecule may be used as the organosilicon compound. Like the above-described method, the fluoropolyether-containing polymer having two olefin sites and a polyether group at one end or both ends of the molecular chain and the organosilicon compound containing at least two SiH groups, but not a hydrolyzable terminal group in the molecule are reacted to form a reaction product, after which the reaction product having SiH groups at the polymer end is mixed with an organosilicon compound having an olefin site and a hydrolyzable terminal group in the molecule, such as allyltrimethoxysilane. The mixture is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours.

Examples of the fluoropolyether-containing polymer having two olefin sites and a polyether group at one end or both ends of the molecular chain include fluoropolyether-containing polymers having the general formula (10).

[Chem. 123]

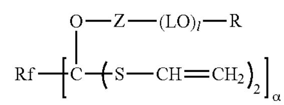

(10)

Herein Rf, Z, L, l, R and $\alpha$ are as defined above, and S is a divalent hydrocarbon group which may contain a silicon atom and/or siloxane bond.

In formula (10), S is a divalent hydrocarbon group, preferably a divalent hydrocarbon group of 1 to 8 carbon atoms, especially 1 to 4 carbon atoms. Examples include $C_1$-$C_8$ alkylene groups such as methylene, ethylene, propylene (trimethylene, methylethylene), butylene (tetramethylene, methylpropylene), hexamethylene, and octamethylene, $C_6$-$C_8$ arylene groups such as phenylene, and alkylene groups containing $C_6$-$C_8$ arylene such as phenylene (e.g., alkylene-arylene groups of 7 to 8 carbon atoms). S is more preferably a linear $C_1$-$C_4$ alkylene group.

Preferred examples of the fluoropolyether-containing polymer having formula (10) are shown by the following formulae. In each formula, the repetition number of repeating units of which the fluoropolyether group (mono- or divalent fluorooxyalkylene-containing polymer residue) is composed, also referred to as degree of polymerization, may be an arbitrary number meeting formula (7) or (8) representative of Rf.

[Chem. 124]

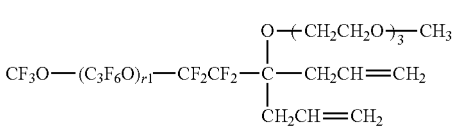

[Chem. 125]

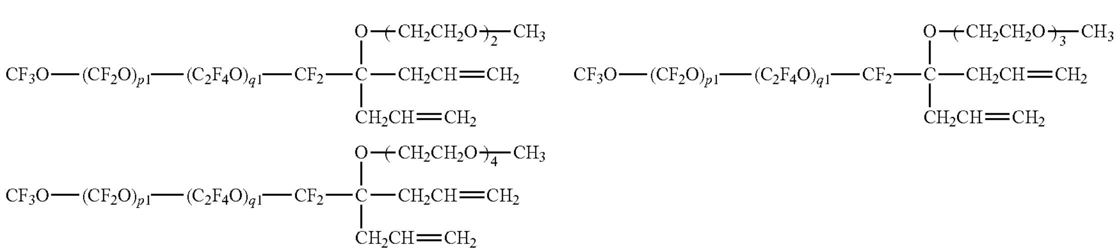

-continued

[Chem. 126]

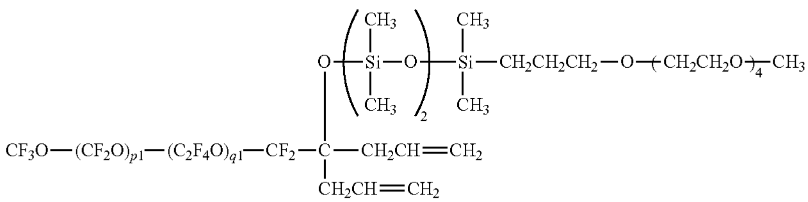

[Chem. 127]

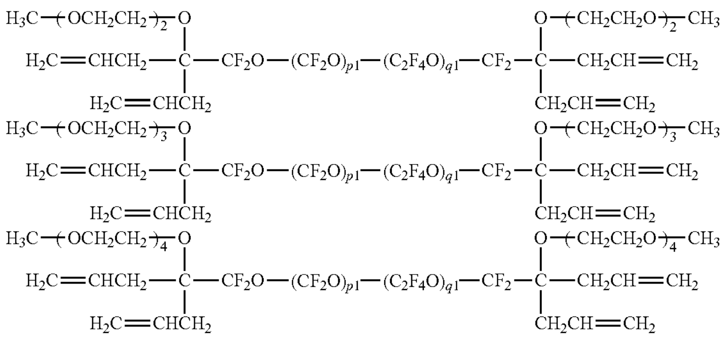

[Chem. 128]

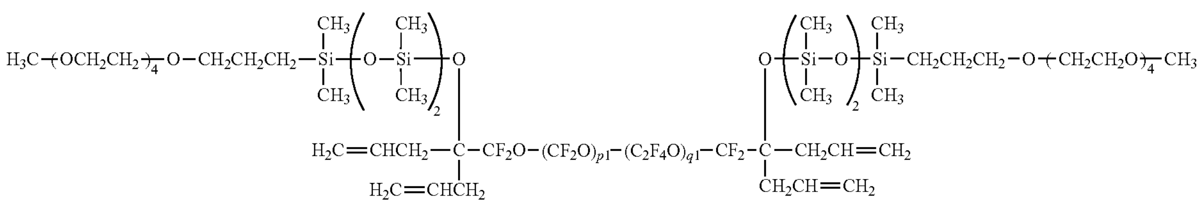

Herein r1, p1 and q1 are as defined above. Individual units in parentheses may be randomly bonded.

The fluoropolyether-containing polymer having formula (10) may be prepared, for example, by mixing a fluoropolyether-containing polymer having a hydroxyl group and two olefin sites at one end or both ends of the molecular chain with a polyether-providing agent, and aging the mixture in the presence of a base, and optionally a reactivity-enhancing additive and a solvent, at a temperature of 0 to 90° C., preferably 50 to 80° C., and more preferably 60 to 70° C. for 1 to 48 hours, preferably 10 to 40 hours, and more preferably 20 to 30 hours.

Alternatively, the fluoropolyether-containing polymer having formula (10) may be prepared, for example, by mixing a fluoropolyether-containing polymer having a hydroxyl group and two olefin sites at one end or both ends of the molecular chain with an organosilicon compound having at least two SiH groups, but not a hydrolyzable terminal group in the molecule, and subjecting the mixture to dehydrogenation reaction in the presence of a dehydrogenation catalyst and optionally a solvent, at a temperature of 0 to 60° C., preferably 15 to 35° C., and more preferably about 25° C. for 10 minutes to 24 hours, preferably 30 minutes to 2 hours, and more preferably about 1 hour, thereby yielding a fluoropolyether-containing polymer having a SiH group and two olefin sites at one end or both ends of the molecular chain.

Subsequently, the fluoropolyether-containing polymer having a SiH group and two olefin sites at one end or both ends of the molecular chain and a polyether compound having an olefin site in the molecule (e.g., polyalkylene oxide compound blocked with an alkenyloxy group at one end of the molecular chain) are dissolved in a solvent such as fluorine-containing solvent, typically 1,3-bis(trifluoromethyl)benzene. The solution is aged in the presence of a hydrosilylation catalyst such as chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours.

Examples of the fluoropolyether-containing polymer having a hydroxyl group and two olefin sites at one end or both ends of the molecular chain used in the preparation of the fluoropolyether-containing polymer having formula (10) are shown by the following formulae.

[Chem. 129]

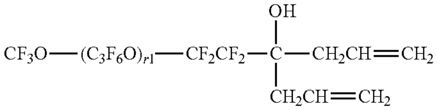

-continued

[Chem. 130]

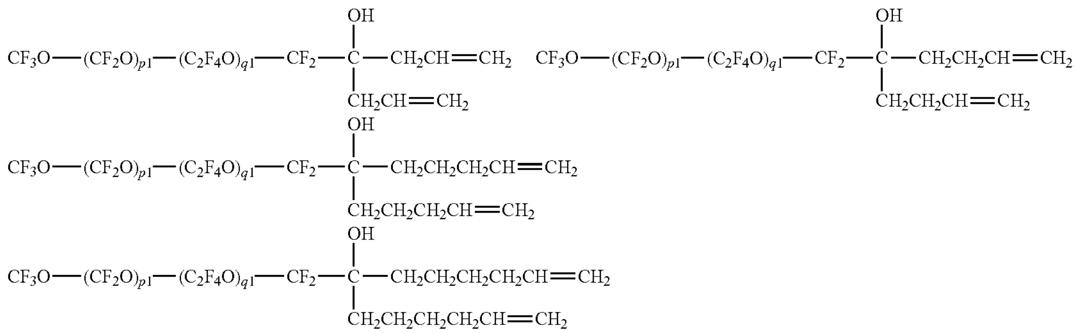

[Chem. 131]

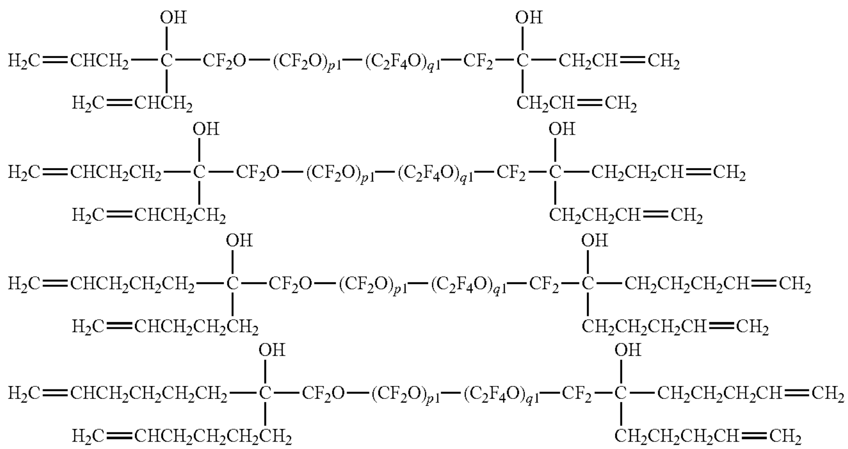

Herein r1, p1 and q1 are as defined above. Individual units in parentheses may be randomly bonded.

The fluoropolyether-containing polymer having a hydroxyl group and two olefin sites at one end or both ends of the molecular chain may be prepared, for example, by mixing a perfluoropolyether-containing polymer having an acid fluoride group (—C(═O)—F) at one end or both ends of the molecular chain with a Grignard reagent as a nucleophilic reagent and a solvent such as 1,3-bis(trifluoromethyl) benzene or tetrahydrofuran, and aging the mixture at 0 to 80° C., preferably 50 to 70° C., and more preferably about 60° C. for 1 to 6 hours, preferably 3 to 5 hours, and more preferably about 4 hours.

While the perfluoropolyether-containing polymer has an acid fluoride group at one end or both ends of the molecular chain as mentioned above, an acid halide, acid anhydride, ester, carboxylic acid or amide group may also be used as the end group.

Examples of the perfluoropolyether-containing polymer having such a group at one end or both ends of the molecular chain are shown below.

[Chem. 132]

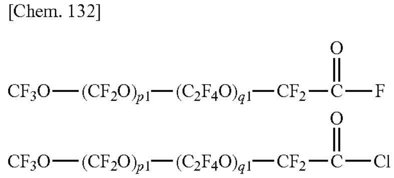

-continued

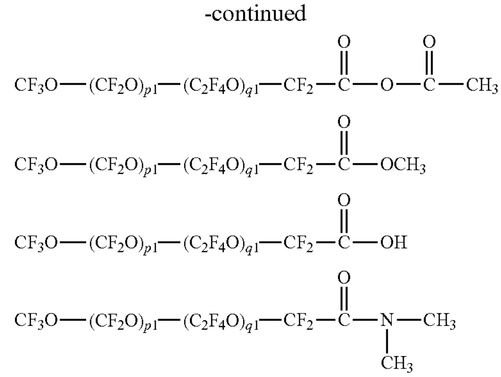

[Chem. 133]

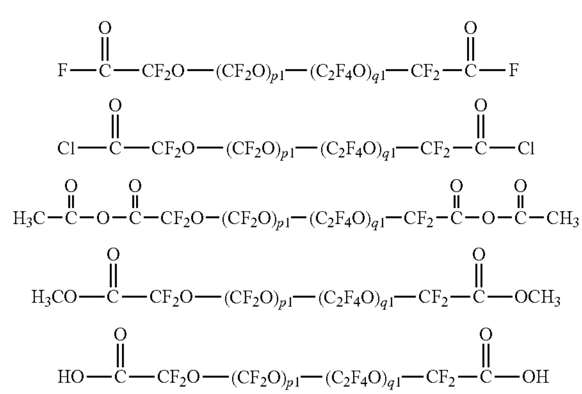

-continued

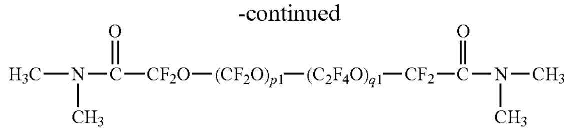

Herein p1 and q1 are as defined above. Individual units in parentheses may be randomly bonded.

The nucleophilic reagent used in the preparation of the fluoropolyether-containing polymer having a hydroxyl group and two olefin sites at one end or both ends of the molecular chain may be selected from allylmagnesium halides, 3-butenylmagnesium halides, 4-pentenylmagnesium halides, and 5-hexenylmagnesium halides, for example. Corresponding lithium reagents may also be used.

The nucleophilic reagent may be used in an amount of 2 to 5 equivalents, preferably 2.5 to 3.5 equivalents, and more preferably about 3 equivalents per equivalent of the reactive terminal group on the perfluoropolyether-containing polymer.

Fluorine-containing and non-fluorine-containing organic solvents are suitable as the solvent used in the preparation of the fluoropolyether-containing polymer having a hydroxyl group and two olefin sites at one end or both ends of the molecular chain. Suitable fluorine-containing organic solvents include 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M). Non-fluorine-containing organic solvents include ether solvents such as tetrahydrofuran (THF), monoethylene glycol dimethyl ether, diethylene glycol dimethyl ether, triethylene glycol dimethyl ether, tetraethylene glycol dimethyl ether, and dioxane. Of these, fluorine-containing organic solvents are preferable.

The organic solvent may be used in an amount of 10 to 300 parts, preferably 100 to 200 parts, and more preferably about 150 parts by weight per 100 parts by weight of the perfluoropolyether-containing polymer.

Subsequently, the reaction is stopped. The reaction solution is separated into a water layer and an organic solvent layer (preferably fluorine-containing organic solvent layer) by separatory operation. The organic solvent layer is washed with an organic solvent, preferably non-fluorine-containing organic solvent. Then the solvent is distilled off, yielding a fluoropolyether-containing polymer having a hydroxyl group and two olefin sites at one end or both ends of the molecular chain.

The polyether-providing agent used in the preparation of the fluoropolyether-containing polymer having formula (10) is selected from, for example, polyether halides such as 2-bromoethyl methyl ether, ethylene glycol 2-bromoethyl methyl ether, diethylene glycol 2-bromoethyl methyl ether, and triethylene glycol 2-bromoethyl methyl ether.

The polyether-providing agent may be used in an amount of 1 to 15 equivalents, preferably 1.5 to 9 equivalents, more preferably 2 to 7 equivalents per equivalent of the reactive terminal group on the fluoropolyether-containing polymer having a hydroxyl group and two olefin sites at one end or both ends of the molecular chain.

Examples of the base used in the preparation of the fluoropolyether-containing polymer having formula (10) include amines and alkali metal bases. Specifically, suitable amines include triethylamine, diisopropylethylamine, pyridine, DBU and imidazole. Suitable alkali metal bases include sodium hydroxide, potassium hydroxide, sodium hydride, potassium hydride, alkyl lithium, t-butoxypotassium, lithium diisopropylamide, lithium bis(trimethylsilyl)amide, sodium bis(trimethylsilyl)amide, and potassium bis(trimethylsilyl)amide.

The base may be used in an amount of 1 to 20 equivalents, more preferably 10 to 18 equivalents, even more preferably about 15 equivalents per equivalent of the reactive terminal group on the fluoropolyether-containing polymer having a hydroxyl group and two olefin sites at one end or both ends of the molecular chain.

In preparing the fluoropolyether-containing polymer having formula (10), tetrabutylammonium halides and alkali metal base halides may be used as the reactivity-enhancing additive. Specifically, suitable additives include tetrabutylammonium chloride, tetrabutylammonium bromide, tetrabutylammonium iodide, tetrabutylammonium, tetrabutylammonium hydrogensulfate, sodium iodide, potassium iodide, cesium iodide, and crown ethers. These additives enhance reactivity through catalytic halogen exchange with the olefin-providing agent in the reaction system. The crown ethers enhance reactivity through coordination to the metal.

The additive may be used in an amount of 0.005 to 0.1 equivalent, more preferably 0.01 to 0.05 equivalent, even more preferably about 0.02 equivalent per equivalent of the reactive terminal group on the fluoropolyether-containing polymer having a hydroxyl group and two olefin sites at one end or both ends of the molecular chain.

A solvent may be used in the preparation of the fluoropolyether-containing polymer having formula (10). Although the solvent is not essential, suitable solvents if used include fluorine-containing organic solvents and non-fluorine-containing organic solvents. Suitable fluorine-containing organic solvents include fluorinated aromatic hydrocarbon solvents such as 1,3-bis(trifluoromethyl)benzene and trifluoromethylbenzene, hydrofluoroether (HFE) solvents (trade name: Novec series from 3M) such as 1,1,1,2,3,4,4,5,5,5-decafluoro-3-methoxy-2-(trifluoromethyl)pentane, and perfluoro solvents composed of perfluorinated compounds (trade name: Fluorinert series from 3M). Suitable non-fluorine-containing organic solvents include dimethylformamide, dimethylacetamide, dimethyl sulfoxide, acetonitrile, and THF. Of these, fluorine-containing organic solvents are preferred.

The organic solvent may be used in an amount of 10 to 300 parts, preferably 30 to 150 parts, and more preferably about 50 parts by weight per 100 parts by weight of the fluoropolyether-containing polymer having two olefin sites and a hydroxyl group at one end or both ends of the molecular chain.

Preferred examples of the organosilicon compound having at least two SiH groups, but not a hydrolyzable terminal group in the molecule, which is used in the preparation of the fluoropolyether-containing polymer having formula (10), include those compounds having the general formulae (11) to (13).

[Chem. 134]

(11)

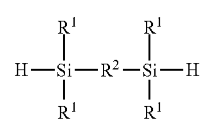

-continued

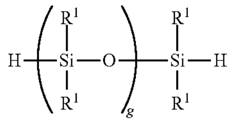

(12)

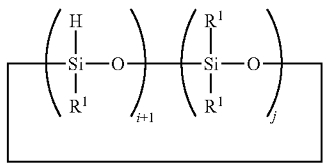

(13)

Herein $R^1$, $R^2$, g and j are as defined above, i is an integer of 2 to 9, preferably 2 to 4, and i+j is an integer of 2 to 9.

Examples of the organosilicon compound having at least two SiH groups, but not a hydrolyzable terminal group in the molecule are shown below.

[Chem. 135]

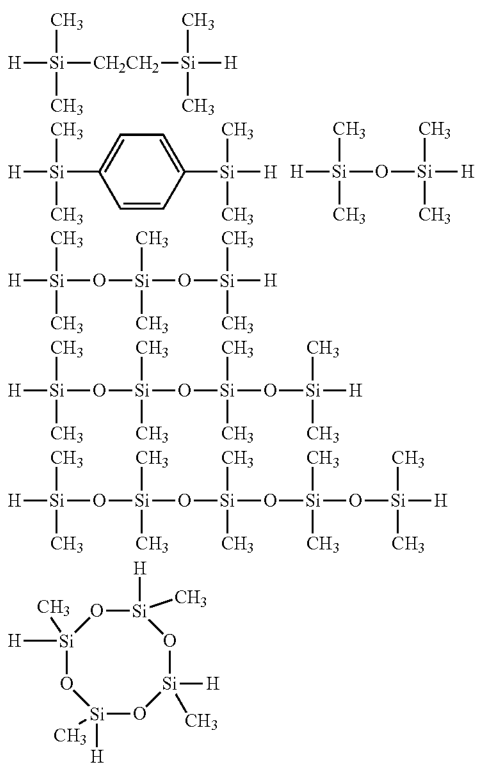

In preparing the fluoropolyether-containing polymer having formula (10), the organosilicon compound having at least two SiH groups, but not a hydrolyzable terminal group in the molecule may be used in an amount of 7 to 30 equivalents, preferably 5 to 20 equivalents, more preferably about 10 equivalents per equivalent of the reactive terminal group on the fluoropolyether-containing polymer having two olefin sites and a hydroxyl group at one end or both ends of the molecular chain.

Examples of the dehydrogenation catalyst used in the preparation of the fluoropolyether-containing polymer having formula (10) are platinum group metal based catalysts such as rhodium, palladium and ruthenium catalysts, and boron catalysts. Suitable platinum group metal based catalysts include tetrakis(triphenylphosphine)palladium and chlorotris(triphenylphosphine)rhodium, and suitable boron catalysts include tris(pentafluorophenyl)borane.

The dehydrogenation catalyst may be used in an amount of 0.01 to 0.0005 equivalent, preferably 0.007 to 0.001 equivalent, and more preferably about 0.005 equivalent per equivalent of the reactive terminal group on the fluoropolyether-containing polymer having two olefin sites and a hydroxyl group at one end or both ends of the molecular chain.

Subsequently, the reaction is stopped. The reaction solution is separated into a water layer and an organic solvent layer, preferably fluorine-containing organic solvent layer by separatory operation. The organic solvent layer is washed with an organic solvent, preferably non-fluorine-containing organic solvent. Then the solvent is distilled off, yielding a fluoropolyether-containing polymer having two olefin sites and a SiH group at one end or both ends of the molecular chain.

Examples of the polyether compound having an olefin site in the molecule used in the preparation of the fluoropolyether-containing polymer having formula (10) include polyalkylene oxide compounds blocked with an alkenyloxy group at one end of the molecular chain such as polyethylene oxides blocked with an allyloxy group at one end and with a methoxy group at the other end of the molecular chain, as shown below.

[Chem. 136]

$$H_2C{=}CHCH_2{-}O{-}\left(CH_2CH_2O\right)_l{-}CH_3$$

Herein l is as defined above.

Examples of the polyether compounds having an olefin site in the molecule such as polyalkylene oxide compounds blocked with an alkenyloxy group at one end of the molecular chain include Uniox MA-200, Uniox MA-300, Uniox MA-350S and Uniox MA-500 from NOF Corp.

The polyether compound having an olefin site in the molecule may be used in an amount of 1 to 10 equivalents, preferably 2 to 5 equivalents, more preferably about 3 equivalents per equivalent of the reactive terminal group on the fluoropolyether-containing polymer having two olefin sites and a SiH group at one end or both ends of the molecular chain.

Examples of the hydrosilylation catalyst used in the preparation of the fluoropolyether-containing polymer having formula (10) include platinum group metal based catalysts such as platinum black, chloroplatinic acid, alcohol-modified chloroplatinic acid, complexes of chloroplatinic acid with olefin, aldehyde, vinyl siloxane, and acetylene alcohol, tetrakis(triphenylphosphine)palladium, and chlorotris(triphenylphosphine)rhodium. Inter alia, platinum compounds such as vinyl siloxane coordination compounds are preferred.

The hydrosilylation catalyst is preferably used in an amount to provide 0.1 to 100 ppm, more preferably 1 to 50 ppm of transition metal based on the weight of the fluoropolyether-containing polymer having two olefin sites and a SiH group at one end or both ends of the molecular chain.

As the solvent used in the preparation of the organosilicon compound having a hydrolyzable group and a polyether group, modified with a fluorooxyalkylene-containing polymer residue, represented by formula (6) wherein α=1 or $\alpha$=2, fluorine-containing solvents are suitable, including 1,3-bis(trifluoromethyl)benzene, trifluoromethylbenzene, hydrofluoroether (HFE) solvents (trade name: Novec series from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (trade name: Fluorinert series from 3M).

The solvent may be used in an amount of 10 to 300 parts, preferably 50 to 150 parts, and more preferably about 100 parts by weight per 100 parts by weight of the fluoropolyether-containing polymer having two olefin sites and a polyether group at one end or both ends of the molecular chain.

Preferred examples of the organosilicon compound having a SiH group and a hydrolyzable terminal group in the molecule, which is used in the preparation of the organosilicon compound having a hydrolyzable group and a polyether group, modified with a fluorooxyalkylene-containing polymer residue, represented by formula (6) wherein $\alpha$=1 or $\alpha$=2, include compounds having the general formulae (14) to (17).

[Chem. 137]

(14)

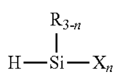

(15)

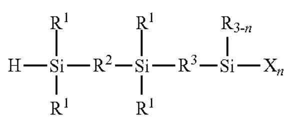

(16)

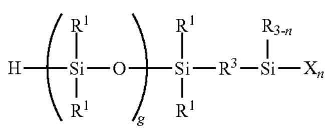

(17)

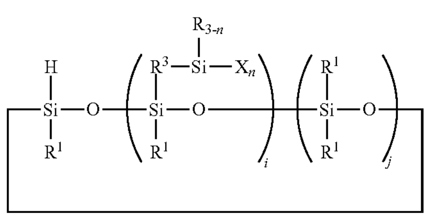

Herein R, X, n, $R^1$, $R^2$, g, i, j, and i+j are as defined above, and $R^3$ is a $C_2$-$C_8$ divalent hydrocarbon group.

Examples of the $C_2$-$C_8$, preferably $C_2$-$C_3$, divalent hydrocarbon group represented by $R^3$ include alkylene groups such as methylene, ethylene, propylene (trimethylene, methylethylene), butylene (tetramethylene, methylpropylene), hexamethylene, and octamethylene, arylene groups such as phenylene, and combinations of at least two of the foregoing (e.g., alkylene-arylene groups). Inter alia, ethylene and trimethylene are preferred.

Examples of the organosilicon compound having a SiH group and a hydrolyzable terminal group in the molecule include trimethoxysilane, triethoxysilane, tripropoxysilane, triisopropoxysilane, tributoxysilane, triisopropenoxysilane, triacetoxysilane, trichlorosilane, tribromosilane, and triiodosilane. Also included are silanes as shown below.

[Chem. 138]

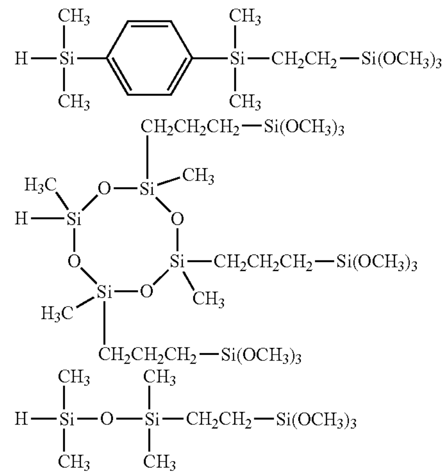

In preparing the organosilicon compound having a hydrolyzable group and a polyether group, modified with a fluorooxyalkylene-containing polymer residue, represented by formula (6) wherein $\alpha$=1 or $\alpha$=2, the organosilicon compound having a SiH group and a hydrolyzable terminal group in the molecule may be used in an amount of 1 to 4 equivalents, preferably 1.5 to 3 equivalents, more preferably 2 to 2.5 equivalents per equivalent of the reactive terminal group on the fluoropolyether-containing polymer having two olefin sites and a polyether group at one end or both ends of the molecular chain.

Preferred examples of the organosilicon compound having at least two SiH groups, but not a hydrolyzable terminal group in the molecule, which is used in the preparation of the organosilicon compound having a hydrolyzable group and a polyether group, modified with a fluorooxyalkylene-containing polymer residue, represented by formula (6) wherein $\alpha$=1 or $\alpha$=2, include compounds having the general formulae (11) to (13).

[Chem. 139]

(11)

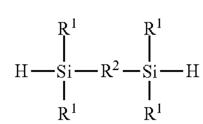

(12)

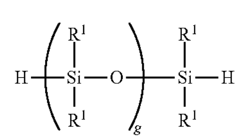

(13)

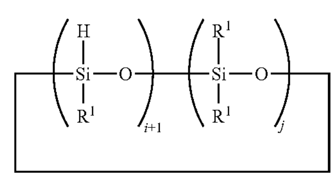

Herein $R^1$, $R^2$, g, j, i and i+j are as defined above.

Examples of the organosilicon compound having at least two SiH groups, but not a hydrolyzable terminal group in the molecule are shown below.

[Chem. 140]

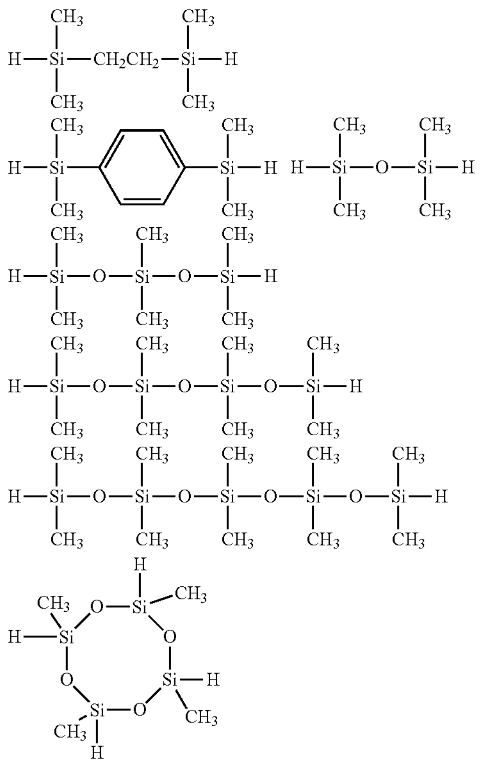

In preparing the organosilicon compound having a hydrolyzable group and a polyether group, modified with a fluorooxyalkylene-containing polymer residue, represented by formula (6) wherein α=1 or α=2, the organosilicon compound having at least two SiH groups, but not a hydrolyzable terminal group in the molecule may be used in an amount of 7 to 30 equivalents, preferably 5 to 20 equivalents, more preferably about 10 equivalents per equivalent of the reactive terminal group on the fluoropolyether-containing polymer having two olefin sites and a polyether group at one end or both ends of the molecular chain.

Preferred examples of the organosilicon compound having an olefin site and a hydrolyzable terminal group in the molecule, which is used in the preparation of the organosilicon compound having a hydrolyzable group and a polyether group, modified with a fluorooxyalkylene-containing polymer residue, represented by formula (6) wherein α=1 or α=2, include compounds having the general formula (18).

[Chem. 141]

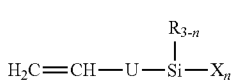

(18)

Herein R, X and n are as defined above, and U is a single bond or a $C_1$-$C_6$ divalent hydrocarbon group.

In formula (18), U is a single bond or a $C_1$-$C_6$ divalent hydrocarbon group, examples of which include alkylene groups such as methylene, ethylene, propylene (trimethylene, methylethylene), butyl ene (tetramethylene, methylpropylene) and hexamethylene, and phenylene. Preferably U is a single bond or methylene.

In preparing the organosilicon compound having a hydrolyzable group and a polyether group, modified with a fluorooxyalkylene-containing polymer residue, represented by formula (6) wherein α=1 or α=2, the organosilicon compound having an olefin site and a hydrolyzable terminal group in the molecule may be used in an amount of 2 to 8 equivalents, preferably 3 to 5 equivalents, and more preferably about 4 equivalents per equivalent of the reactive terminal group on the reaction product between the fluoropolyether-containing polymer having two olefin sites and a polyether group at one end or both ends of the molecular chain and the organosilicon compound having at least two SiH groups, but not a hydrolyzable terminal group in the molecule.

Typical of the hydrosilylation catalyst used in the preparation of the organosilicon compound having a hydrolyzable group and a polyether group, modified with a fluorooxyalkylene-containing polymer residue, represented by formula (6) wherein α=1 or α=2 are platinum group metal based catalysts including platinum black, chloroplatinic acid, alcohol-modified chloroplatinic acid, complexes of chloroplatinic acid with olefin, aldehyde, vinyl siloxane, and acetylene alcohol, tetrakis(triphenylphosphine)palladium, and chlorotris(triphenylphosphine)rhodium. Inter alia, platinum compounds such as vinyl siloxane coordination compounds are preferred.

The hydrosilylation catalyst is preferably used in an amount to provide 0.1 to 100 ppm, more preferably 1 to 50 ppm of transition metal based on the weight of the fluoropolyether-containing polymer having two olefin sites and a polyether group at one end or both ends of the molecular chain or the reaction product between the polymer and the organosilicon compound having at least two SiH groups, but not a hydrolyzable terminal group in the molecule.

Thereafter, the solvent and unreacted reactants are distilled off in vacuum, yielding the target compound.

For example, when the fluoropolyether-containing polymer having two olefin sites and a polyether group at one end of the molecular chain is a compound having the formula:

[Chem. 142]

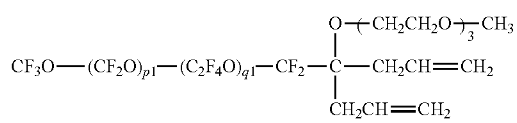

$p1:q1 = 47:53,\ p1 + q1 \approx 43$ and the organosilicon compound having a SiH group and a hydrolyzable terminal group in the molecule is trimethoxysilane, there is obtained a compound of the following formula.

[Chem. 143]

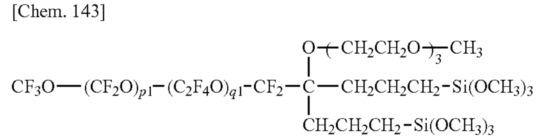

$p1:q1 = 47:53,\ p1 + q1 \approx 43$

Also, for example, when the fluoropolyether-containing polymer having two olefin sites and a polyether group at both ends of the molecular chain is a compound having the formula:

[Chem. 144]

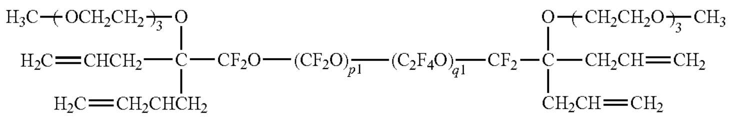

p1:q1 = 47:53, p1 + q1 ≈ 43 and the organosilicon compound having a SiH group and a hydrolyzable terminal group in the molecule is trimethoxysilane, there is obtained a compound of the following formula.

[Chem. 145]

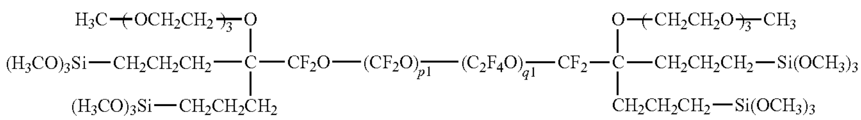

p1:q1 = 47:53, p1 + q1 ≈ 43

It is noted with respect to components (A) and (B) that component (A) may be synthesized using a starting material for the synthesis of component (A), pre-loaded with component (B), and component (B) may be synthesized using a starting material for the synthesis of component (B), pre-loaded with component (A).

Another embodiment of the invention is a surface treating agent comprising a fluorochemical coating composition comprising (A) an organosilicon compound containing a hydroxyl or hydrolyzable group, modified with a fluorooxyalkylene-containing polymer residue, and/or a partial (hydrolytic) condensate thereof, and (B) an organosilicon compound containing a hydroxyl or hydrolyzable group and a polyether group, modified with a fluorooxyalkylene-containing polymer residue, and/or a partial (hydrolytic) condensate thereof, as defined above, wherein components (A) and (B) are mixed in a weight ratio of from 15:85 to 85:15. The surface treating agent may also comprise a partial (hydrolytic) condensate of the fluoropolyether-containing polymer obtained by condensing its hydroxyl group, or a hydroxyl group resulting from partial hydrolysis of its hydrolyzable terminal group in a well-known manner.

To the surface treating agent, a hydrolytic condensation catalyst may be added if necessary. Suitable hydrolytic condensation catalysts include organotin compounds such as dibutyltin dimethoxide and dibutyltin dilaurate, organotitanium compounds such as tetra-n-butyl titanate, organic acids such as acetic acid, methanesulfonic acid, and fluorine-modified carboxylic acids, and inorganic acids such as hydrochloric acid and sulfuric acid. Of these, acetic acid, tetra-n-butyl titanate, dibutyltin dilaurate, and fluorine-modified carboxylic acids are desirable.

The hydrolytic condensation catalyst may be added in a catalytic amount, typically 0.01 to 5 parts, more preferably 0.1 to 1 part by weight per 100 parts by weight of components (A) and (B) combined.

The surface treating agent may further comprise a solvent. Suitable solvents include fluorine-modified aliphatic hydrocarbon solvents such as perfluoroheptane and perfluorooctane; fluorine-modified aromatic hydrocarbon solvents such as 1,3-bis(trifluoromethyl)benzene; fluorine-modified ether solvents such as methyl perfluorobutyl ether, ethyl perfluorobutyl ether, and perfluoro(2-butyltetrahydrofuran); fluorine-modified alkylamine solvents such as perfluorotributylamine and perfluorotripentylamine; hydrocarbon solvents such as petroleum benzine, toluene, and xylene; ketone solvents such as acetone, methyl ethyl ketone, and methyl isobutyl ketone. Of these, fluorine-modified solvents are desirable for solubility and wettability, with 1,3-bis(trifluoromethyl)benzene, perfluoro(2-butyltetrahydrofuran), perfluorotributylamine, and ethyl perfluorobutyl ether being more desirable.

The solvents may be used in admixture of two or more while it is preferred that the fluoropolyether-containing polymers and their partial (hydrolytic) condensates be uniformly dissolved in the solvent. An optimum concentration of the fluoropolyether-containing polymers and their partial (hydrolytic) condensates in the solvent varies with a particular treating mode. The amount which is easy to weigh may be chosen. When the agent is applied directly, the concentration may preferably be 0.01 to 10 parts by weight, more preferably 0.05 to 5 parts by weight per 100 parts by weight of the solvent and the fluoropolyether-containing polymers (and their partial (hydrolytic) condensates) combined. When the agent is applied by evaporation, the concentration may preferably be 1 to 100 parts by weight, more preferably 3 to 30 parts by weight per 100 parts by weight of the solvent and components (A) and (B) combined.

The surface treating agent may be applied to a substrate by any well-known techniques such as brush coating, dipping, spraying and evaporation. In the case of evaporation, the heating mode may be either resistance heating or EB heating and is not particularly limited. The curing temperature and time vary with a particular curing technique. For example, in the case of direct coating (brush coating, dipping or spraying), preferred conditions include a temperature of 25 to 200° C., especially 25 to 80° C. and 30 minutes to 36 hours, especially 1 to 24 hours. When the coating technique is evaporation, preferred conditions include 25 to 120° C. and 30 minutes to 48 hours, especially 1 to 24 hours. Humid curing conditions are also useful. The cured coating typically has a thickness of 0.1 to 100 nm, desirably 1 to 20 nm although the thickness depends on the type of substrate. Also, in the case of spray coating, for example, a procedure involving diluting the agent with a fluorochemical solvent having water previously added thereto, for thereby effecting hydrolysis to generate Si—OH, and thereafter, spraying the dilution is recommended because the coating rapidly cures.

The substrate to be treated with the surface treating agent is not particularly limited, and may be made of any desired materials including paper, fabric, metals, metal oxides, glass, plastics, ceramics, and quartz. The surface treating agent is effective for endowing the substrate with water/oil repellency. In particular, the surface treating agent is advantageously used for the treatment of $SiO_2$-deposited glass and film.

Preferred articles which may be treated with the surface treating agent include car navigation systems, mobile phones, smart phones, digital cameras, digital video cameras, PDA, portable audio players, car audio players, game consoles, eyeglass lenses, camera lenses, lens filters, sunglasses, medical instruments (e.g., gastroscopes), copiers, personal computers, LC displays, organic EL displays, plasma displays, touch panel displays, protective film, antireflective film, and other optical articles. The surface treating agent of the invention is effective for preventing fingerprints and sebum from adhering to the articles and also for imparting scratch resistance. Therefore, it is particularly useful as a water/oil repellent layer on touch panel displays and antireflective films.

The surface treating agent is used for anti-staining coatings on sanitary ware such as bathtubs and washbowls; anti-staining coatings on glazing or strengthened glass and head lamp covers in transport vehicles such as automobiles, trains and aircraft; water/oil repellent coatings on building exteriors; coatings for preventing oil contamination on kitchen ware; anti-staining, anti-sticking, anti-graffiti coatings in telephone booths; anti-fingerprint coatings on artistic objects; anti-fingerprint coatings on compact discs and DVD's; mold parting agents; paint additives; and resin modifiers. The agent is also effective for modifying the flow and dispersion of inorganic fillers, and for improving the lubricity of tape and film.

EXAMPLES

Examples and Comparative Examples are given below for illustrating the invention, but the invention is not limited by Examples.

The following compounds (Compound 1 to Compound 3) were furnished as the silane compound modified with a fluorooxyalkylene-containing polymer (a hydrolyzable group-containing organosilicon compound modified with a fluorooxyalkylene-containing polymer residue) or component (A). It is noted that in each formula, individual units in parentheses are randomly bonded.

[Chem. 146]

[Compound 1]

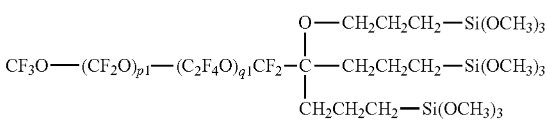

p1:q1 = 47:53, p1 + q1 ≈ 43

[Chem. 147]

[Conpound 2]

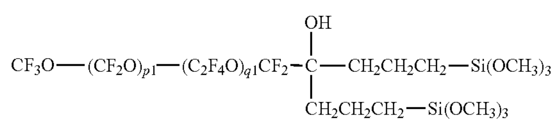

[Chem. 148]

[Compound 3]

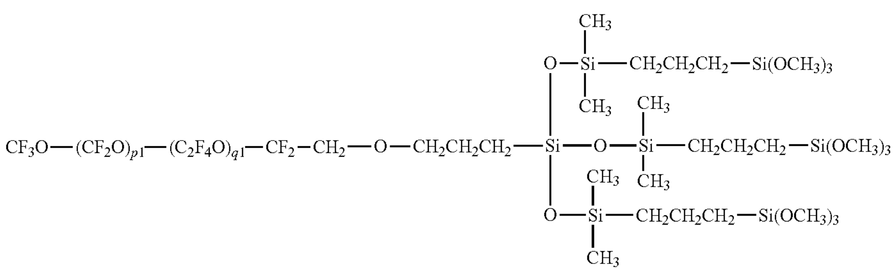

p1:q1 = 47:53, p1 + q1 ≈ 43

The following compound (Compound 4) was furnished as the silane compound modified with a fluorooxyalkylene-containing polymer (an organosilicon compound containing a hydrolyzable group and a polyether group, modified with a fluorooxyalkylene-containing polymer residue) or component (B). It is noted that in each formula, individual units in parentheses are randomly bonded.

[Chem. 149]

[Compound 4]

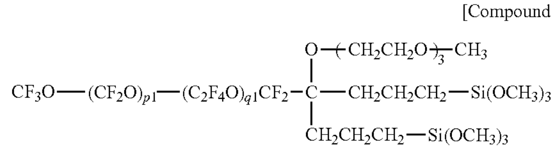

p1:q1 = 47:53, p1 + q1 ≈ 43

The method for the synthesis of Compound 4 is described below.

Synthesis Example 1

In a reactor, 25 g ($5.9\times10^{-3}$ mol) of a compound having the formula (A):

[Chem. 150]

(A)

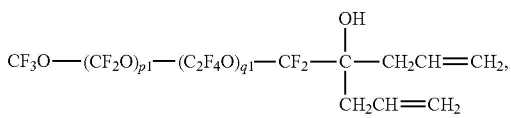

p1:q1 = 47:53, p1 + q1 ≈ 43

3 g ($1.3\times10^{-2}$ mol) of diethylene glycol 2-bromoethyl methyl ether, and 0.05 g ($1.3\times10^{-2}$ mol) of tetrabutylammonium iodide were mixed. Then 1.8 g ($3.3\times10^{-2}$ mol) of potassium hydroxide was added to the mixture, which was heated at 60° C. for 6 hours. Subsequently, 3 g ($1.3\times10^{-2}$ mol) of diethylene glycol 2-bromoethyl methyl ether and 1.8 g (3.3x10' mol) of potassium hydroxide were added again to the solution, which was heated at 60° C. for 14 hours. Further, 3 g ($1.3\times10^{-2}$ mol) of diethylene glycol 2-bromoethyl methyl ether and 1.8 g ($3.3\times10^{-2}$ mol) of potassium hydroxide were added to the solution, which was heated at 60° C. for 4 hours. At the end of heating, the solution was cooled to room temperature, and aqueous hydrochloric acid was added dropwise thereto. The lower layer or fluoro compound layer was recovered by separatory operation and washed with acetone. The lower layer or fluoro compound layer after washing was recovered again. The residual solvent was distilled off in vacuum, yielding 22 g of a fluoropolyether-containing polymer having the following formula (B).

[Chem. 151]

(B)

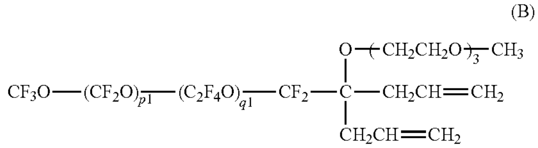

p1:q1 = 47:53, p1 + q1 ≈ 43

$^1$H-NMR

δ 2.3-2.5 (C—$\underline{CH_2}$CH═$CH_2$) 4H

δ 3.1-3.2 (—O—$(CH_2CH_2O)_3$—O—$\underline{CH_3}$) 3H

δ 3.3-3.7 (—O—$(\underline{CH_2}\underline{CH_2}O)_3$—O—$CH_3$) 12H

δ 4.9-5.0 (—$CH_2$CH═$\underline{CH_2}$) 4H

δ 5.7-5.8 (—$CH_2$$\underline{CH}$═$CH_2$) 2H

In a reactor, 20 g ($4.6\times10^{-3}$ mol) of a compound having the formula (B):

[Chem. 152]

(B)

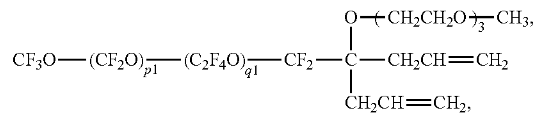

p1:q1 = 47:53, p1 + q1 ≈ 43

10 g of 1,3-bis(trifluoromethyl)benzene, 2.6 g ($2.1\times10^{-2}$ mol) of trimethoxysilane, and $2.0\times10^{-2}$ g of a toluene solution of chloroplatinic acid/vinyl siloxane complex (containing $6.0\times10^{-8}$ mol of Pt) were mixed. The solution was aged at 80° C. for 24 hours. Thereafter, the solvent and unreacted reactants were distilled off in vacuum, obtaining 20 g of a liquid product.

On $^1$H-NMR analysis, the compound was identified to have a structure of the following formula (C).

[Chem. 153]

(C)

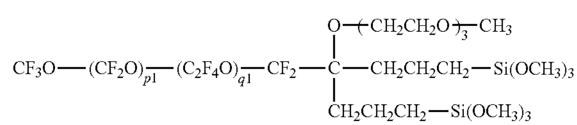

p1:q1 = 47:53, p1 + q1 ≈ 43

$^1$H-NMR

δ 0.4-0.6 (—$CH_2CH_2\underline{CH_2}$—Si) 4H

δ 1.4-1.8 (—$\underline{CH_2}\underline{CH_2}CH_2$—Si) 8H

δ 3.1-3.2 (—O—$(CH_2CH_2O)_3$—O—$\underline{CH_3}$) 3H

δ 3.3-3.7 (—O—$(\underline{CH_2}\underline{CH_2}O)_3$—O—$CH_3$, —$Si(O\underline{CH_3})_3$) 30H Preparation of Surface Treating Agent and Formation of Cured Film Surface treating agents were prepared by dissolving the fluoropolyether-containing polymer, Compounds 1 to 3 and the other fluoropolyether-containing polymer, Compound 4 in solvent Novec 7200 (ethyl perfluorobutyl ether by 3M) in a concentration of 20 wt % in accordance with the formulation in Table 1.

Onto glass having an outermost surface treated with $SiO_2$ of 10 nm (Gorilla by Corning), 4 μL of each surface treating agent was deposited by vacuum evaporation under conditions including pressure $2.0\times10^{-2}$ Pa and heating temperature 700° C. The deposit was cured in an atmosphere of 25° C. and humidity 40% RH for 12 hours, obtaining a cured film of 8 nm thick.

TABLE 1

| | Component (A) | Component (B) | Proportion of component (A), wt % | Proportion of component (B), wt % |
|---|---|---|---|---|
| Example 1 | Compound 1 | Compound 4 | 70 | 30 |
| Example 2 | Compound 1 | Compound 4 | 50 | 50 |
| Example 3 | Compound 2 | Compound 4 | 50 | 50 |
| Example 4 | Compound 3 | Compound 4 | 50 | 50 |
| Comparative Example 1 | Compound 1 | — | 100 | 0 |
| Comparative Example 2 | Compound 2 | — | 100 | 0 |
| Comparative Example 3 | Compound 3 | — | 100 | 0 |

The cured films obtained in Examples 1 to 4 and Comparative Examples 1 to 3 were evaluated by the following tests. All the tests were carried out at 25° C. and humidity 40% RH.

Evaluation of Water Repellency

[Evaluation of Initial Water Repellency]

Using a contact angle meter Drop Master (Kyowa Interface Science Co., Ltd.), the cured film on glass, prepared above, was measured for a contact angle with water as an index of water repellency (droplet 2 μL, temperature 25° C., humidity 40% RH). The results (initial contact angle with water) are shown in Table 2.

At the initial, all the films of Examples and Comparative Examples showed excellent water repellency.

[Evaluation of Abrasion Resistance]

Using a friction tester (Shinto Scientific Co., Ltd.), the cured film on glass, prepared above, was rubbed under the conditions shown below, 5,000 cycles with steel wool or 3,000 cycles with eraser. Thereafter, the cured film was similarly measured for a contact angle with water (water repellency) as an index of abrasion resistance. The test environmental conditions included temperature 25° C. and humidity 40% RH. The results (contact angle with water after abrasion) are shown in Table 2.

Steel Wool Abrasion Resistance
Steel wool: Bonstar #0000 by Nihon Steel Wool Co., Ltd.
Moving distance (one way): 30 mm
Moving speed: 3,600 mm/min
Load: 1 kg/$cm^2$
Eraser abrasion resistance
Eraser: Rubber eraser by Minoan Co.
Contact area: 6 mm diameter
Moving distance (one way): 30 mm
Moving speed: 3,600 mm/min
Load: 1 kg/6 mm diameter

TABLE 2

| | Initial contact angle with water (°) | Contact angle with water after steel wool abrasion (°) | Contact angle with water after eraser abrasion (°) |
|---|---|---|---|
| Example 1 | 117 | 111 | 114 |
| Example 2 | 117 | 110 | 115 |
| Example 3 | 116 | 110 | 113 |
| Example 4 | 117 | 108 | 105 |
| Comparative Example 1 | 116 | 113 | 87 |
| Comparative Example 2 | 115 | 113 | 95 |
| Comparative Example 3 | 116 | 112 | 75 |

Since a polymer terminated with a hydrolyzable group (alkoxy group) is mixed with a polymer terminated with a polyether group and a hydrolyzable group (alkoxy group), the compositions of Examples 1 to 4 are improved in substrate adhesion and wettability. As a result, the cured films of the surface treating agents of Examples 1 to 4 maintained a contact angle of more than 100° even after 5,000 cycles of steel wool abrasion or 3,000 cycles of eraser abrasion, developing superior abrasion resistance to the cured films of the surface treating agents of Comparative Examples 1 to 3.

The invention claimed is:

1. A fluorochemical coating composition comprising (A) an organosilicon compound containing a hydroxyl or hydrolyzable group, modified with a fluorooxyalkylene-containing polymer residue represented by (i) the general formula (1), (ii) a partial hydrolytic condensate of general formula (1), or (iii) a combination thereof:

$$Rf\left[A\left(\overset{R_{3-n}}{\overset{|}{Si}}-X_n\right)_m\right]_\alpha \qquad (1)$$

wherein in the general formula (1):

Rf is a mono- or divalent fluorooxyalkylene-containing polymer residue,

A is independently a di- to heptavalent organic group,

R is independently $C_1$-$C_4$ alkyl or phenyl,

X is independently a hydroxyl or hydrolyzable group for either or both of general formula (1) or the partial hydrolytic condensate, n is an integer of 1 to 3, m is an integer of 1 to 6, and α is 1 or 2, and (B) an organosilicon compound containing a hydroxyl or hydrolyzable group and a polyether group, wherein the organosilicon compound is further modified with a fluorooxyalkylene-containing polymer residue represented by general formula (2) or (3), and/or a partial hydrolytic condensate of the organosilicon compound:

$$Rf\text{-}[N(V)_\beta(E)_\gamma]_\alpha \qquad (2)$$

wherein in the general formula (2):

Rf is a mono- or divalent fluorooxyalkylene-containing polymer residue,

α is 1 or 2,

N is independently a tri- to octavalent organic group which may contain fluorine, oxygen, silicon or nitrogen, V is independently a monovalent group terminated with a hydroxyl or hydrolyzable group, E is independently a monovalent group containing oxyalkylene, β is an integer of 1 to 6, γ is an integer of 1 to 6, β+γ is an integer of 2 to 7, $$Rf\text{-}[Q\text{-}(G)_{\delta}\text{-}(E')_{\varepsilon}\text{-}B]_{\alpha} \qquad (3)$$

wherein in the general formula (3):

Rf is a mono- or divalent fluorooxyalkylene-containing polymer residue,

α is 1 or 2,

Q is independently a single bond or divalent organic group,

G is independently a divalent group having a hydroxyl or hydrolyzable group,

E' is independently an oxyalkylene-containing divalent group which may have a hydroxyl or hydrolyzable group, B is independently hydrogen, $C_1$-$C_4$ alkyl or halogen, δ is independently an integer of 1 to 10, ε is independently an integer of 1 to 10, with the proviso that G and E' are linearly linked, and G and E' individually may be randomly arranged, wherein components (A) and (B) are mixed in a weight ratio of from 15:85 to 85:15, provided that the total of components (A) and (B) is 100.

2. The fluorochemical coating composition of claim 1 wherein the hydrolyzable group-containing organosilicon compound modified with a fluorooxyalkylene-containing polymer residue, represented by the formula (1), is selected from compounds having the following formulae:

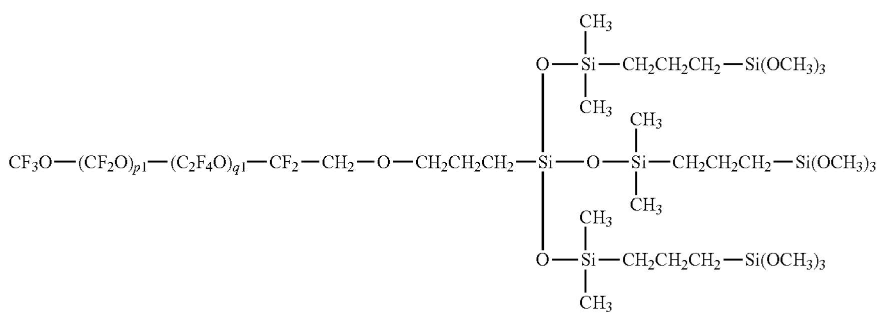

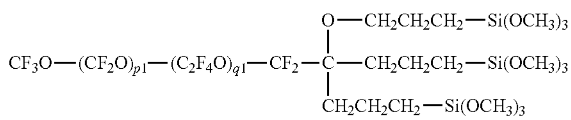

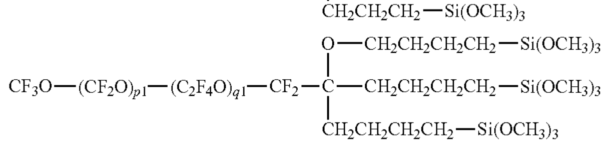

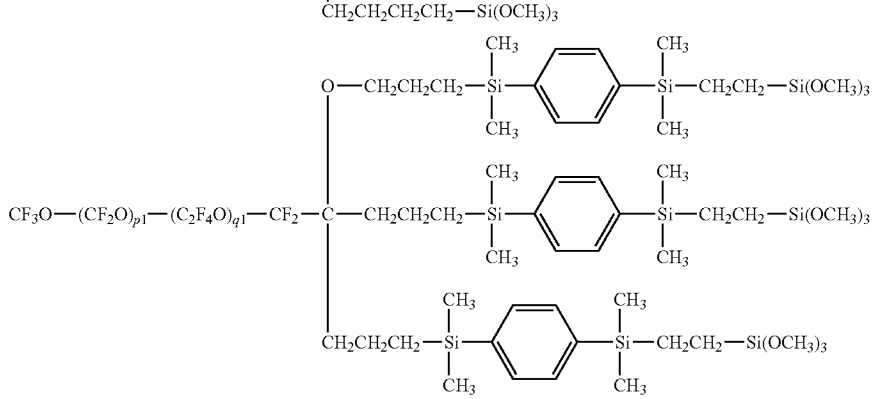

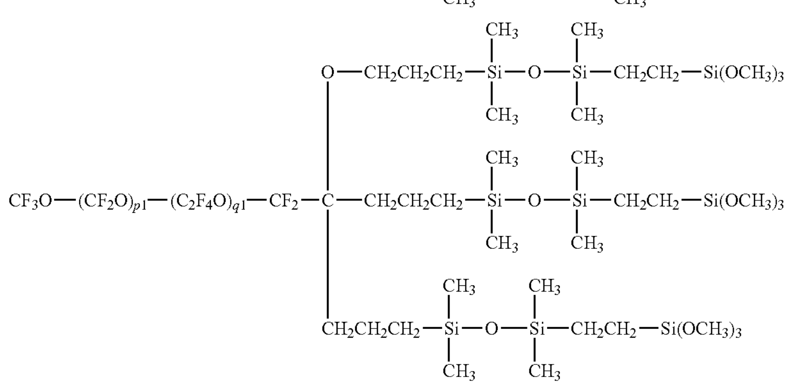

-continued
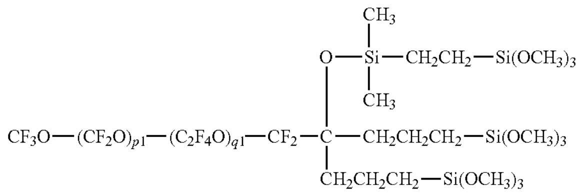
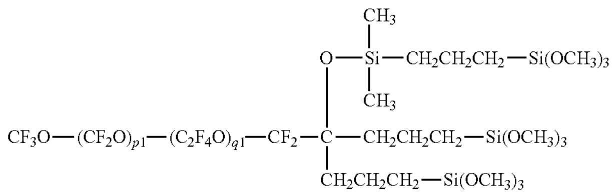
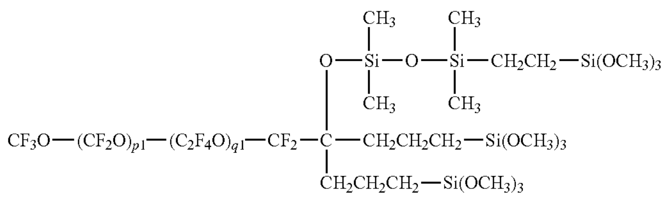
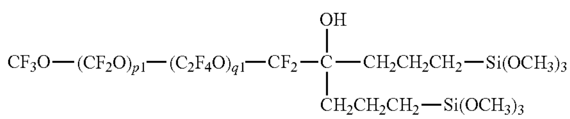
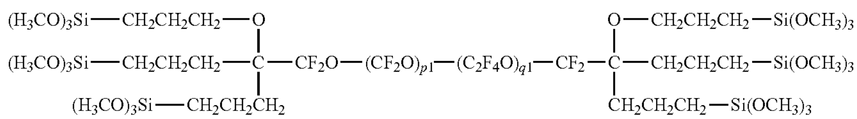
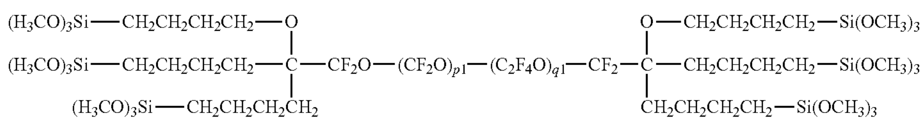
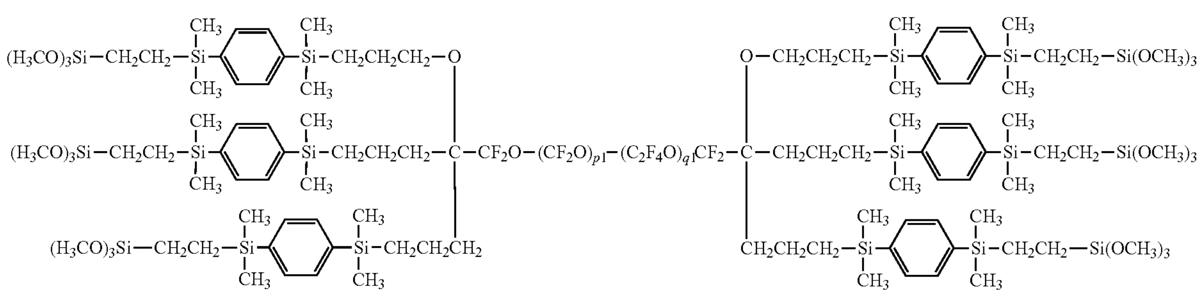
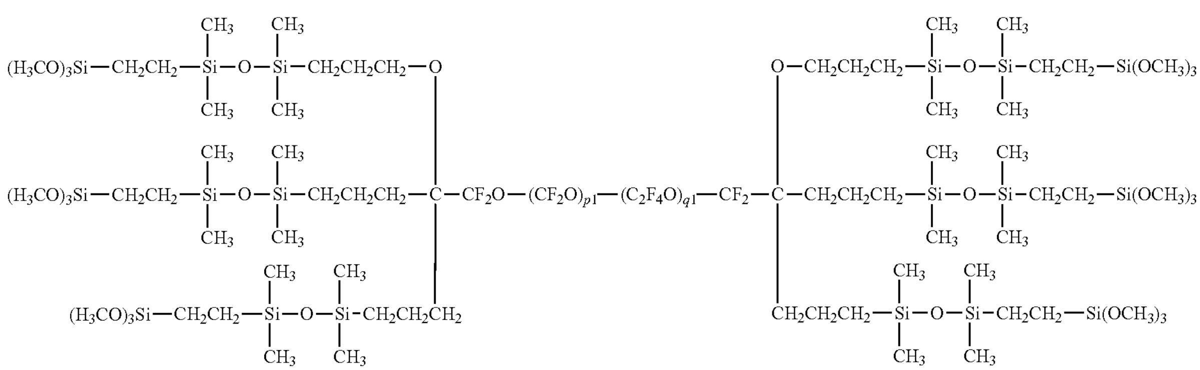
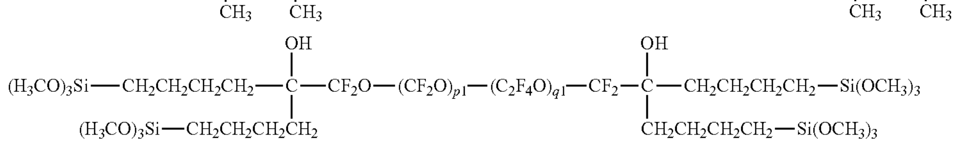

-continued

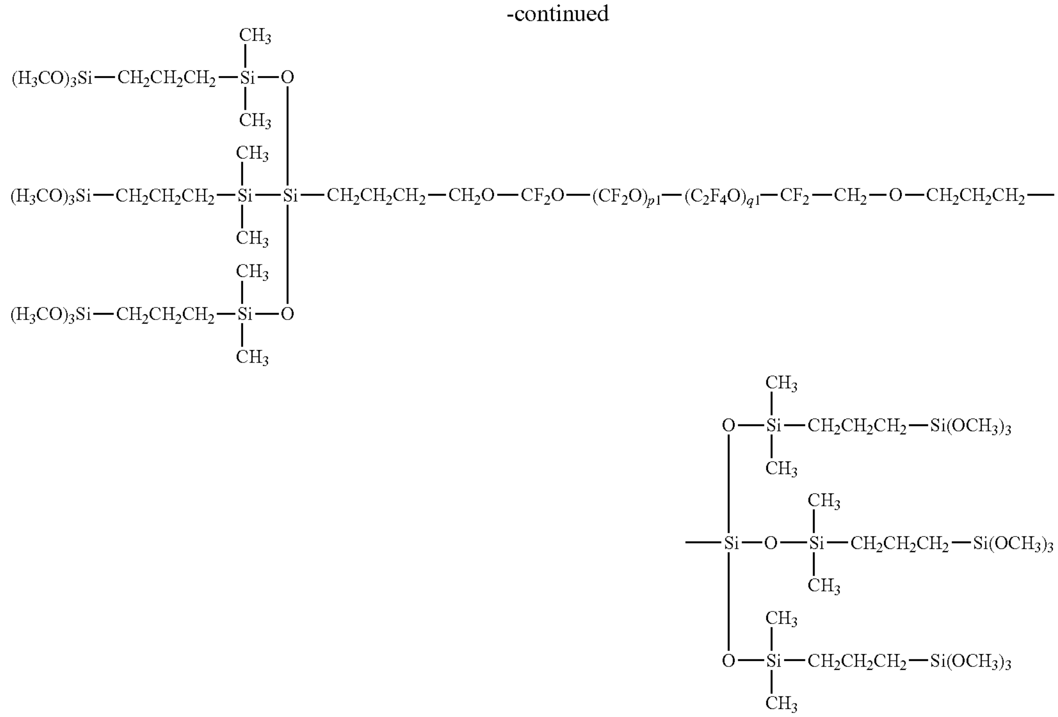

wherein p1 is an integer of 5 to 100, q1 is an integer of 5 to 100, p1+q1 is an integer of 10 to 105, individual units in parentheses may be randomly bonded.

3. The fluorochemical coating composition of claim 1 wherein the hydrolyzable and polyether group-containing organosilicon compound modified with a fluorooxyalkylene-containing polymer residue, represented by the formula (2) or (3), is selected from compounds having the following formulae:

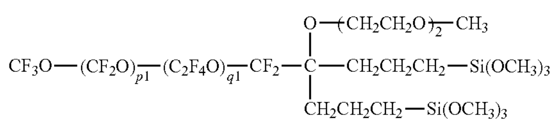

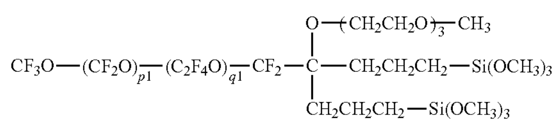

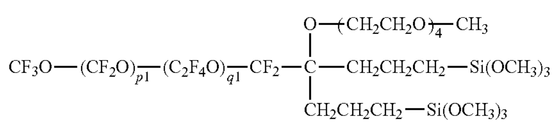

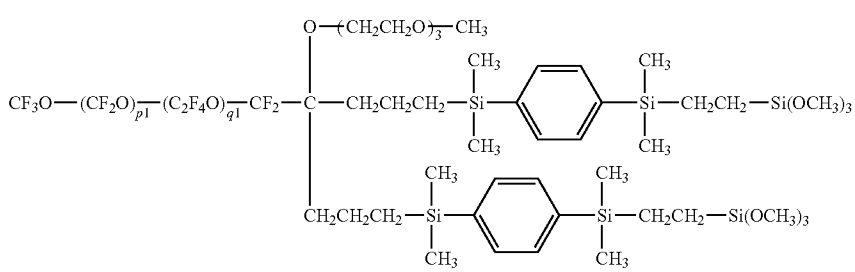

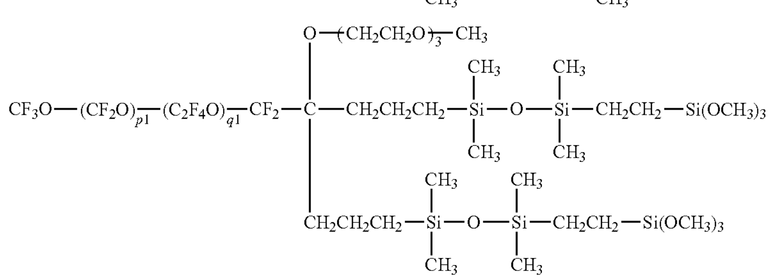

-continued
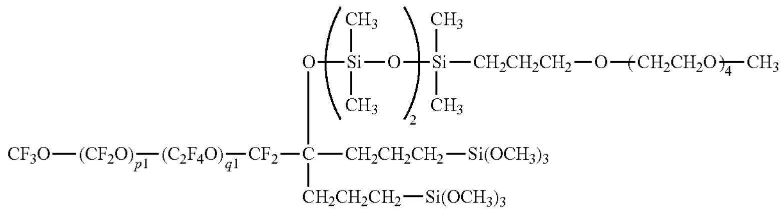
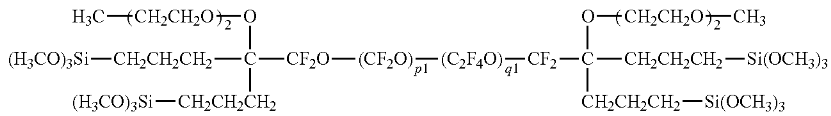
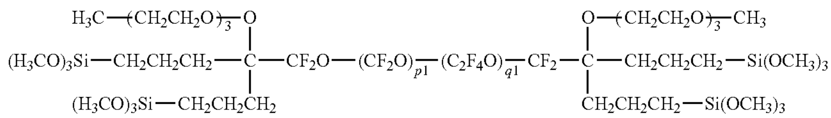
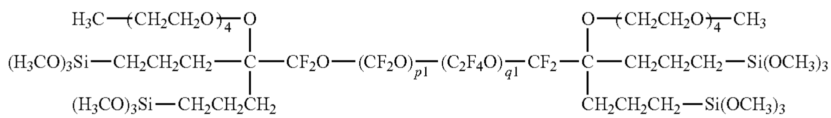
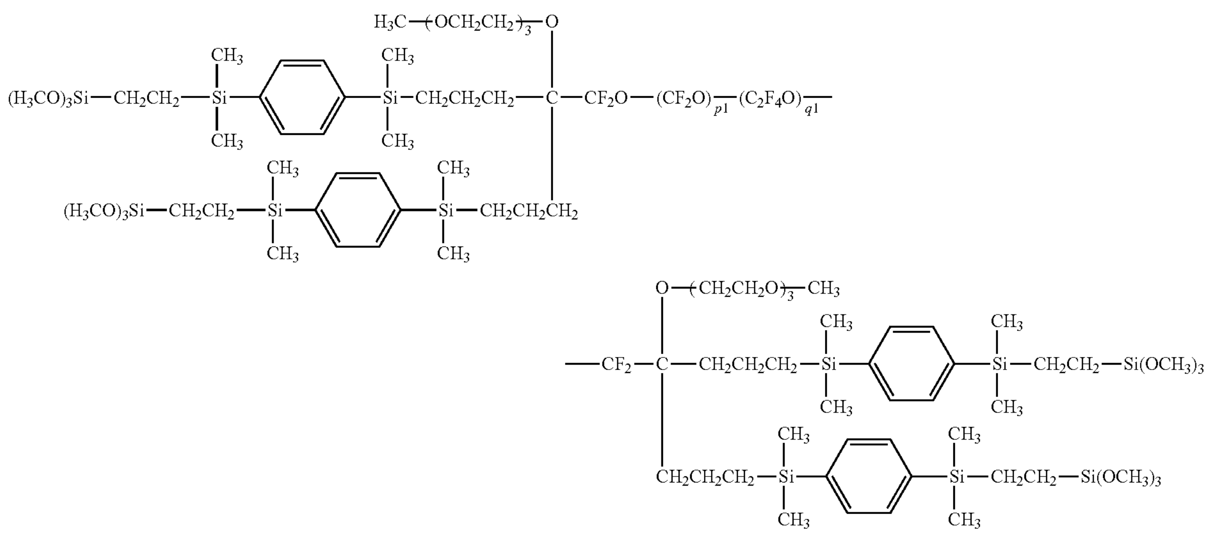
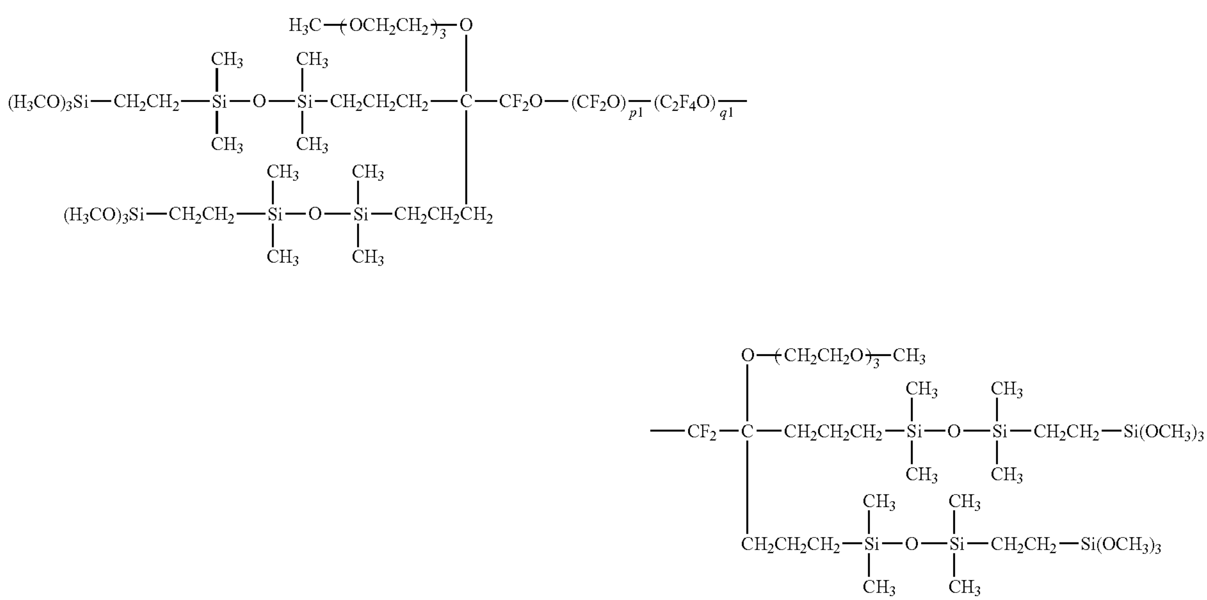

-continued
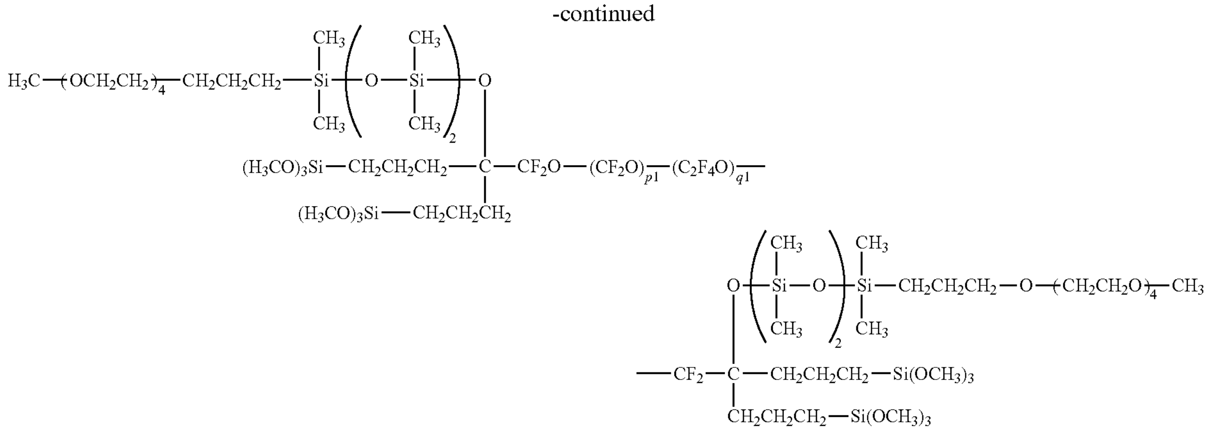
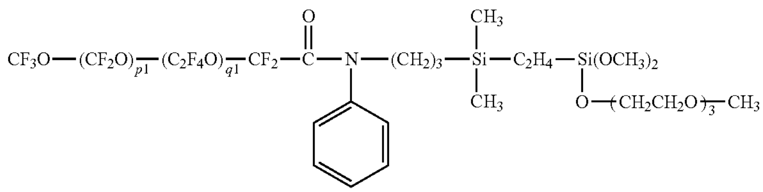
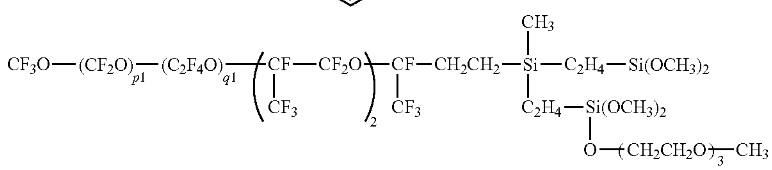
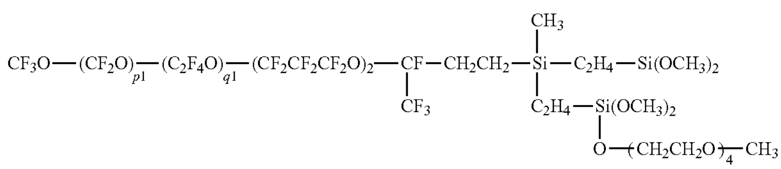
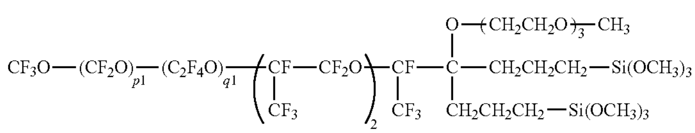
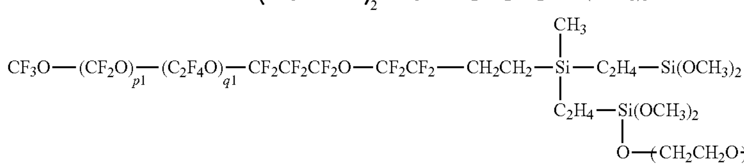
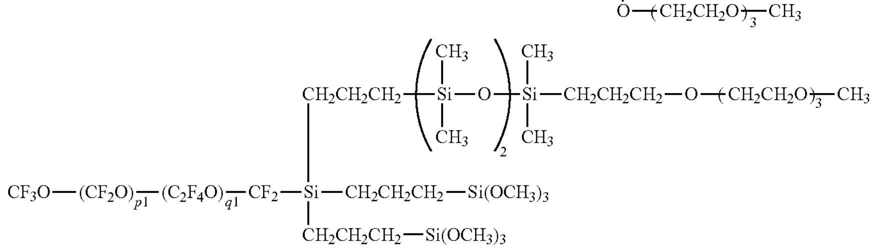
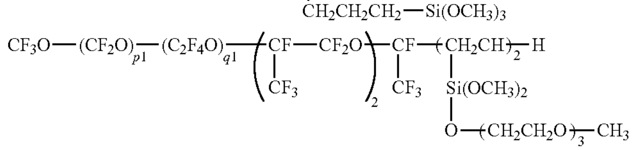
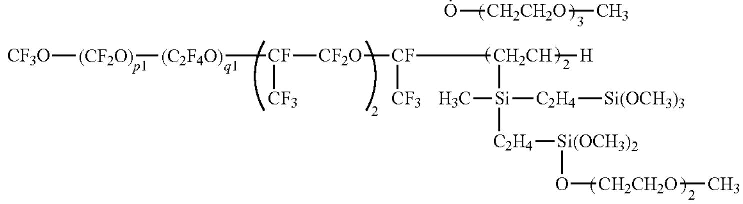

-continued
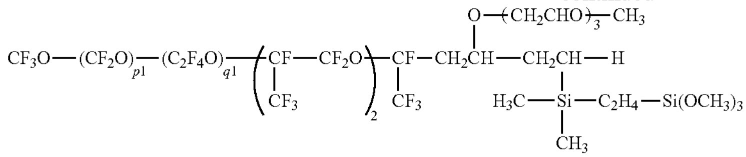
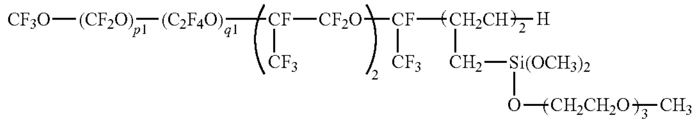
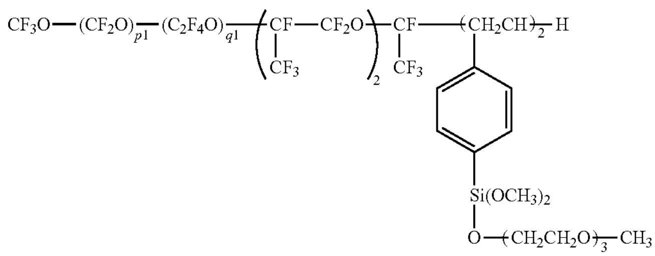
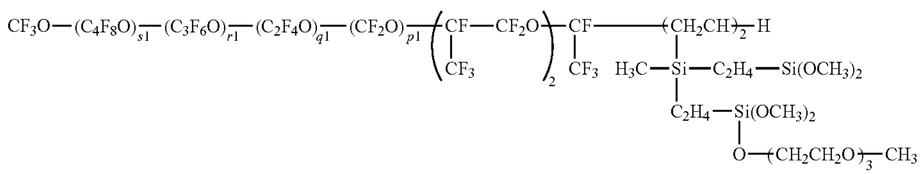
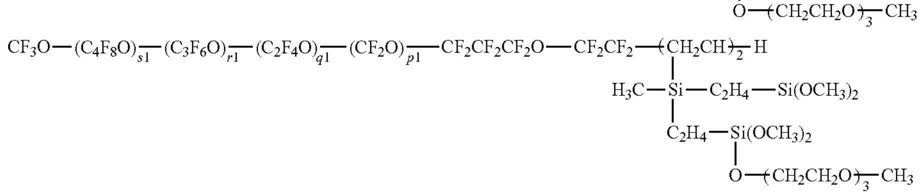
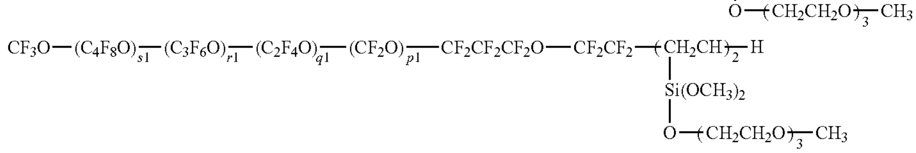
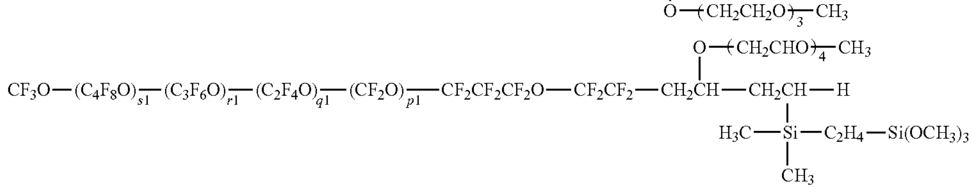
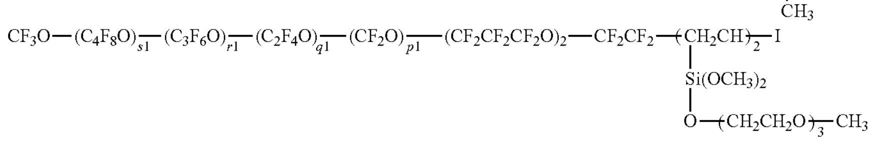
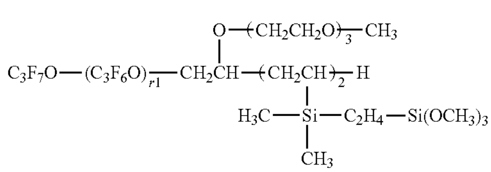
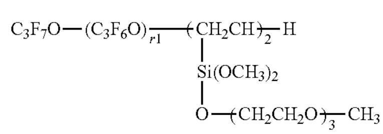
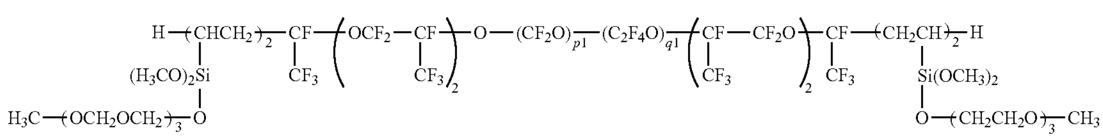

wherein p1 is an integer of 5 to 100, q1 is an integer of 5 to 100, p1+q1 is an integer of 10 to 105, r1 is an integer of 1 to 100, s1 is an integer of 1 to 100, p1+q1+r1+s1 is an integer of 12 to 199, individual units in parentheses may be randomly bonded.

4. A surface treating agent comprising the fluorochemical coating composition of claim 1.

5. An article having a surface treated with the surface treating agent of claim 4.

6. A fluorochemical coating composition comprising (A) an organosilicon compound containing a hydroxyl or hydrolyzable group, modified with a fluorooxyalkylene-containing polymer residue represented by (i) the general formula (4) or (5), (ii) a partial hydrolytic condensate of general formula (4) or (5), or (iii) a combination thereof:

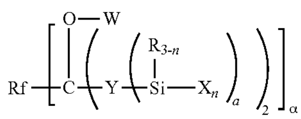
(4)

wherein in the general formula (4):

Rf is a mono- or divalent fluorooxyalkylene-containing polymer residue,

Y is independently a di- to hexavalent hydrocarbon group which may have silicon and/or a siloxane bond, R is independently $C_1$-$C_4$ alkyl or phenyl, X is independently a hydroxyl or hydrolyzable group for either or both of general formula (4) or the partial hydrolytic condensate, a is an integer of 1 to 5, $\alpha$ is 1 or 2, and W is hydrogen or a group having the formula (4a):

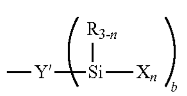
(4a)

wherein in the general formula (4a):

Y' is a di- to hexavalent hydrocarbon group which may have silicon and/or a siloxane bond, R is independently $C_1$-$C_4$ alkyl or phenyl, X is independently a hydroxyl or hydrolyzable group for either or both of general formula (4a) or the partial hydrolytic condensate, n is an integer of 1 to 3, and b is an integer of 1 to 5,

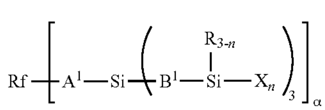
(5)

wherein in the general formula (5):

$A^1$ is a $C_2$-$C_6$ divalent hydrocarbon group which may contain an ether bond, $B^1$ is independently a $C_1$-$C_5$ alkylene group which may contain at least one selected from oxygen atom, diorganosilylene group, and diorganosiloxane structure, Rf is a mono- or divalent fluorooxyalkylene-containing polymer residue, X is independently a hydroxyl or hydrolyzable group for either or both of general formula (5) or the partial hydrolytic condensate, R is independently $C_1$-$C_4$ alkyl or phenyl, n is an integer of 1 to 3, and $\alpha$ is 1 or 2, and (B) an organosilicon compound containing a hydroxyl or hydrolyzable group and a polyether group, modified with a fluorooxyalkylene-containing polymer residue represented by the general formula (6) and/or a partial hydrolytic condensate thereof of the organosilicon compound:

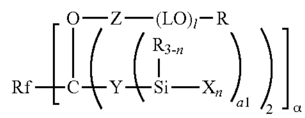
(6)

wherein in the general formula (6):

Rf is a mono- or divalent fluorooxyalkylene-containing polymer residue,

Y is independently a di- to hexavalent hydrocarbon group which may have silicon and/or a siloxane bond, X is independently a hydroxyl or hydrolyzable group for either or both of general formula (6) or the partial hydrolytic condensate, R is independently $C_1$-$C_4$ alkyl or phenyl, n is an integer of 1 to 3, $\alpha$ is 1 or 2, Z is independently a single bond, siloxane bond or silylene group, L is independently $C_1$-$C_4$ alkylene, 1 is an integer of 1 to 20, and a1 is an integer of 1 to 5.

7. The fluorochemical coating composition of claim 6 wherein in the formulae (4) and (6), Y is selected from the group consisting of a $C_3$-$C_{10}$ alkylene group, a $C_2$-$C_8$ alkylene group containing $C_6$-$C_8$ arylene, a divalent group having $C_2$-$C_8$ alkylene groups bonded via a $C_1$-$C_4$ silalkylene structure or $C_6$-$C_{10}$ silarylene structure, and a di- to tetravalent group in which a $C_2$-$C_{10}$ alkylene group is bonded to the valence bond of a di- to tetravalent linear organopolysiloxane residue of 2 to 10 silicon atoms or a di- to tetravalent branched or cyclic organopolysiloxane residue of 3 to 10 silicon atoms.

8. The fluorochemical coating composition of claim 6 wherein in the formula (4a), Y' is selected from the group consisting of a $C_2$-$C_{10}$ alkylene group, a $C_2$-$C_8$ alkylene group containing $C_6$-$C_8$ arylene, a $C_2$-$C_6$ alkylene group containing diorganosilylene, a divalent group having $C_2$-$C_8$ alkylene groups bonded via a $C_1$-$C_4$ silalkylene structure or $C_6$-$C_{10}$ silarylene structure, a $C_2$-$C_6$ alkylene group containing divalent linear organopolysiloxane residue of 2 to 10 silicon atoms, and a di- to tetravalent group in which a $C_2$-$C_{10}$ alkylene group is bonded to the valence bond of a di- to tetravalent linear organopolysiloxane residue of 2 to 10 silicon atoms or a di- to tetravalent branched or cyclic organopolysiloxane residue of 3 to 10 silicon atoms.

9. The fluorochemical coating composition of claim 6 wherein in the formula (6), Z is selected from the group consisting of a single bond, a di- to tetravalent linear organopolysiloxane residue of 2 to 10 silicon atoms or a di- to tetravalent branched or cyclic organopolysiloxane residue of 3 to 10 silicon atoms, and a linear silalkylene residue or silarylene residue of 2 to 10 silicon atoms.

10. The fluorochemical coating composition of claim 1 or 6 wherein in the formulae (1) to (6), α=1 and Rf is a monovalent fluorooxyalkylene-containing polymer residue having the general formula (7):

$$F\text{—}(CF_2O)_p(C_2F_4O)_q(C_3F_6O)_r(C_4F_8O)_s\text{—}C_dF_{2d}\text{—} \quad (7)$$

wherein p, q, r and s each are an integer of 0 to 200, p+q+r+s is 3 to 200, wherein in each instance, a repeating unit in the general formula (7) selected from —$(CF_2O)_p$—, —$(C_2F_4O)_q$—, —$(C_3F_6O)_r$—, or —$(C_4F_8O)_s$— may be linear or branched, individual repeating units may be randomly bonded, d is an integer of 0 to 3, and the units associated with d may be linear or branched.

11. The fluorochemical coating composition of claim 1 or 6 wherein in the formulae (1) to (6), α=2 and Rf is a divalent fluorooxyalkylene-containing polymer residue having the general formula (8):

$$\text{—}C_dF_{2d}\text{—}O\text{—}(CF_2O)_p(C_2F_4O)_q(C_3F_6O)_r(C_4F_8O)_s\text{—}C_dF_{2d}\text{—} \quad (8)$$

wherein p, q, r and s each are an integer of 0 to 200, p+q+r+s is 3 to 200, wherein in each instance, a repeating unit in the general formula (8) selected from —$(CF_2O)_p$—, —$(C_2F_4O)_q$—, —$(C_3F_6O)_r$—, or —$(C_4F_8O)_s$— may be linear or branched, individual repeating units may be randomly bonded, d is each independently an integer of 0 to 3, and the units associated with d may be linear or branched.

12. The fluorochemical coating composition of claim 1 or 6 wherein in the formulae (1) and (4) to (6), X is selected from the group consisting of hydroxyl, $C_1$-$C_{10}$ alkoxy groups, $C_2$-$C_{10}$ alkoxyalkoxy groups, $C_1$-$C_{10}$ acyloxy groups, $C_2$-$C_{10}$ alkenyloxy groups, and halogens.

* * * * *